United States Patent
Bogatin et al.

(10) Patent No.: US 11,979,626 B2
(45) Date of Patent: May 7, 2024

(54) METHOD AND SYSTEM FOR DELIVERING REAL-TIME CONTENT USING BROADCASTING AND UNICASTING

(71) Applicant: Siden, Inc., New York, NY (US)

(72) Inventors: Boris Bogatin, Glenside, PA (US); Narayan Parappil Menon, Syosset, NY (US); Ankur Verma, San Diego, CA (US); James A Nelson, Fair Haven, NJ (US)

(73) Assignee: Siden, Inc., New York, NY (US)

( * ) Notice: Subject to any disclaimer, the term of this patent is extended or adjusted under 35 U.S.C. 154(b) by 55 days.

(21) Appl. No.: 17/580,817

(22) Filed: Jan. 21, 2022

(65) Prior Publication Data
US 2022/0239971 A1 Jul. 28, 2022

Related U.S. Application Data

(60) Provisional application No. 63/140,278, filed on Jan. 22, 2021.

(51) Int. Cl.
*H04N 21/266* (2011.01)
*H04N 21/231* (2011.01)

(52) U.S. Cl.
CPC . *H04N 21/26616* (2013.01); *H04N 21/23106* (2013.01)

(58) Field of Classification Search
CPC ....... H04N 21/26616; H04N 21/23106; H04N 21/64738; H04N 21/23439; H04N 21/812
See application file for complete search history.

(56) References Cited

U.S. PATENT DOCUMENTS

| 5,652,759 A | 7/1997 | Stringfellow, Jr. |
| 9,300,587 B1 * | 3/2016 | Hassan .............. H04L 47/125 |

(Continued)

FOREIGN PATENT DOCUMENTS

| CN | 1984118 A | 6/2007 |
| CN | 105391516 A | 3/2016 |

(Continued)

OTHER PUBLICATIONS

International Search Report and Written Opinion dated Jun. 21, 2022, in corresponding International Application No. PCT/US2022/021306.

(Continued)

*Primary Examiner* — Joshua D Taylor
(74) *Attorney, Agent, or Firm* — Harness, Dickey & Pierce, P.L.C.

(57) ABSTRACT

A system and method for operating includes providing a content for communication through a content distribution system having a broadcast mode and a unicast mode, determining a first number of user devices for receiving a communication of the content, determining a likelihood of consumption of the content by the first number of user devices, determining an available spectrum for communicating the content, determining a spectral efficiency for the unicast mode and the broadcast mode of the communication for each of the first number of user devices, selecting the broadcast mode or the unicast mode or both based on the first number of user devices, the likelihood of consumption of the content, the available spectrum and the spectral efficiency and communicating the content to the first number of user devices using the broadcast mode, the unicast mode or both based on selecting.

75 Claims, 21 Drawing Sheets

(56) References Cited

U.S. PATENT DOCUMENTS

| | | | |
|---|---|---|---|
| 9,456,247 | B1 | 9/2016 | Pontual et al. |
| 10,433,022 | B2 | 10/2019 | Norin et al. |
| 2004/0064325 | A1 | 4/2004 | Syed et al. |
| 2007/0002871 | A1 | 1/2007 | Pekonen et al. |
| 2007/0094023 | A1 | 4/2007 | Gallino et al. |
| 2008/0244657 | A1 | 10/2008 | Arsenault et al. |
| 2008/0273591 | A1 | 11/2008 | Brooks et al. |
| 2009/0040957 | A1 | 2/2009 | Anschutz |
| 2010/0023972 | A1 | 1/2010 | Summers et al. |
| 2010/0165902 | A1* | 7/2010 | Kvernvik ............. H04W 4/06 370/312 |
| 2011/0044227 | A1 | 2/2011 | Harrang et al. |
| 2011/0059706 | A1 | 3/2011 | Harel et al. |
| 2013/0066936 | A1 | 3/2013 | Krishnan et al. |
| 2013/0254815 | A1 | 9/2013 | Pfeffer et al. |
| 2014/0334318 | A1 | 11/2014 | Pica et al. |
| 2015/0067754 | A1* | 3/2015 | Wiser ............. H04N 21/64738 725/120 |
| 2016/0028448 | A1 | 1/2016 | Park et al. |
| 2016/0360255 | A1 | 12/2016 | Pontual et al. |
| 2017/0078346 | A1* | 3/2017 | Chao ............. H04N 21/23439 |
| 2018/0138958 | A1 | 5/2018 | Asplund et al. |
| 2018/0139508 | A1 | 5/2018 | Norin et al. |
| 2019/0223029 | A1 | 7/2019 | Clarke et al. |
| 2019/0273801 | A1 | 9/2019 | Luft |
| 2019/0320223 | A1* | 10/2019 | Malhotra ............. H04N 21/812 |
| 2020/0037035 | A1 | 1/2020 | Kaufman et al. |
| 2020/0195745 | A1 | 6/2020 | Demsey |
| 2020/0205174 | A1* | 6/2020 | Prasad ............. H04L 12/189 |
| 2020/0243985 | A1 | 7/2020 | Petersson et al. |
| 2020/0296155 | A1 | 9/2020 | McGrath et al. |
| 2020/0328804 | A1 | 10/2020 | Xu et al. |
| 2020/0358646 | A1 | 11/2020 | Lincoln et al. |
| 2020/0374713 | A1 | 11/2020 | Bogatin et al. |
| 2021/0067814 | A1 | 3/2021 | Bogatin et al. |
| 2021/0098873 | A1 | 4/2021 | Veysoglu et al. |
| 2021/0099749 | A1 | 4/2021 | Bogatin et al. |
| 2021/0127167 | A1 | 4/2021 | Kaufman et al. |

FOREIGN PATENT DOCUMENTS

| | | |
|---|---|---|
| EP | 1030465 A1 | 8/2000 |
| EP | 3456083 B1 | 3/2020 |
| JP | 2001-313599 A | 11/2001 |
| JP | 2002-152153 A | 5/2002 |
| JP | 2003-169363 A | 6/2003 |
| JP | 2010-027004 A | 2/2010 |
| JP | 2015-532033 A | 11/2015 |
| KR | 2011-0093993 A | 8/2011 |
| WO | WO-03058967 A1 | 7/2003 |
| WO | WO-2011/139305 A1 | 11/2011 |
| WO | WO-2013103828 A1 | 7/2013 |
| WO | WO-2018/001897 A1 | 1/2018 |

OTHER PUBLICATIONS

Symeon Chatzinotas et al., "Cellular-Broadcast Service Convergence through Caching for CoMP Cloud RANs", Arxiv. Org, Cornell University Library, 201 Olin Library Cornell University Ithaca, NY 14853, Apr. 30, 2015.
International Search Report and Written Opinion dated Aug. 19, 2022 in corresponding PCT Application No. PCT/US2022/031517.
International Search Report and Written Opinion dated Aug. 1, 2022 in corresponding PCT Application No. PCT/US2022/028725.
Pixeom website; https://pixeom.com/; 10 pages.
Datami website; http://www.datami.com/; 9 pages.
Partial International Search Report for corresponding PCT/US2017/061760, dated Mar. 20, 2018, 13 pages.
Requirement for Restriction Election regarding U.S. Appl. No. 15/811,958 dated Jun. 7, 2018.
Non-Final Office Action regarding U.S. Appl. No. 15/811,958 dated Oct. 10, 2018.
Notice of Allowance regarding U.S. Appl. No. 15/811,958 dated May 22, 2019.
Chinese Office Action dated Apr. 3, 2020 in corresponding Chinese Application No. 2017800705362.
Japanese Office Action dated Dec. 1, 2020 in corresponding Japanese Application No. 2019-547232.
International Search Report and Written Opinion dated Dec. 9, 2020 in corresponding PCT Application No. PCT/US2020/053313.
Interntional Search Report dated Oct. 21, 2021 in corresponding PCT Application No. PCT/US2021/041116.
International Search Report and Written Opinion dated Jul. 17, 2020 in corresponding PCT/US2020/034247.
International Search Report dated Feb. 3, 2022 in corresponding PCT Application No. PCT/2021/055714.
International Search Report and Written Opinion dated Mar. 21, 2022 in corresponding PCT Application No. PCT/US2021/053154.
Yao Jingjing et al., "On Mobile Edge Caching", IEEE Communications Surveys & Tutorials, vol. 21, No. 3, Mar. 29, 2019, pp. 2525-2553.
International Search Report and Written Opinion dated Apr. 21, 2022 in corresponding PCT Application No. PCT/US2022/013293.
International Search Report dated Nov. 4, 2022 in corresponding PCT Application No. PCT/US2022/037896.
International Search Report and Written Opinion dated Mar. 14, 2023 in corresponding PCT Application No. PCT/US2022/046640.

* cited by examiner

METHOD AND SYSTEM FOR DELIVERING REAL-TIME CONTENT USING BROADCASTING AND UNICASTING

CROSS-REFERENCE TO RELATED APPLICATIONS

This is a non-provisional application of provisional application 63/140,278 filed on Jan. 22, 2021, the disclosure of which is incorporated by reference herein. This application incorporates by reference herein the entire disclosures of provisional applications, 63/051,582, filed on Jul. 14, 2020, U.S. Ser. No. 63/050,699, filed on Jul. 10, 2020, U.S. Ser. No. 17/095,686, filed on Nov. 11, 2020, U.S. Ser. No. 16/588,763, filed Sep. 30, 2019, U.S. Ser. No. 17/489,912, filed on Sep. 30, 2021, U.S. Pat. No. 10,433,022, issued on Oct. 1, 2019 and U.S. Ser. No. 17/353,989, filed Jun. 22, 2021.

TECHNICAL FIELD

The present disclosure relates generally to content distribution systems and, more specifically, to a method and system for strategically determining network resources for communicating data through a communication system.

BACKGROUND

The statements in this section merely provide background information related to the present disclosure and may not constitute prior art.

The provisioning of increasingly higher speed wireless data connectivity has been the focus of wireless carrier infrastructure growth for several decades and has accelerated with the rapidly rising demand by consumers to stream video to each or any of their devices, irrespective of where they are. The increasing wireless performance, together with both users' desires to consume more bandwidth intensive video content over the Internet, at lower marginal cost per bit, and wireless providers desire to serve more of the users' demands including in the home and also to large screen devices (i.e., TVs, laptops), is placing a requirement on wireless networks to accommodate a markedly higher level of capacity for handling this exploding video data traffic demand over wireless networks.

Cellular wireless networks have traditionally employed unicast delivery schemes to enable content to reach users. With unicast delivery, a set of radio and network resources is allocated to each stream of content being delivered to a user. If a number of users happen to be consuming the same content simultaneously, a unicast delivery scheme requires a multiplicity of such radio and network resources to be assigned, to enable delivery to the multiplicity of users.

Unicast transmissions occupy spectrum resources which are, at that point in time, not used to serve other users, except if they are reusable on parallel antenna paths, beams, sectors, or geographies. Furthermore, the content requested by the select users varies in its content relevance to other users in the same geographies—sometimes the same exact content as other users want to watch at that very time, sometimes the same exact content as other users want to watch at a different time, and sometimes somewhat less relevant to any other users.

Given the never-ending scarcity of, in particular, radio resources in wireless networks, unicast can become a sub-optimal, inefficient way to deliver content to users.

Hence, cellular networks introduced broadcast as a means to deliver simultaneously consumed content more efficiently. 3GPP introduced, starting with the 3G (UMTS) architecture and evolving into LTE, broadcast capability—termed as MBMS. MBMS introduced a new sub-architecture and a number of new functional components to enable broadcast delivery, using a single set of radio and network resources to deliver a stream of content to a multiplicity of users.

One of the limitations that 3GPP MBMS suffers from is that it works on "least common denominator" principle—in that it typically leverages a lower radio spectral efficiency level (measured in bits per second per hertz, or bps/Hz) that caters to the poorer-covered users. The idea behind this has been to maximize broadcast coverage. Operating at higher spectral efficiency levels would, of course, afford a radio-advantaged user a higher throughput; but this would provide little or no broadcast coverage to radio-disadvantaged users, i.e., with devices experiencing lower signal-noise/interference (SINR) conditions than needed to receive the broadcast successfully.

At the same time, in today's broadcast, no performance feedback is obtained from participating devices. Hence, the broadcast system is unable to adjust spectral efficiency, e.g., gauge that the participating devices are predominantly in strong radio conditions, and hence be able to increase spectral efficiency.

Operating broadcast in a fixed manner at such a "disadvantaged" spectral efficiency means every participant gets a low throughput. In particular, the radio-advantaged users can get sub-optimal performance. For a real-time content stream (e.g., live streaming of an event or streaming of stored video), this would necessitate delivering at a lower bitrate than ideal—which would mean a lower-quality user experience (the service may be forced to choose a lower bitrate version of the content to stream). For a non-real-time application (e.g., audio/video download, feed etc.), this would mean a longer time taken to deliver the file(s).

Another limitation inherent in today's broadcast systems is the limited ability to nimbly shift transmissions from unicast to broadcast mode, or vice versa, based on uptake, popularity, radio conditions and other parameters. 3GPP MBMS provides limited capability to do this, based on the number of users consuming content simultaneously. Given the level in the network where MBMS operates, i.e., close to the radio access layer, it becomes difficult for the system to factor popularity profiles of content assets, and hence the likelihood of high simultaneous usage of a piece of content. Equally, MBMS cannot factor in popularity profiles of content assets for future consumption, side-by-side with real-time consumption demand, in order to assess the desirability to transmit a content asset using broadcast. MBMS has little cognizance of the types of content flowing though, content titles etc., given that it functions as a transport function.

To the extent that today's systems shift transmissions between unicast and broadcast, they do so simply based on counts of users consuming the content. Transitions between unicast and broadcast modes also happen today only within a network, and "in-carrier", i.e., within a carrier frequency. In other words, transmissions are always shifted from unicast or broadcast, running over one wireless carrier frequency, to broadcast or unicast mode over the same carrier. In cellular systems like LTE, for example, the cells hosting the devices to be switched from unicast to broadcast would have been set up as a Multicast Broadcast Single Frequency Network (MBSFN), all running on one carrier frequency— enabling the served devices to leverage coordinated transmissions from multiple cells in the group to enhance coverage.

Today's broadcast schemes also do not factor in radio conditions feedback, and are unable to adjust broadcasts to "suit the audience", e.g., adjust spectral efficiency levels—or even control which users/devices have strong enough radio conditions to justify being included in a broadcast.

Today's broadcast solutions are also radio technology specific, e.g., cellular 3G/LTE/5G, and are unable to utilize an aggregation of network types to distribute broadcasts optimally, e.g., combine the use of an LTE network with an ATSC over-the-air broadcast network to distribute broadcast and unicast sessions intelligently.

Lastly, today's broadcast solutions are also "static" in their allocation of broadcast capacity across a given radio technology medium, in which case they allocate a fixed number of resources available to broadcast based on some planning decision. However, the need for broadcast capacity may be driven by the popularity of content, spectral efficiency of broadcast delivery vs unicast delivery, and various other factors, and it may be desired to set as much or as little broadcast capacity in a system with disparate radio resources as desirable, dynamically in response to the above factors, to balance available broadcast and unicast capacity in a given cell.

SUMMARY

The present disclosure provides a method for delivering data to user devices using broadcasting while taking into consideration various network parameters.

In one aspect of the disclosure, a method comprises providing a content for communication through a content distribution system having a broadcast mode and a unicast mode, determining a first number of user devices for receiving a communication of the content, determining a likelihood of consumption of the content by the first number of user devices, determining an available spectrum for communicating the content, determining a spectral efficiency for the unicast mode and the broadcast mode of the communication for each of the first number of user devices, selecting the broadcast mode or the unicast mode or both based on the first number of user devices, the likelihood of consumption of the content, the available spectrum and the spectral efficiency and communicating the content to the first number of user devices using the broadcast mode, the unicast mode or both based on selecting.

The present disclosure also concerns the following characteristics to be combined with various claims and with one or several of the other characteristics of the claims including: determining the spectral efficiency comprises determining a plurality of spectral efficiencies of a plurality of blends of the unicast mode and the broadcast mode and wherein selecting the broadcast mode or the unicast mode or both comprises selecting a blend of the plurality of blends with a highest net spectral efficiency; selecting the broadcast mode or the unicast mode or both based is performed dynamically; continually performing the steps of selecting the broadcast mode or the unicast mode or both and communicating the content to a user device, over time while the first number of user devices, the likelihood of consumption of the content, the available spectrum, or the spectral efficiency changes; determining the first number of user devices comprises determining the first number of user devices corresponding to interested users or signed-up users; determining the first number of user devices comprises determining the first number of user devices at least partially based on content provider instructions; determining the first number of user devices comprises determining the first number of user devices consuming the content in real-time; a second number of user devices wherein the second number of user devices comprise intermediate devices and further comprising storing the content in the intermediate devices, requesting, at a future time, content from a first intermediate device using a user device and communicating the content in real-time from the first intermediate device to the user device; determining the first number of user devices comprises determining the first number of user devices which are expected to consume the content in real-time at a future time; determining the first number of user devices comprises determining the first number of user devices consuming the content in real-time and are expected to consume the content in real-time at a future time; determining the likelihood of consumption of the content by the first number of user devices comprises determining actual consumption of similar content to the content; determining the likelihood of consumption comprises determining actual consumption of the content and actual consumption of similar content to the content by other users; determining the likelihood of consumption of the content comprises determining actual consumption of a prequel to the content; the content comprises a first part and a second part and wherein determining the likelihood of consumption of the content comprises determining actual consumption of the first part of the content; determining the likelihood of consumption of the content comprises determining sign-ups for similar content to the content; determining the likelihood of consumption of the content comprises determining a popularity of similar content to the content; determining the likelihood of consumption of the content comprises determining the likelihood of consumption based on collaborative filtering including wherein the content comprises a first part and a second part, determining actual consumption of the first part of the content, actual consumption of the first part of the content by other users, and actual consumption of the second part of the content by other users; determining the likelihood of consumption of the content comprises determining the likelihood of consumption based on collaborative filtering including determining actual consumption of similar content to the content, a prequel to the content, or sign-ups for similar content to the content, and determining actual consumption of the content and actual consumption of the similar content to the content, the prequel to the content, or the sign-ups for similar content to the content by other users; determining the likelihood of consumption of the content comprises determining the likelihood of consumption based on interests and tastes and demographics of users of the first number of user devices, and then determining actual consumption of other users with interests and tastes and demographics similar to the users of the first number of user devices; the content comprises a first part and a second part and wherein determining the likelihood of consumption of the content comprises determining the likelihood of consumption of the second part based on actual consumption of the first part of the content; selecting comprises determining a predicted total user value based on the first number of user devices for the content, a second number of user devices for the content, the likelihood of consumption, and selecting the broadcast mode over the unicast mode when the predicted total user value is greater than a user threshold value; selecting comprises determining a predicted total user value based on the first number of user devices for the content, a second number of potential user devices of the content, the likelihood of consumption; and wherein selecting the broadcast mode over the unicast mode when the predicted total user value is greater than a user threshold value and when a broadcasting spectral efficiency is greater than a unicast spectral efficiency for communicating to the first number of user devices; determining a network loading and selecting the broadcast mode or the unicast mode based on the network loading; determining an available capacity of a communication network and selecting broadcasting or unicasting based on the available capacity; communicating the content comprises communicating the content through a live stream; communicating the content comprises communicating the content to the user devices using a plurality of broadcast communication networks; the plurality of broadcast communication networks comprises a television network, a cable network, a cellular network or a satellite network; further comprising determining a net spectral efficiency based on a unicast aggregate throughput, a broadcast aggregate throughput, a broadcast capacity and a unicast capacity and wherein selecting the broadcast mode or the unicast mode or both is based on the net spectral efficiency based on the unicast aggregate throughput, the broadcast aggregate throughput, the broadcast capacity and a unicast capacity; determining the broadcast aggregate throughput based on a target throughput and the first number of the user devices receiving a broadcast, and determining the unicast aggregate throughput based on the target throughput and the first number of user devices receiving a unicast; selecting the broadcast mode or the unicast mode or both comprises selecting unicast mode and wherein communicating the content to the first number of user devices comprises communicating the content using the unicast mode; and further comprising, thereafter, switching from the unicast mode to the broadcast mode for at least a first group of the first number of user devices based on the first number of user devices, the likelihood of consumption of the content, and the spectral efficiency and communicating the content to the first number of user devices using the broadcast mode based on switching; communicating the content comprises communicating the content through a live stream; wherein the first number of user devices corresponds to the user devices receiving the live stream though unicasting; further comprising determining a second number of future user devices of the live stream, wherein switching from the unicast mode is also based on the second number of future user devices; wherein the spectral efficiency comprising a maximum spectral efficiency; wherein selecting the broadcast mode or the unicast mode or both comprises selecting broadcast mode for first user devices of the first number of user devices and unicast mode for second user devices of the first number of user devices, the first user devices and the second user devices forming a blend of user devices, wherein communicating the content to the first number of user devices comprises communicating the content to first user devices using the broadcast mode and the second user devices using the unicast mode; and further comprising thereafter, collecting radio metrics from the first user devices and the second user devices, determining a first net spectral efficiency for the blend of user devices, determining a second net spectral efficiency corresponding to the first user devices and the second user devices unicasting, switching the first user devices from the broadcast mode to the unicast mode when the radio metrics are below a target channel quality or the first net spectral efficiency is below the second net spectral efficiency, and communicating the content to the first user devices using the unicast mode based on switching; communicating the content to the first user devices comprises communicating the content through a live stream; communicating the content to the first number of user devices using the broadcast mode comprises communicating the content in a live stream, and further comprising requesting to join the live stream from an additional user device; communicating radio metrics of the additional user device to the content distribution system, comparing the radio metrics to a channel quality threshold, when the radio metrics exceeds the channel quality threshold communicating broadcast session data to the additional user device and joining, at the additional user device, the live stream being broadcasted; further comprising increasing net spectral efficiency of the content distribution system in response to joining the live stream; and, the radio metrics comprise at least one of a signal to noise ratio, a signal interference to noise ratio and a channel quality indicator.

In another aspect of the disclosure, a system for communicating content to user devices includes a content distribution system having a broadcast mode and a unicast mode for communicating a content. The content distribution system determines a first number of user devices for receiving a communication of the content, determining a likelihood of consumption of the content by the first number of user devices, determining an available spectrum for communicating the content, determining spectral efficiency for the unicast mode and the broadcast mode of the communication for each of the first number of user devices. The content distribution system selects the broadcast mode or the unicast mode or both based on the first number of user devices, the likelihood of consumption of the content, the available spectrum and the spectral efficiency. The content distribution system communicates the content to the user devices using the broadcast mode, the unicast mode or both based on selecting.

The present disclosure also concerns the following characteristics to be combined with various claims and with one or several of the other characteristics of the claims including: the content distribution system determines the spectral efficiency by determining a plurality of spectral efficiencies of a plurality of blends of the unicast mode and the broadcast mode and wherein selecting the broadcast mode or the unicast mode or both comprises selecting a blend of the plurality of blends with a highest net spectral efficiency; the content distribution system selects the broadcast mode or the unicast mode or both based is performed dynamically; the content distribution system continually performs selecting the broadcast mode or the unicast mode or both while communicating the content to the user device, over time while the first number of user devices, the likelihood of consumption of the content, the available spectrum, or the spectral efficiency changes; the content distribution system determines the first number of user devices by determining user devices corresponding to interested users or signed-up users; the content distribution system determines the first number of user devices by determining the first number of user devices at least partially based on content provider instructions; the content distribution system determines the first number of user devices by determining the first number of user devices consuming the content in real-time; further comprising a second number of user devices comprising intermediate devices and wherein the content distribution system stores the content in the intermediate devices, and the user device requests content from a first intermediate device at some time in the future and communicates the content in real-time from the first intermediate device to the user device; the content distribution system determines the first number of user devices by determining the first number of user devices expected to consume the content in real-time at a future time; the content distribution system determines the first number of user devices by determining the first number of user devices consuming the content in real-time and expected to consume the content in real-time at a future time; the content distribution system determines the likelihood of consumption of the content by the first number of user devices by determining actual consumption of similar content to the content; the content distribution system determines the likelihood of consumption of the content by the first number of user devices by determining actual consumption of the content and actual consumption of similar content to the content; the content distribution system determines the likelihood of consumption of the content by the first number of user devices by determining actual consumption of a prequel to the content; the content comprises a first part and a second part and wherein the content distribution system determines the likelihood of consumption of the content by determining actual consumption of the first part of the content; the content distribution system determines the likelihood of consumption of the content by the first number of user devices by determining a popularity for events similar to the content; the content distribution system determines the likelihood of consumption of the content by the first number of user devices by determining the likelihood of consumption based on collaborative filtering including wherein the content comprises a first part and a second part, determining actual consumption of the first part of the content, actual consumption of the first part of the content by other users, and actual consumption of the second part of the content by other users; the content distribution system determines the likelihood of consumption of the content by determining the likelihood of consumption based on collaborative filtering including determining actual consumption of similar content to the content, a prequel to the content, or sign-ups for similar content to the content, and determining actual consumption of the content and actual consumption of the similar content to the content, the prequel to the content, or the sign-ups for similar content to the content by other users; the content distribution system determines the likelihood of consumption of the content by the first number of user devices based on interests and tastes and demographics of users of the first number of user devices, and then determining the actual consumption of other users with interests and tastes and demographics similar to the users of the first number of user devices; the content comprises a first part and a second part and wherein the content distribution system determines the likelihood of consumption of the content by determining the likelihood of consumption of the second part based on actual consumption of the first part of the content; the content distribution system selects by determining a predicted total user value based on the first number of user devices for the content, a second number of potential user devices for the content, the likelihood of consumption and a popularity of similar events, and selecting the broadcast mode over the unicast mode when the predicted total user value is greater than a user threshold value; the content distribution system selects by determining a predicted total user value based on the first number of user devices for the content, a second number of potential user devices of the content, the likelihood of consumption of the content and a second popularity of similar events; and wherein selecting the broadcast mode over the unicast mode when the predicted total user value is greater than a user threshold value and when a broadcasting spectral efficiency is greater than a unicast spectral efficiency for communicating to the first number of user devices; the content distribution system determines a network loading and selects the broadcast mode or the unicast mode based on the network loading; the content distribution system determines an available capacity of a communication network and selects broadcasting or unicasting based on the available capacity; the content distribution system communicates the content through a live stream; the content distribution system communicates the content to the user devices using a plurality of broadcast communication networks; the plurality of broadcast communication networks comprise a television network, a cable network, a cellular network or a satellite network; the content distribution system determines a net spectral efficiency based on a unicast aggregate throughput, a broadcast aggregate throughput, a broadcast capacity and a unicast capacity and wherein selecting the broadcast mode or the unicast mode or both is based on the net spectral efficiency based on the unicast aggregate throughput, the broadcast aggregate throughput, the broadcast capacity and a unicast capacity; the content distribution system determines the broadcast aggregate throughput based on a target throughput and a number of the user devices receiving a broadcast, and determines the unicast aggregate throughput based on the target throughput and the number of user devices receiving a unicast; the content distribution system selects the broadcast mode or the unicast mode or both by communicating the content using the unicast mode and thereafter, the content distribution system switches from the unicast mode to the broadcast mode for at least a first group of the first number of user devices based on the first number of user devices, the likelihood of consumption of the content, and the spectral efficiency and communicates the content to the first group of user devices using the broadcast mode based on switching; the content distribution system communicates the content through a live stream; the first number of user devices corresponds to the user devices receiving the live stream though unicasting; further comprising determining a second number of future user devices of the live stream, wherein switching from the unicast mode is also based on the second number of future user devices; the spectral efficiency comprising a maximum spectral efficiency; the content distribution system selects broadcast mode for first user devices and unicast mode for second user devices, the first user devices and the second user devices forming a blend of user devices, wherein said content distribution system communicates the content to first user devices using the broadcast mode and the second user devices using the unicast mode, wherein said content distribution system collects radio metrics from the first user devices and the second user devices, determines a first net spectral efficiency for the blend of user devices, determines a second net spectral efficiency corresponding to the first user devices and the second user devices unicasting, switches the first user devices from the broadcast mode to the unicast mode when the radio metrics are below a target channel quality or the first net spectral efficiency is below the second net spectral efficiency and communicates the content to the first user devices using the unicast mode based on switching; the content distribution system communicates the content to the first user devices through a live stream; the content distribution system communicates the content to the first number of user devices using the broadcast comprises by communicating the content in a live stream and further comprising an additional user device requesting to join the live stream and communicating radio metrics to the content distribution system, the content distribution system comparing the radio metrics to a channel quality threshold, and when the radio metrics exceed the channel quality threshold, the content distribution system communicates broadcast session data to the additional user device, the additional user device joining the broadcasted live stream; wherein the content distribution system increasing net spectral efficiency in response to joining the live stream; and, the radio metrics comprise at least one of a signal to noise ratio, a signal interference to noise ratio and a channel quality indicator.

In yet another aspect of the disclosure, a method comprises requesting, by a first user device, content associated with a content distribution system having a broadcast mode and a unicast mode, determining a first number of user devices interested in the content, determining a first spectral efficiency for the unicast mode for the first user device, determining a group of the first number of user devices having spectral efficiencies greater than or equal to the first number of user devices, selecting the broadcast mode based on the group, the first user device and the first spectral efficiency, by communicating a broadcast enable signal to the first user device and the group, communicating the content to first user device and the first number of user devices using the broadcast mode based on selecting when a size of the group is greater than a size threshold, communicating the content to the first user device using unicast mode when the group is less than the size threshold, consuming the content in real-time at the first user device and storing the content at the first number of user devices for later consumption.

The present disclosure also concerns the following characteristics to be combined with various claims and with one or several of the other characteristics of the claims including: determining the first number of user devices comprises determining a first number of interested user devices from a wish list or signed-up user devices; determining the first number of user devices comprises determining the first number of user devices by determining an average number of sign-ups for similar content; determining the first number of user devices comprises determining the first number of user devices by determining a popularity of a prequel to the content; determining the first number of user devices comprises determining the first number of user devices by determining a popularity based on interest in similar content; determining the first number of user devices comprises determining the first number of user devices by determining a geographic area of the first number of user devices; the geographic area comprises a content genre relative to the geographic area; determining a communication network capacity and selecting the broadcast mode based on the communication network capacity; determining an available capacity of a communication network and selecting the broadcast mode based on the available capacity; determining dormant capacity of a communication network and selecting the broadcast mode based on the dormant capacity; and, communicating the content comprises communicating the content through a live stream.

In still another aspect of the disclosure a system for communicating to a first user device and a first number of user devices includes a content distribution system receiving from the first user device a request for content associated with the content distribution system having a broadcast mode and a unicast mode, the content distribution system determining the first number of user devices interested in the content, the content distribution system determining a first spectral efficiency for the unicast mode for the first user device, the content distribution system determining a group of the first number of user devices having spectral efficiencies greater than or equal to the first number of user devices, the content distribution system selecting the broadcast mode based on the group of user devices having a group size, the first user device and the first spectral efficiency, by communicating a broadcast enable signal to the first user device and the group of user devices, the content distribution system communicating the content to first user device and the first number of user devices using the broadcast mode based on selecting when a size of the group size is greater than a size threshold, communicating the content to the first user device using unicast mode when the group size is less than the size threshold, the first user device consuming the content in real-time and the first number of user devices storing the content for later consumption.

The present disclosure also concerns the following characteristics to be combined with various claims and with one or several of the other characteristics of the claims including: the first user device consumes the content in real-time, and the first number of user devices store the content at the first number user devices for later consumption; the content distribution system determines the first number of user devices based on interested users, a wish list or signed-up users; the content distribution system determines the first number of user devices based on an average number of sign-ups for similar past live streams; the content distribution system determines the first number of user devices based on a popularity of a prequel to the content; the content distribution system determines the first number of user devices based on a popularity based on interest in similar content; the content distribution system determines the first number of user devices based on the first number of user devices by determining geographic areas of the first number of user devices; the geographic areas comprise content genres relative to the geographic areas; determining a communication network capacity and selecting the broadcast mode based on the communication network capacity; the content distribution system determines an available capacity of a communication network and selects the broadcast mode based on the available capacity; and the content distribution system determines dormant capacity of a communication network and selects the broadcast mode based on the dormant capacity.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
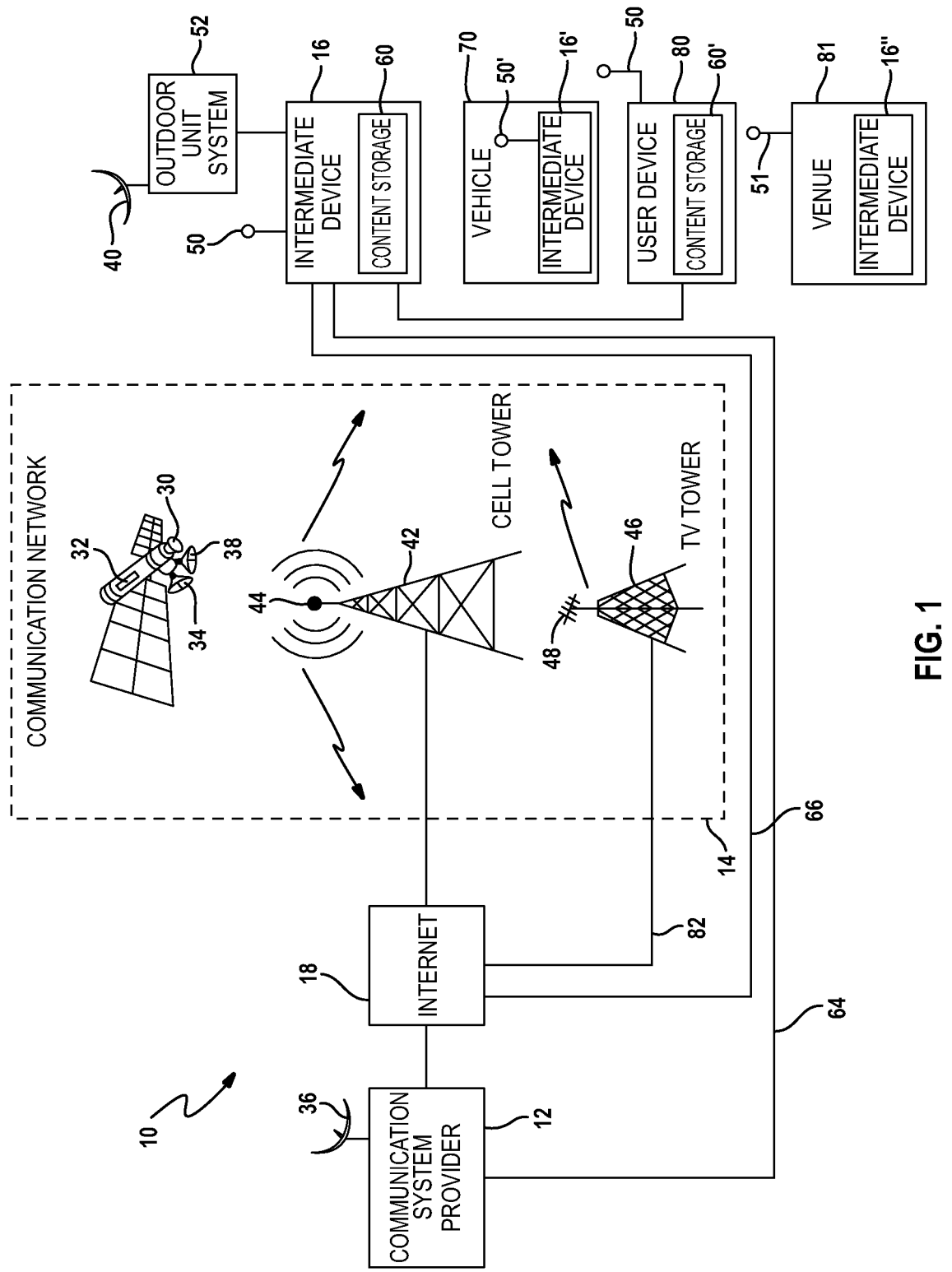
FIG. 1 is a high-level block diagrammatic view of a first example of a communication system.

The following description is merely exemplary in nature and is not intended to limit the present disclosure, application, or uses. For purposes of clarity, the same reference numbers will be used in the drawings to identify similar elements. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality. As used herein, the phrase at least one of A, B, and C should be construed to mean a logical (A or B or C), using a non-exclusive logical OR. It should be understood that steps within a method may be executed in different order without altering the principles of the present disclosure. The teachings of the present disclosure can be implemented in a system for electronically communicating content to an end user or user device. Both the data source and the user device may be formed using a general computing device having a memory or other data storage for incoming and outgoing data. The memory may comprise but is not limited to a hard drive, FLASH, RAM, PROM, EEPROM, ROM phase-change memory or other discrete memory components.

Each general purpose computing device may be implemented electronically in analog circuitry, digital circuitry or combinations thereof. Further, the computing device may include a microprocessor or microcontroller that is programmed to perform instructions (instruction signals) to carry out the steps performed by the various system components. A content or service provider is also described. A content or service provider is a provider of data to the end user. The service provider, for example, may provide data corresponding to the content such as metadata as well as the actual content in a data stream or signal. The content distribution system, service provider and end user devices may include a general purpose computing device, communication components, network interfaces and other associated circuitry to allow communication with various other devices in the system.

Further, while the following disclosure is made with respect to the delivery of video (e.g., television (TV), movies, music videos, etc.), it should be understood that the systems and methods disclosed herein could also be used for delivery of any media data and content type, for example, audio, music, data files, web pages, advertising, software, software updates, IoT data, weather, application, application data, "best of web" content, e-delivery of materials, etc. Additionally, throughout this disclosure reference is made to data, content, information, programs, movie trailers, movies, advertising, assets, video data, etc., however, it will be readily apparent to persons of ordinary skill in the art that the terms are substantially equivalent in reference to the example systems and/or methods disclosed herein.

While the following disclosure is made with specific broadcast services and network systems, it should be understood that many other delivery systems are readily applicable to disclosed systems and methods. Such systems include wireless terrestrial distribution systems, wired or cable distribution systems, cable television distribution systems, Ultra High Frequency (UHF)/Very High Frequency (VHF) radio frequency systems or other terrestrial broadcast systems (e.g., Multi-channel Multi-point distribution system 710 (MMDS), Local Multi-point distribution system 710 (LMDS), etc.), Internet-based distribution systems, or mobile distribution systems, power-line broadcast systems, any point-to-point and/or multicast Internet Protocol (IP) delivery network, and fiber optic networks. Further, the different functions collectively allocated among a service provider, user devices and intermediate devices as described below can be reallocated as desired without departing from the intended scope of the present disclosure.

User devices and intermediate devices may be coupled to the Internet through a constrained network or not even coupled to the Internet at all. In a constrained network, the speed or available resources may not be sufficient to provide a quality level of service. In the present examples, dormant capacity of the constrained network or a second less constrained network may be used to pre-position content at an intermediate device or a user device. The pre-positioned content may then be provided from intermediate device storage directly or through a second communication network (i.e., local network) when demanded at the user device for real-time consumption, without having to rely on using the constrained network for that real-time consumption. In certain instances, the word "user" is used interchangeably with a device associated with a user (a user device) since each user has a user device associated therewith. The intermediate devices may also be referred a user device. That is, functions of the intermediate device such as storage for later content consumption may be incorporated into the user device.

Dormant capacity is a resource or a plurality of resources that are not being used for transmitting data or content by a content system provider during regular customer use. Capacity may refer to the amount of bandwidth or spectrum available. Regular use of a communication network for primary customers may be referred to as a primary use. Dormant capacity may be referred to as a secondary use and may be governed between agreements between a content provider and a communication system provider. The content provider may wish to provide a service to users using the dormant capacity. Users may not be aware of the path the content traverses. The use of resources for the dormant capacity has a lower priority that can be allocated to another for a higher priority use. In the simplest sense, dormant capacity is a data path or bandwidth that is increasingly left unutilized during non-peak times of network use. Inversely, there is limited dormant capacity available during the peak times of network use. In all cases, such peak time of network use is characterized as the time when most of the usage of the services offered by the network is taking place by the network's users or direct customers. The non-peak time is the time when the least usage of the services is taking place by their users. For example, in a long-term evolution wireless network (LTE) system, dormant capacity may be the bandwidth not being used for voice or data content requested from users in real-time. In the cases of "spectrum re-use," capacity used by some users for real-time consumption of some content during peak times, may leave dormant capacity at the same time as capacity that is either unusable by other users for real-time consumption of other content or only usable by other users for real-time consumption of the same content, if that content is broadcasted instead of unicasted. In the case of "network re-use," capacity used by some users for real-time consumption of content may leave dormant capacity that is not demanded by other users. In a satellite system, the dormant capacity is the bandwidth not being used for broadcasting of content to users for the sake of real-time consumption of such content or for voice or data content requested from users in real-time and may similarly be under-utilized as in wireless network systems. There is a very limited incremental cost for utilizing this dormant capacity, or the unused or under-used resources of a communication provider's network, as that cost is already being borne for the provision of regular customer use services, and as such offers means for highly cost-effective content distribution. By utilizing the dormant capacity that would otherwise be wasted, the present system allows communication system providers to use it to offer other services to customers or to sell the capacity to others.

The dormant capacity may be used in various ways by intercommunication of the intermediate devices, the communication system provider, and the content service provider. In the cases of "spectrum re-use", there have been many efforts to generate additional parallel uses of the same spectrum for real-time consumption by multiple users, using the same spectrum. However, utilizing dormant capacity, an almost infinitely high (as far as the number of users benefitting) amount of re-use can be generated by simply broadcasting this content, instead of unicasting it, and by having some users use it for real-time consumption, and for the dormant capacity to be used for non-real-time consumption by storing this same content at other intermediate storage devices at this same time, and then accessed by other users during a different time in the future, directly or using other communication networks, which may also be less constrained than the network described herein. Further, in the cases of "network re-use", today this dormant capacity goes largely unutilized as operators have had a challenging time of incentivizing "changes in user behavior" to use the network more during "off-peak" times than they otherwise would like for real-time consumption—the benefit to consumers of using the network during peak times for real-time consumption instead of during off-peak times, far outweigh any incentives or benefits which the operators can pass on to the consumers to shift their real-time consumption. However, such dormant capacity can be used in-full for non-real-time consumption, by unicasting or broadcasting content using dormant capacity and by storing this content at other intermediate storage devices, and then accessed by other users during a different time in the future, directly or using other communication networks, which may be less constrained than the network described herein.

Queries as to the current availability of capacity and the upcoming availability of capacity, including real-time consumptions and the remaining capacity, may be formed in order to identify the availability of dormant capacity. Further, Quality of service (QoS) prioritization using evolved multimedia broadcast and multicast services (eMBMS) quality class identifiers, as well as quality-of-service class identifiers (QCIs) used in any wireless or other communication system, may be performed, providing higher QCI levels to traffic for real-time consumption, while leaving traffic for non-real-time consumption on lower QCI levels, effectively rendering it to use of dormant capacity only.

Prioritization of content to be communicated using the dormant capacity may be formed. Delivery of content using dormant capacity may be queue-driven. All of the content to be delivered may be placed into the queue with attributed priority levels for each portion of content, and then served from the queue automatically upon dormant capacity availability, coordinating which content is served in which sequence per what rule. Content may also be retransmitted using dormant capacity. User preferences (queuing), missing content (error correction), content most popular for some users (personalization), likelihood of consumption, content most popular for most users (popularity or short-tail optimization), as well as the remainder of content may all be used in prioritizing within queues.

The present system provides a high-capacity broadcast delivery system or a targeted unicast delivery system for pre-positioning content, that combines the strategic use of excess capacity or dormant capacity in a content communication network with pre-positioning content close to the users by caching and storage of such content at local content stores, to allow users to access a large amount of content such as over-the-top (OTT) content, software updates, or other highly intensive data applications without needing to traverse the content communication network at the time the content is desired. This system may use the dormant capacity of a system over the same exact spectrum (in the case of spectrum re-use) as real-time consumption by broadcasting content to users including to those requesting it for real-time consumption and to others using the dormant spectrum capacity for pre-positioning, instead of just unicasting it to only the users requesting it for real-time consumption, or over dormant capacity left-over from non-peak-use of networks for real-time consumption, by unicasting or broadcasting content for pre-positioning. As will be further described below, the system may use dormant capacity of different types of communication systems including but not limited to mobile or cellular systems such as an LTE system, a satellite system or a digital television system. Content such as video content may be provided to an intermediate device, which stores the content therein. When users request content for real-time consumption, the content may be provided from the stored or cached content store, rather than requiring that content to be served by the content communication network in response to users' requests and subjecting users to slow speeds of the constrained content communication network or from further burdening the content communication network. A wide variety of video programming including movies, television, shows, documentaries and news may be provided based upon user preferences. Also, other types of video programming such as instant replays may also be provided to users. The system may also be used to provide software and application updates for various types of users that are coupled to the intermediate device. The system may also be used for defense purposes or purposes in which high amounts of data are required, but whereas such data may be pre-positioned at the local content store by the content communication network and not be required to be delivered from the source of such data on a live or real-time basis.

The system is particularly suitable for rural customers, customers in markets with lower speed, lower capacity networks, or customers of companies that want to utilize their lower speed networks to offer an equivalent of high-speed cable or fiber network offerings, to have access to large data, over-the-top services or other large data applications. Specifically, the system may also allow non-rural or other customers to use wireless, satellite, TV, or DSL or other wired networks to effectively meet their content demands, without the need for an additional high-speed cable or fiber network offering. Thus, large data content, including over-the-top content (OTT) video, software updates, and other large data, may be offloaded to be served by the present system while the lower speed content communication network serves users' real-time/live voice and data requests, that cannot be pre-positioned effectively, using peak or regular capacity, and thus the need for high-speed cable or fiber network offerings within the home may be eliminated so that expenses may be reduced. The system may also allow congestion on even high-speed cable and fiber networks, or any of the aforementioned networks, to be alleviated by combining content delivery through pre-positioning using the dormant capacity and subsequent use from local content stores and by serving users' real-time/live voice and data requests, that cannot be pre-positioned effectively, using peak or regular capacity, in a unified system. Further, this system may also increase the effective capacity of broadband networks by using a much greater portion, or the entirety, of a content communication network's capacity, by using the combination of dormant capacity for pre-positioning of content and subsequent use from local content stores, and peak or regular capacity for serving users' real-time/live voice and data requests. If content that is likely to be consumed by the user is pre-positioned at the local content store, or the intermediate device, and then served from the intermediate device, the need to instead use the content communication network on a real-time/live request basis is reduced, especially in peak hours. Pre-positioning of large data, including over-the-top video and software updates, frees the capacity of mobile and fixed broadband networks for other real-time content requests, real-time two-way communications, or other live content consumption, especially during peak times. By combining a pre-positioning, dormant capacity approach with a real-time voice and data request, peak or regular capacity approaches, lower speed broadband service providers may compete head-to-head with established cable or fiber providers while any of the aforementioned networks improve their performance such as net spectral efficiency) by leveraging such a combination of approaches.

It is also desired for a system to be able to serve users requests from a first user for real-time consumption, using broadcast transmissions, not only when there are other users desiring the same content for real-time consumption (like in the case of the mode described in eMBMS), but also when there are other users who may desire this content for non-real-time consumption, in order to store this same content as in the first user's request in intermediate storage and then to access this content for real-time consumption but in the future, at a later time. When a first user requests to access content, instead of serving that first user's request using a unicast transmission, the system can instead serve that first user's request using a broadcast transmission, allowing that first user and any other user, desiring to access that content for real-time consumption, to real-time consume that content; while at the same time, the dormant broadcast transmissions to be able to be received by devices of any and all other users addressable by the broadcast transmission for non-real-time consumption, to store such content in those devices and for such any and all other users to access such content directly from their devices for real-time consumption at some later time.

The system could further make determinations of when it is advantageous to serve a given first user's request using a unicast transmission, as unicast transmissions are today higher throughput and have higher spectral efficiencies than broadcast transmissions on the order of 50-1,000%, and when it is advantageous to instead serve such first user's request using a broadcast transmission, where even though a broadcast transmission may be 50-1,000% disadvantaged in throughput and spectral efficiency than a unicast transmission, there are more than 50-1,000% more users than the first user which would benefit from having this request be received and stored by their devices for non-real-time consumption, and accessed for real-time consumption at a future time. This could involve analysis of not just how many users may benefit, but the likelihood of how many users may benefit based on analysis of their usage preferences, the likelihood of consumption, the popularity of the content in the request, and the likelihood that the cost of serving those users using unicast transmissions at a future time will be greater than the cost of using a broadcast transmission vs a unicast transmission at the current time.

Further, such system could also include a mechanism for determining whether any given device should receive the dormant capacity broadcast and store the data for non-real-time consumption, or if it should simply let it pass by. This determination could be based on its current available storage, the content already stored on that device for non-real-time consumption, and the content scheduled to be delivered to that device for non-real-time consumption, and the relative value of such opportunistic broadcast data and the cost of receiving it and storing it versus the value of the content already stored on that device or scheduled to be delivered to that device for non-real-time consumption.

For example, a first user desires to watch a movie #1, which is a relatively popular film, and requests it to be delivered for real-time consumption. The system analyzes that only 10% of the users in the same area as the first user, have movie #1 already stored on their devices for non-real-time consumption, but that of the remaining 90% of the users, 70% of those 90% or 63% would have a high likelihood of consuming movie #1 at a future time if it was stored on their devices for non-real-time consumption. The system serves movie #1 to the first user using a broadcast transmission instead of a unicast transmission, while having the other 63% of the users in the area as the first user receive the dormant broadcast transmission and store movie #1 for non-real-time consumption by the 63% of the users. In the future, some of the users whose devices stored movie #1 for non-real-time consumption, request to watch movie #1 at some future times, and movie #1 is served to them directly from their devices instead of using the network.

In the present example, optimized usage of a multiplicity of resource types (storage, computing, networking), based on cost, performance and demand requirements is set forth. Traditionally, systems have looked at these resource types individually and one-dimensionally. For example, radio resource management focuses on optimal usage of RF resources based on service requirements, contentions between competing requirements and user Service Level Agreements (SLAs). Another individual resource typically considered is the management of fixed network resources, e.g., Software Defined Network (SDN) style approaches. Storage and compute management and cloud-based architectures have been considered individually.

In the present example a cohesive, a combinatorial use of such a diverse set of resources to facilitate cost-effective, performance-optimized delivery of content, based on user needs and demand patterns is provided.

While existing systems look to leverage in-network compute, storage and networking resources in a traditional cloud framework, this disclosure extends the concept to a "System as a Cloud" model—wherein resources (compute, storage and networking) can be interchangeably assigned and arbitraged across the entire system, including but not limited to the traditional cloud 13 processing and storage farms in the network core, wireless core network components and gateways, network edge nodes—such as base stations, access points/routers, small cells, cable edge boxes (e.g. CMTS), and the like, intermediate storage/caching devices, in the network or in the home or office, end user devices, e.g., smartphones, tablets, personal computers, and the like. This may include using the available storage of mobile devices as intermediate devices for non-real-time consumption, by applications of those mobile devices. This may also include using the available storage of the mobile devices for non-real-time consumption, by applications of other mobile devices completely separate from the first mobile devices. The present example determines, at any given time, the optimal combination of resources, across the entire system, to deliver content based on cost, performance (net spectral efficiency) and user demand considerations.

In the present system, wireless networking is used to enable orchestrated content distribution over a fabric of unicast and broadcast transmissions though one or more communication networks. A cohesive group of mechanisms is designed to enable optimal real-time and non-real-time content delivery, leveraging a continuum of broadcast and unicast delivery schemes in a coordinated manner, over any type of network available to the service provider. The system views any content transmission as a potential unicast or broadcast transmission and makes continual decisions on choice of transmission mode. The dynamic blending of unicast and broadcast deliveries creates a "breathing" apparatus, where the decision to broadcast or unicast a transmission is continually evaluated in view of various user device conditions and network conditions. Blending refers to determining the transmission modes of communication through which various devices receive content. The blend may be established as using all broadcast as the mode, all unicast as the mode or some devices using broadcast mode and some devices using unicast mode. Various conditions in the blend determination may be taken into consideration. The conditions include but are not limited to user device conditions and network conditions such as user behavior, actual consumption and likelihood of consumption or a content popularity metric, spectral efficiency of each transmission choice, available capacity in all accessible networks, network loading levels and the criticality of fulfilling real-time versus prepositioned requirements.

The content distribution system or distribution system leverages the right mix of devices using unicast mode and broadcast mode transmissions through the wireless network to cover communicating content to the user devices efficiently relative to the network loading (with optimal use of radio resources), while delivering an optimal quality of user experience.

The delivery set forth herein is performed for a variety of delivery and consumption scenarios. For example, content delivery may be performed for live streaming. Live streaming is when multiple users view (consume) the live stream in real-time (at the same time). Some devices may also receive the live stream as part of content pre-positioning or caching for future real-time consumption from the cached location. Real-time content delivery, e.g., audio and video streaming, with an opportunistic broadcast. Real-time consumption by one user, with content pre-positioning or caching for future real-time consumption for any of the rest of the users. One example is set forth in U.S. Pat. No. 1,115,705 and is entitled "Method and System for Providing Non-Real-Time Content Distribution Services," the disclosure of which is incorporated by reference herein. Other use cases are for non-real-time consumption scenarios where content is pre-positioned or cached for future real-time consumption by users.

At the same time, the distribution system uses the most suitable network to deliver its content through, taking into account the capabilities of the networks it has access to, and the cost of delivering through each network. All of this is done "over-the-top", i.e., at the content distribution layer, which works above the IP layer. In contrast to the more transport-layer schemes adopted by wireless networks, this approach enables the system to be cognizant of application/content level popularity, usage and delivery success characteristics. The distribution system is far more aware of aspects like the assets it is delivering, device consumption patterns with response to these assets, asset popularity levels, etc. than traditional broadcast functionalities that sit at the transport layer and are simply purveyors of this content.

By gathering performance (spectral efficiency) feedback or collecting radio metrics from devices, the distribution system is further able to adjust its decisions on delivery mode to be used (broadcast vs. unicast). For example, the broadcast mode may be enabled if the distribution system 710 determines there are sufficient participating devices experiencing radio conditions better than a radio quality threshold value (or simply threshold). Additional users can be pulled into the broadcast segment of an ongoing transmission, if those devices exhibit radio conditions better than the radio quality threshold. In this manner, the system always selects the most spectrally efficient mode of delivery. One consideration in the selection of the most spectrally efficient mode is the consumption pattern. The consumption pattern may include how many user devices need something now, how many user devices are predicted to need the content in the future, and how much cache do they have to store the content.

Another performance consideration is spectral efficiency. A comparative spectral efficiency of delivering content via unicast or broadcast is performed. Further, a comparative spectral efficiency of delivering content using different blends of unicast and broadcast may also be performed using different proportions of available capacity for broadcast and unicast, and accommodating different sizes of user groups for broadcast and unicast. Lastly, the relative "rigidity" of unicast vs. broadcast in precluding support of real-time traffic in a sufficiently dynamic manner. Further details are provided below.

Referring now to FIG. 1, a high-level block diagrammatic view of a communication system 10 is set forth. In this example, a communication system provider 12 is a system that is in communication with a communication network 14 and controls the operation of the communication network 14. The communication network 14 is in communication with one or more intermediate devices such as an intermediate device 16. The communication network 14 may be in direct connection with the communication provider or to the internet 18. The communication system provider 12 controls the schedule and placement of content through the communication network 14. The communication system provider 12 may receive content from various sources as will be described further below.

The communication network 14 is in communication with the internet 18. The communication network 14 may be a single stand-alone network or may be a combination of different networks or even different types of networks. That is, the network capacity of one or more networks may be combined deliver content to the intermediate device 16 or user device 80. The communication network 14 may be wireless. The communication network 14 for communicating content to the intermediate device 16 or user device 80 may include a satellite 30 that has one or more transponders 32 therein for receiving and communicating content therefrom. The satellite 30 may also include a receiving antenna 34 that is in communication with an antenna 36 of the communication system provider. A transmitting antenna 38 communicates content to an antenna 40 of the intermediate device 16 or user device 80. The antennas 34, 36, 38 may represent multiple antennas or multiple types of antennas. The satellite components may be referred to as a satellite network.

The communication network 14 may also include a cell tower 42, or any other wireless transmission device, having an antenna 44 (or antennas) thereon. The antenna 44 may represent a cellular antenna, a Wi-Fi antenna, or any other wireless transmission antenna of the cell tower 42 and may communicate content wirelessly to the intermediate device 16 through the antenna 44, from the communication system provider 12, including also wirelessly through the antenna 44.

The communication network 14 may also include a television network comprising a television tower 46 having an antenna 48 thereon. The TV tower 46 may communicate content to the intermediate device 16 or user device 80 from the communication system provider 12.

The communication network 14 may communicate using real-time capacity, dormant capacity, or a combination of both as will be further described below. The dormant capacity may include various types of resources that are not being used for serving users' real-time/live voice and data requests and their real-time/live voice and data consumption, and that are more ideally used for pre-positioning of content to the intermediate device 16 or user device 80. As mentioned above, the communication network 14 may effectively distribute (pre-position) content on real-time or a non-real-time basis to the intermediate device 16 or user device 80, for subsequent consumption by users directly from the intermediate device 16 or user device 80 instead of from the communication network 14. The communication network 14 may use a combination of broadcasting and unicasting for communicating content for real-time use.

The communication network 14 may communicate with the local area network 310, which would in turn communicate the content to the intermediate device 16 or user device 80, or the intermediate device 16 or user device 80 directly, using various types of access systems so that a maximum amount of content may be provided to the various intermediate devices. or user device 80. For example, the communication network 14 may use frequency division multiple access, timed division multiple access, spatial division multiple access, code division multiple access and orthogonal frequency division multiple access. Depending upon the requirements of the system and the types of systems provided, different types of access protocols may be used. As mentioned above, functions of the intermediate device may be included in a user device and therefore the intermediate device may be referred to as a user device.

The intermediate device 16 or user device 80 may also have an antenna 50 disposed thereon. The antenna 50 may communicate with the antenna 44 and the antenna 48 of the communication network 14. By making the intermediate device portable, the antenna 50 may be placed in a position of high reception. The intermediate device 16 may act as a small cell.

An antenna 40 of an outdoor unit system 52 may be used to communicate with the antenna 38 of the satellite 30. The antenna 40 may be a flat faced phased-array antenna. Details of the outdoor unit system 52 and the intermediate device 16 are provided below.

The intermediate device 16 may also include a content storage 60. The content storage 60 may include a solid-state content storage (memory), a hard disk drive or a combination of both. The content storage 60 may be designed to hold a substantive amount of data on the order of multiple terabytes or greater. The content storage 60 is used to store pre-positioned content received through either the antenna 40 or the antenna 50. The intermediate device 16 may also be in communication with a back haul network 64. The back haul network 64 may be part of the communication network, which, as demonstrated, is presented as wireless systems. The back haul network 64 may be a wireless network as well. Content storage 60' may also be incorporated into the user device 80.

The system 10 may be suitable for both prepositioning content and distributing in real-time live or stored content using a wired network 66 as well. That is, the intermediate device 16 or user device 80 may also be coupled to the Internet 18 through the wired network 66. Content may be prepositioned using the dormant capacity of the wired network 66 as will be described below. The wired networks may be a DSL network, a cable network, or a fiber network.

The communication network 14 may also be in communication with a vehicle 70. The vehicle 70 may include an intermediate device 16' configured in the same manner as that of the intermediate device 16. The vehicle 70 may include various types of vehicles including an automobile, a ship, a bus, a train, an airplane or the like. The intermediate device 16' is coupled to one or more antennas 50' that may be located on the exterior of the vehicle. Of course, the antennas 50' may be located within the vehicle 70 at the intermediate device 16'. A user device 80 is in communication with the intermediate device 16. For convenience, a line representing either a wireless or wired connection is presented between the user device 80 and the intermediate device 16. The user device 80 requests content from the intermediate device 16 and, more particularly, from the content storage 60 of the intermediate device 16. A venue 81 such as a stadium, office building, hotel or multiple dwelling unit may have an intermediate device 16" with an exterior antenna 51 in communication with the satellite antenna 38, the antenna of the cell tower 42 and/or the antenna 48 of the TV tower.

The cell tower 42 may use LTE technology or other cellular technology. In particular, the cell tower 42 may use LTE-B technology to communicate with the intermediate device 16 or user device 80. A wired connection 82 may be disposed between the communication network 14 and the internet 18 and/or communication system provider 12. As will be described below, the intermediate device 16 may be part of the cell tower 42 and thus the antenna 44 may act as a Wi-Fi or WiMAX antenna for communicating with the user devices.

The connection between the communication network 14 and the internet 18 or the communication system provider 12 may also include dormant capacity. This dormant capacity may be utilized by the system in a similar way as the afore described dormant capacity, to distribute pre-positioned content to the communication network 14 or to the internet 18, for their in-turn distribution of the pre-positioned content, including using dormant capacity, to ultimately reach the intermediate device 16.

More than one of the systems and devices illustrated in FIG. 1 may be incorporated into a system. In fact, more than one system or device is likely whereby it encompasses a broad geographic area.

Figure 2:
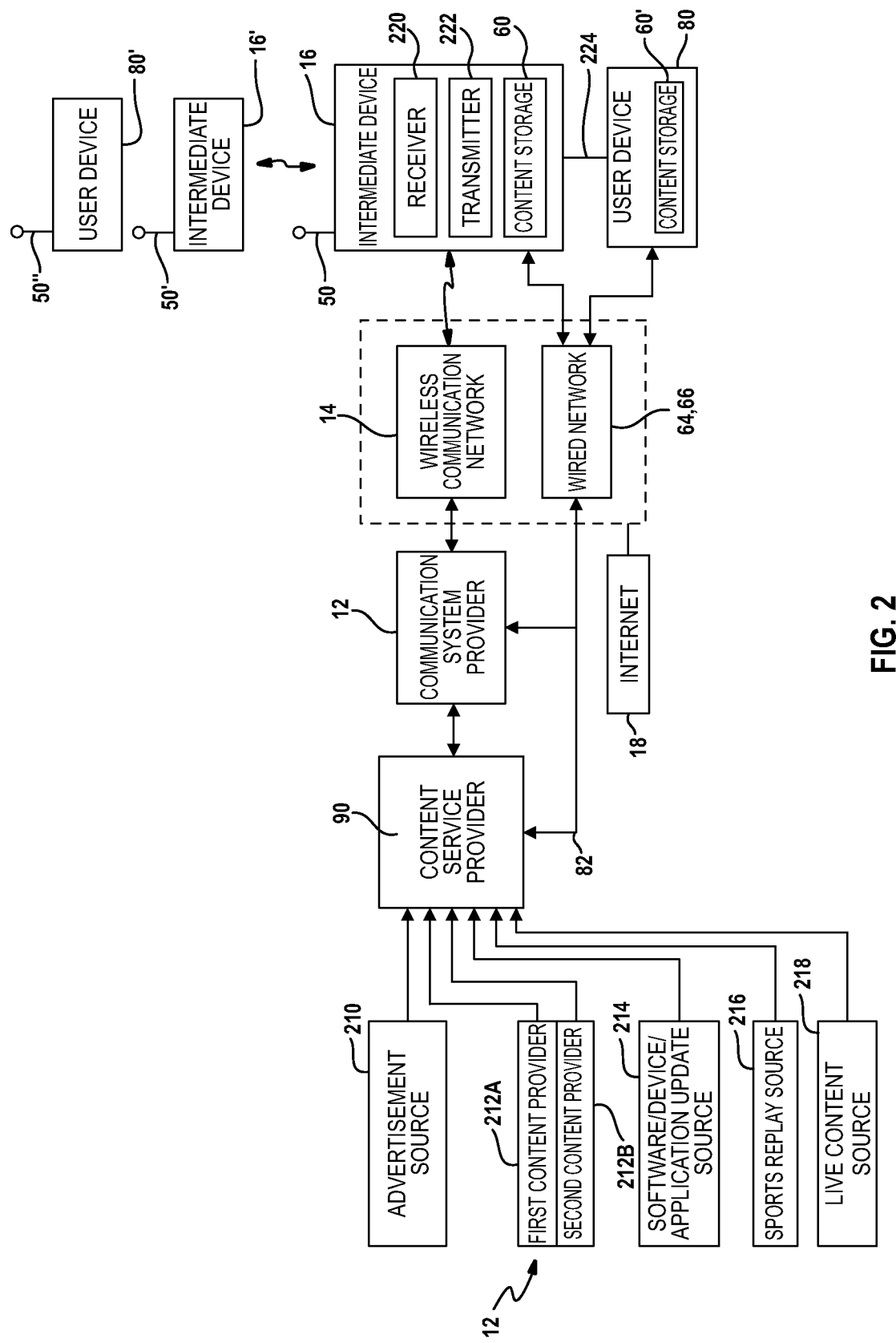
FIG. 2 is a block diagrammatic view of a more detailed communication system of FIG. 1.

Referring now to FIG. 2, the communication system provider 12 may be more than one entity. The communication system provider is shown in the first content provider 212A, the second content provider 212B communication with a content service provider 90. The content service provider 90 is a system that is used for providing content to the communication system provider 12. The content service provider 90 and the communication system provider 12 may be business entities. The content service provider 90 may purchase the dormant capacity of the communication system provider 12. The content service provider 90 may be a service provider that is subscribed to by the users of the user device 80. However, the content service provider 90 may include pre-existing services such as mobile phone service providers, cable providers, digital television providers and the like. The content service provider 90 communicates various instructions to the communication system provider 12 so that the content is distributed in a desirable way. In one example, stored content is communicated with bit rate data or metadata corresponding to the speed the content is recorded or to be played out so that the desired communication speed for real-time consumption is provided. By the communication system provider 12. Details of the intercommunication between the systems are described in further detail below.

The content service provider 90 may receive content from various sources including an advertisement source 210, the first content provider 212A, the second content provider 212B, a software/device/application update source 214, a sport replay source 216 and a live content source. The advertisement source 210 may communicate advertisements to the content service provider 90. The advertisements may include video, audio and metadata associated therewith. The metadata associated with an advertisement may include desired targets for which users would find the content desirable. Metadata may also include and a product definition.

The content providers 212A and 212B may also provide video and audio content as well as metadata for the content. The metadata may include the content title, actors or actresses, and various other identifying data including various categories such as genres and the like. The content may be requested from the content providers or indicated to be pre-positioned at the intermediate devices by the content providers.

The software/device/application update source 214 may provide new software, software updates, device updates and application updates to the intermediate device 16 through the content service provider 90 and the communication system provider 12, intended for the user device. The updates may be incremental changes to software resident in a user device, whereas the new software may be software not currently within the user device or intermediate device 16. The software and updates may be requested by a device for non-real-time delivery or delivered through no action of the device and pre-positioned at the intermediate device based on the identity of the user device, the software or the applications residing thereon.

The sports replay source 216 may provide sports replays to the content service provider 90 for distribution to the intermediate device 16. The sports replay content may be short video clips of certain special or important events of a game or match. Sports replays may be clips that include both audio and video content. The sports replay may also include metadata that identifies the team, the players involved, the sport, the clip or replay display title and the like. The clip display title is what may be displayed to a user in a user interface.

A live content source 218 may also be included with in the system 10. The live content source 218 may provide live or real-time content that is broadcasted by the system. Real-time or live content may also be unicasted. The live content is communicated in a live content stream and has various characteristics including a playout bit rate. The live content stream may be played back or viewed in real-time at various user devices or intermediate devices. As will be described below, other devices may receive a unicast of the live content as well. Preferably, the content or stream can be communicated with at least the bit rate at playout. Details of a mix of broadcast and unicast for communicating content is described in detail below.

The content providers 212A, 212B, the sports replay source 216 and the live content source may also provide data or instructions to communicate certain content to specified devices. Metadata included with the various types of content described above allows the content to be distributed to the proper intermediate device, intermediate devices or user device 80 on the right schedule while accommodating any other content distribution priorities while using the dormant capacity of the communication network under the control of the communication system provider 12.

The intermediate device 16 is illustrated having content storage 60 and also a receiver 220. The receiver 220 may be used to receive communications from the wireless communication network 14. A transmitter 222 may be used to transmit wirelessly or by wire to and from the wireless communication network 14, the wired network 64 and/or the wired network 66.

The user device 80 is illustrated having a direct or wired connection 224 with the intermediate device 16 or a direct or wired connection with the networks 14, 64,66. The intermediate device 16 may thus be a dongle or other type of directly connected device to the user device 80. The wired connection 224 may be an HDMI or USB connection.

More than one intermediate device may be disposed in a system. The intermediate device 16 may also communicate with a second intermediate device 16'. The intermediate device 16' may be configured in the same manner as that of the intermediate device 16. The intermediate device 16 may communicate from the antenna 50 to the antenna 50' of the intermediate device 16'. The intermediate devices 16, 16' may form a peer-to-peer network, which is described in more detail below. Of course, more than two intermediate devices may form a peer-to-peer network. The peer-to-peer network may communicate various types of content therebetween. That is, if one intermediate device misses a portion of a content transmitted from the wireless communication network 14, another intermediate device may be queried to determine whether the intermediate device includes the missing content. The missing content may thus be communicated in a peer-to-peer basis between the antennas 50 and 50'. The wireless communication network 14 may also distribute various portions of the content that are then communicated to various other intermediate devices in an intentional way rather than a "missing" way. If content is desired by the user of one intermediate device but is not available at that intermediate device, the intermediate device for the intentional request may request the content from another intermediate device within the peer-to-peer network. Further, some such intermediate devices 16' may be configured to not have an ability to receive content from wireless communication network 14, and only be able to communicate with other intermediate devices 16 and 16' to receive such "intentional" or "missing" content.

The intermediate device 16' may be in communication with a user device 80'. The user device 80' may be in communication with the intermediate device 16' through the antenna 50". The user device 80' may be configured in a similar manner to that set forth at the user device 80' but may be a wireless device rather than a wired connection as is illustrated with respect to the user device 80.

Figure 3:
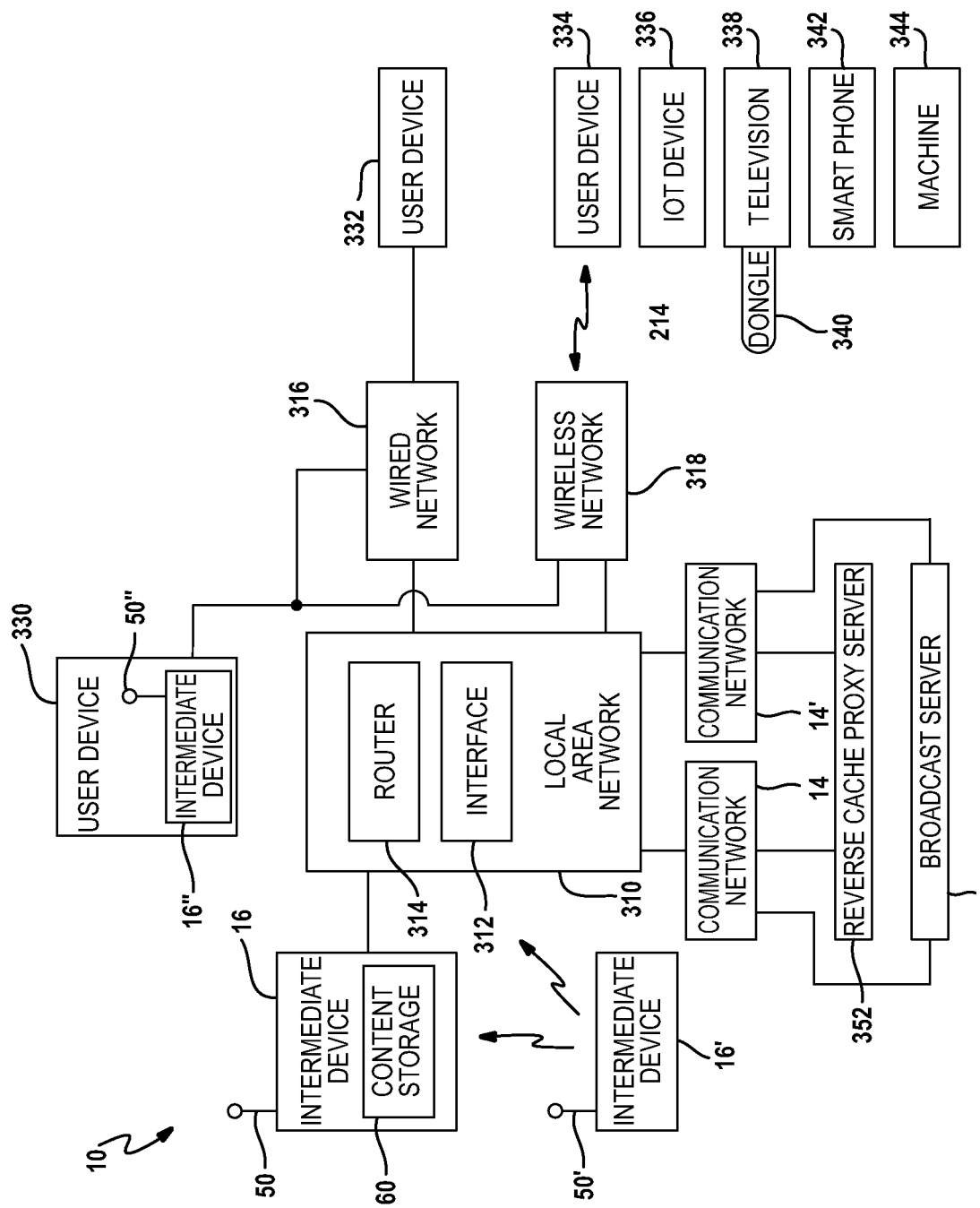
FIG. 3 is a block diagrammatic view of a plurality of user devices in a local area network.

Referring now to FIG. 3, the communication system provider 12 may be in communication with a local area network 310 through the communication networks 14, 14' as described above. Only the communication networks 14 and 14' are illustrated for simplicity even though more may be a part of a system. FIGS. 1 and 2 do not illustrate the local area network 310. The local area network 310 may have an interface 312 for communicating with the communication networks 14, 14'. The interface 312 may be a modem.

The local area network 310 may also be coupled to the second communication network 14'. The second network 14' may be the primary two-way connection to the Internet for the user devices 332-344. The second network 14' may represent dial-up or a digital subscriber line. As described in the examples set forth herein, the system 10 may be used to pre-position content in the intermediate device 16 or a user device 332-344. The supplementation of content is particularly useful when the second communication network 14' for providing regular internet service to the user devices 332-344 is slower than the speed of the communication network 14, although not necessarily. It is possible that the local area network 310 may not have a two-way connection to the internet except the prepositioned content received through the communication system.

The local area network 310 may also include a router 314. The router 314 may be used for connecting the intermediate devices with user devices within the local area network 310. The local area network may provide both a wired network 316 and a wireless network 318. Various devices may take advantage of each method of communicating.

The local area network 310 is in communication with one or more intermediate devices 16 as described above. The local area network 310 may also include an intermediate device 16, along with an interface 312, and a router 314. The local area network 310 may also include a user device 332, along with an intermediate device 16, interface 312, and a router 314. The intermediate device 16 includes the content storage 60 and the antenna 50 as described in FIGS. 1 and 2. The intermediate device 16' is in communication with the local area network 310 and may exchange content or other signals with the intermediate device 16 through the local area network 310. An intermediate device 16" may also be located within a user device 330. The user device 330 or the intermediate device 16" therein may include an antenna 50" for communicating with the local area network 310. The intermediate device 16" may receive content using the dormant capacity of the communication network 14. The user device 330 may be one of a variety of types of devices including a video game console, a cellular phone, a set top box or the like.

The user device 330 may be coupled to the local area network 310 through either the wired network 316 or the wireless network 318.

A user device 332 may be coupled to the local area network 310 through a wired network 316. The user device 334 may be coupled to the local area network 310 through a wireless network 318. As mentioned above, the user devices 332, 334 may be various types of user devices including a cellular phone or smartphone, a tablet, a laptop, a TV or the like. The user device may be referred to later collectively as the user device 80.

An internet of things (IoT) device 336 may be coupled to the local area network 310 through the wireless or wired networks 316, 318. The IoT devices 336 may require software and application updates suitably delivered via dormant capacity.

A television 338 may also be coupled to the local area network 310 through the wired network 316 or the wireless network 318. The television 338 may be a smart television for directly coupling to the wired network 316 or the wireless network 318. However, the television 338 may also require a dongle 340 that is used for communication with the wireless network 318. The dongle 340 may have an application therein for providing the television 338 with a graphical user interface. The dongle 340 may also include a content storage for storing content therein. The dongle 340 may also act as an intermediate device for receiving and storing content.

A smartphone 342 may also be in communication with the wired network 316 and the wireless network 318 so that access to the local area network 310 may be obtained.

A machine 344 may also be in communication with the local area network 310 through the wired network 316 or the wireless network 318.

All of the user devices 330-344 may be in communication with the wireless network 318 using many different types of standards including Bluetooth and Wi-Fi. Each of the user devices 330-344 may receive content through the local area network 310 directly or from at least one of the intermediate devices 16, 16' and 16". The application for retrieving and serving content to the user devices 330-344 may be in the devices 330-344, in the intermediate device 16, in the local area network 310, in the router 314 or in the interface 312. The user devices may 330-344 may also have content storage incorporated therein. The integral storage may allow the user device to act as an intermediate device.

The types of content may include audio content, video content, operating system updates, other software updates, applications, weather information, "best of web" content and e-delivery of various materials. The users of the user devices 330-344 may each obtain the various types of content from the content storage 60 of the intermediate device 16. The content may be obtained individually or simultaneously from the content storage 60. As will be described below, the user devices 330-344 may provide an inventory list or a list of desired content that is communicated through the local area network 310 and ultimately back to the communication system provider 12 of content service provider 90 illustrated in FIGS. 1 and 2. The communication back may be performed with either the communication network 14 or 14'.

A broadcast server 350 may be coupled to the communication networks 14, 14'. The broadcast server 350 may be used for broadcasting content to various user devices 80 and intermediate devices 16. The broadcast server 350 may broadcast content that is stored or provided by a content provider or source. The broadcast server 350 may also communicate content in real-time that is live. The broadcast server 350 is a network component that manages broadcast sessions across a multiplicity of networks. The distribution system may identify to the broadcast server the preferred network to be used for the broadcast with an identifier signal having a network identifier.

A reverse cache proxy server 352 is also in commute communication with the communication networks 14, 14'. The reverse cache proxy server 352 is described in further detail below. The reverse cache proxy server 352 caches content for efficient delivery to proximal users. The reverse cache proxy server 352 may be within or next to the wireless network, or elsewhere in the broader network.

Figure 4:
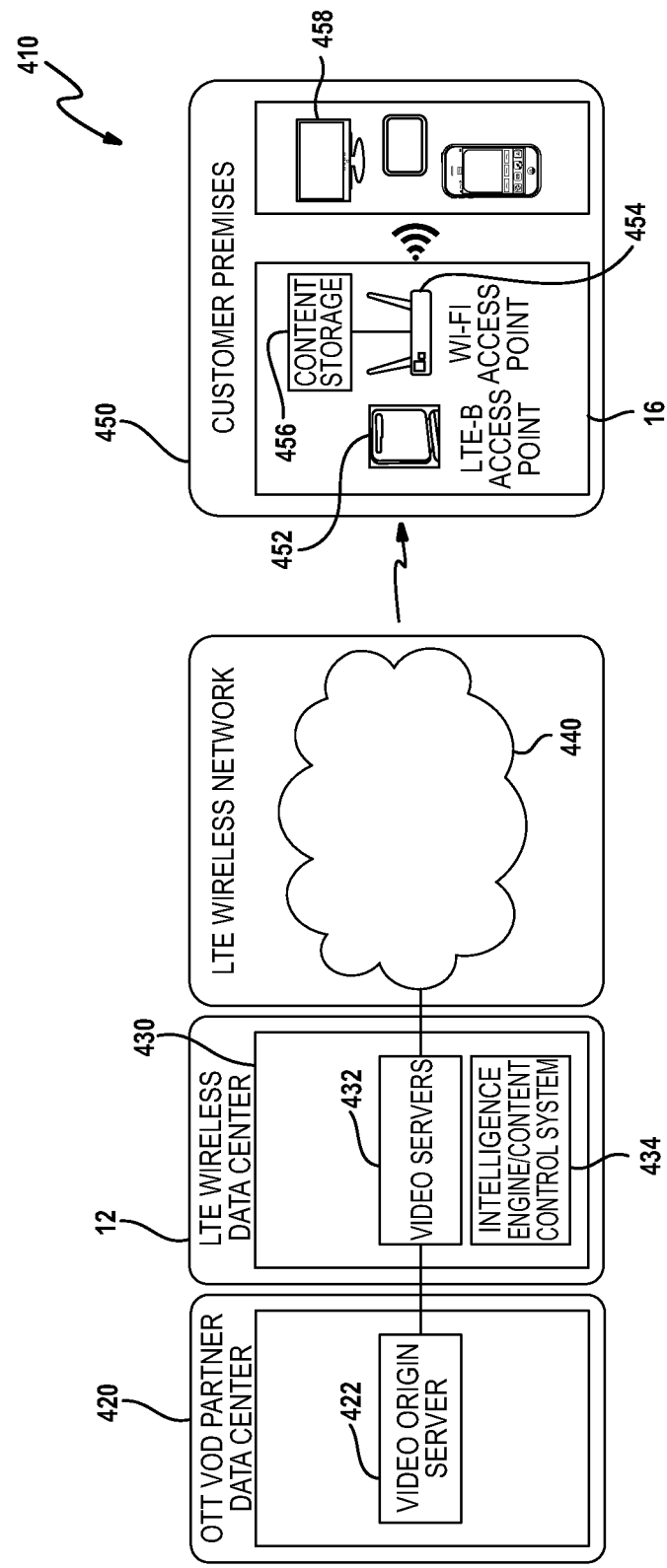
FIG. 4 is a high-level block diagrammatic view of a communication system using an LTE wireless network.

Referring now to FIG. 4, an LTE content delivery system 410 is illustrated. In this example, the communication modules are specifically directed to an LTE system that provides an over-the-top video system. However, other cellular phone systems may be used. An over-the-top video on-demand partner data center 420 acts as the content service provider 90 and has a video origin server 422 disposed therein. The video origin server 422 receives video content from various sources including the sources set forth in FIG. 2. The partner data center 420 is in communication with the communication system provider 12. In this case, the communication system provider 12 is an LTE wireless data center 430. The LTE wireless data center 430 includes video servers 432 that are in communication with the video origin server 422. The wireless data center 430 is also in communication with an intelligence engine/content control system 434. The intelligence engine/content control system 434 may be used for various functions as will be described in detail below. The intelligence engine/content control system 434 may, in general, be used for identifying dormant capacity, including that of LTE wireless network 440, and scheduling the delivery of content to the intermediate devices, including using LTE wireless network 440. The intelligence engine/content control system 434 may also be responsible for managing the content at the intermediate devices by removing the content when necessary. The intelligence engine/content control system 434 may also be responsible for calculating the optimal amount of content, the frequency of such content re-distribution, and the relative timing of different content to be distributed by the LTE wireless network 440 and to be distributed to any intermediate device 16.

The video servers 432 of the wireless data center 430 is in communication with an LTE wireless network 440. The LTE wireless network 440 is in communication with customer premises 450. The customer premises 450 may include an intermediate device 16. The intermediate device 16 may include an LTE-B access point 452 used for accessing the content at the wireless network 440. The access point 452 may also be used for receiving instructions for tuning to the wireless network 440. Specific instruction signals may be provided for tuning to content at specific times Channels, frequencies and times may all be communicated in the instruction signals.

The intermediate device 16 may also include a Wi-Fi access point 454 and a content storage 456. The Wi-Fi access point 454 may establish a Wi-Fi network with the various user devices 458 within the system. The Wi-Fi access point may be referred to as a router. The content storage 456 may be used to store the content received through the LTE-B access point 452. Of course, other wireless technologies may be accessed by the wireless access point. Each of the user devices 458 may include an application for accessing the content within the content storage 456. The application may also be received through the access point 452 or it may be pre-stored within the content storage 456 when a user purchases the system. The application may also be pre-stored within the user devices 458.

Figure 5:
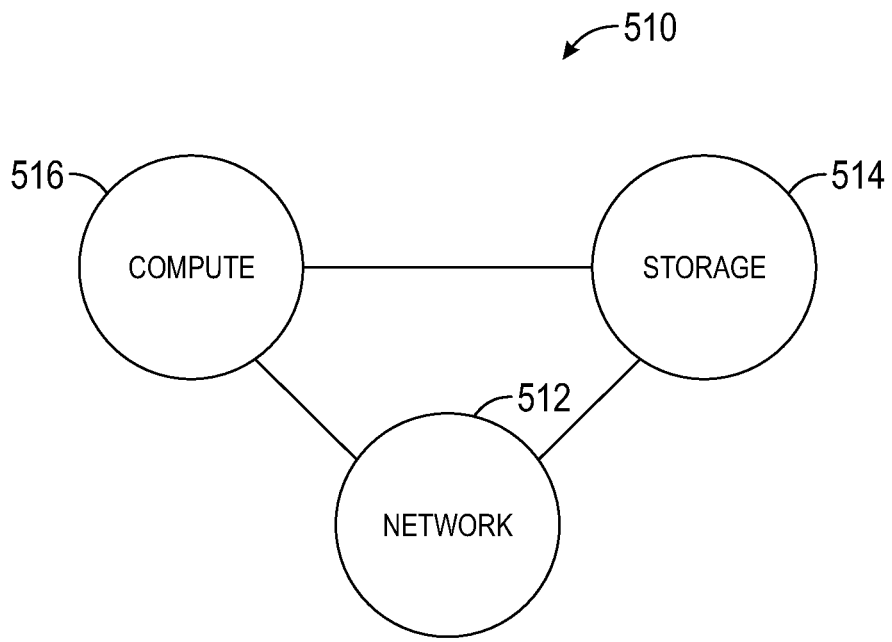
FIG. 5 is a block diagrammatic view of the difference types of resources available within a communication system.

Referring now to FIG. 5, the types of resources 510 in a system may be considered three distinct resources. The resource types can be optimized to deliver the optimized results. The types of resources 510 include are the network resources 512, the storage resources 514 and the compute resources 516. The resources 510 may span different positions in the system and may include different types of resources. Each of these resource types can be optimally allocated in and of themselves.

The use of network resources 512, in and of themselves, may be optimized in various way. The best network, compute, or storage may be chosen to deliver networking to the user, if the user or device is accessible via multiple paths based on the performance of such systems. The cost of using the network, compute, or storage may also be considered. Aggregating bandwidth across multiple networks, computes, and storages (pathways available to the user) may allow multiple paths to be used simultaneously. Harvesting underutilized or dormant networks, computes, or storage capacity, e.g., using paths when regular use is low, on a consistent basis allows a cost-effective use of the network resources. The mode of transmission to use during the communication of content may be chosen to use the network resources more efficiently. For example, unicast vs broadcasting (point-to-point vs. point-to-multipoint may be selected depending on various factors. Broadcast transmission provides high spectral efficiency, i.e., higher bits/sec per Hz of spectrum. Given that there is typically a cost incurred per frequency of spectrum, extracting a higher bits/sec throughput per Hz results in a lower cost per bit.

In the network described herein, the available storage and compute power of wireless-connected devices is tracked by the system, and the wireless network is constantly transmitting data, whether to serve requests by users for real-time consumption or to pre-position data into the available storage of wireless-connected devices. The wireless network is constantly determining whether content should be pre-positioned to one device vs. another device using the remnant capacity for non-real-time consumption, based on such a likelihood of a device being able to fulfill the most number of applications' requests for real-time consumption in the future, or based on its likelihood of being able to fulfill the most valuable real-time consumption requests in the future, including during the most valuable time for such fulfillment (instead of using the wireless network at such time for real-time consumption). When applications are making requests for real-time consumption, the network figures out whether fulfilling such data requests is better directly from a nearby available storage containing the requested data or instead using the wireless network for transmission of such data, and directs such application to receive such data from either the nearby available storage or from the wireless network itself Wireless networks may also track the mobility of devices, and use opportune times when devices are available to receive remnant capacity transmissions for data prepositioning, to preposition data in such devices, knowing the devices will not be accessible for such prepositioning in the future, but may indeed be able to fulfill future requests from applications for real-time consumption in the future directly from their storage. This may include a mobile device, that is often in a disadvantaged location with poor wireless signal and inferior throughput and spectral efficiency from the network, receiving a larger portion of prepositioned data traffic than other devices, when such a mobile device is in an advantaged location with excellent wireless signal and superior throughput and spectral efficiency from the network.

The storage resources 514, in and of themselves, can be allocated in optimal ways to ensure cost and performance optimization, and economies of scale. Typically, greater economies of scale (and cost efficiencies) may be gained by storing deeper in the network (e.g., on arrays in the cloud). Deeper is relative to the end user or user device. However, the future network is likely to provide storage opportunities in different parts of the system (network nodes, access points, small cells, base stations and end devices).

While storage space may normally be more limited and expensive in, for example, edge nodes in the network like small cells, home access points and end user devices themselves, a strategy that harvests unused (dormant) storage capacity in these devices (with resultant lower costs or no costs) can make sense, especially when storing closer to the user makes the delivery process more cost/performance optimal. This can be both for their own benefit, and for the benefit of nearby devices which can be served from those end user devices' storage, The available storage of devices may be filled with partial data of any given content. In this case, the network could direct an application to access one part of the data from one device with the partial prepositioned data, and to access another part of the data from another device with the remaining partial prepositioned data.

Even for a given bundle of content, pieces of the bundle can be stored at different places in the system. For example, in the case of streamable multimedia, metadata, content guides etc. can be stored locally on an intermediate storage device in the home, or on an end user device; whereas the main content could be positioned at some point in the system.

As in the case of storage, computing points (the compute 516) can also be selected in a distributed fashion and aligned with where different content pieces get stored. The compute refers to the applications and hardware to process or move content toward the endpoint. Unused/dormant compute capacity can be tapped into at different points in the system.

As in the case of the storage resource 514, the capacity of the compute 516 can also be leveraged in a "split" fashion, e.g., in the case of an online, multiplayer game, components related to rendering and local processing can undergo processing on the local device; whereas functions common to all the players, and which relate to the overall game status, could execute deeper in the network.

Figure 6:
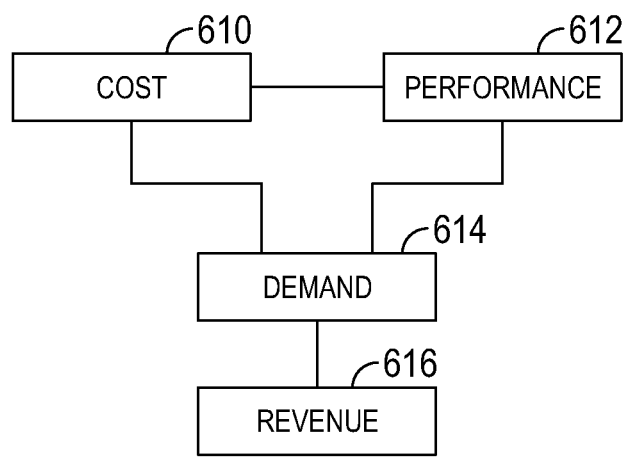
FIG. 6 is a block diagrammatic view of cost, performance and demand that considered when determining a content storage location.

Referring now to FIGS. 5 and 6, the different types of resources 510 (network 512, compute 516 and storage 514) can also be combined in a cohesive manner to deliver a cost 610, a performance 612 service that is optimized based on demand 614 to meet the requirements of the user or service in question. Ultimately, revenue 616 is provided by such a system.

Figure 7:
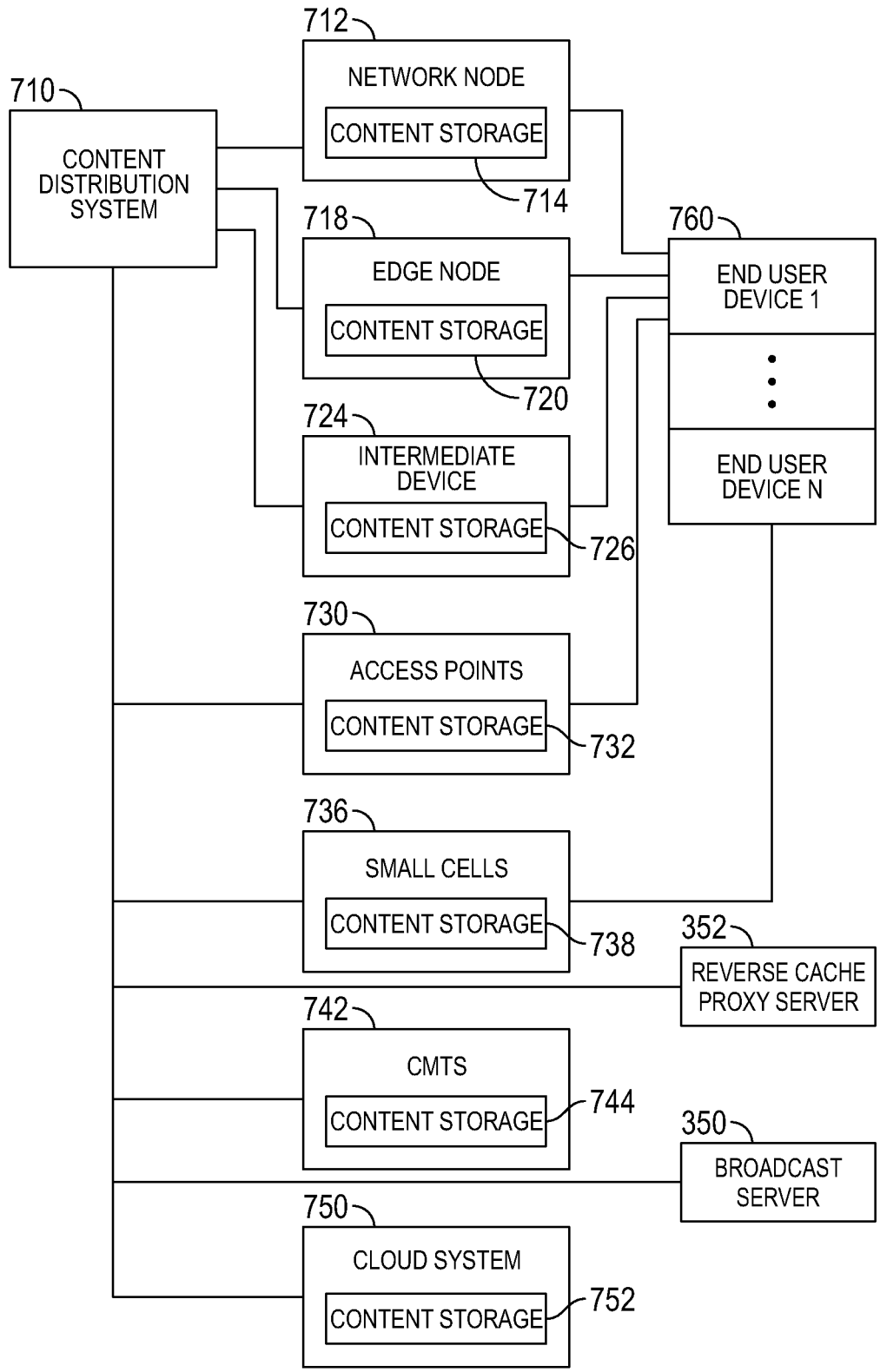
FIG. 7 is a block diagrammatic view of a simplified communication system with a content distribution system ultimately communicating with end user devices

Referring now to FIG. 7, a content distribution system 710 is illustrated. The content distribution system 710 is the system that is used for distributing content throughout communication system 10. The content distribution system 710 may be a standalone system or may incorporate various aspects of FIGS. 1-3 above. That is, the content distribution system 710 may include one or more aspects of the communication system provider 12, the first content provider 212A and the second content provider 212B, as well as the content provider 90 and the communication system provider 12. The content distribution system 710 is used for determining the resources and timing for providing content to the storage devices and from the storage devices to the end user. As mentioned above, the two functions may be separated in time. That is, the content may be provided to the content storage at a time that is different from the time that the content is ultimately communicated to the end user. This may be referred to as non-real-time content distribution.

The content distribution system 710 determines whether to serve the content from the network or from the storage depending on the speed, the capacity and the costs of the aspects of the communication network and the delivery. The resources may be optimistically levered at different points of the network. Both the storage costs and the communication costs may be taken into the consideration. Ultimately, the optimum combination of resources is leveraged for the distribution of a particular content.

The content distribution system 710 communicates to various network resources that may include, but are not limited to, a network node 712 that has a content storage 714 associated therewith. The network node may be a wireless or a wired network node. The network node 712 may control access to a particular type of wired or wireless network.

An edge node 718 may provide access to the edge of a network. The edge node 718 may include content storage 720 for storing content therein. An intermediate device 724 may be one of the devices described above in FIGS. 1-3 as the intermediate device 724 may be incorporated into various types of devices as mentioned above. The intermediate device 724 has content storage 726 associated therewith.

The content distribution system 710 may also be in communication with access points 730 that have content storage 732 associated therewith. The access points 730 may be an access point for accessing various types of networks including a wired or wireless network.

The content distribution system 710 may also be in communication with small cells 736. The small cells 736 may also be associated with content storage 738.

The content distribution system 710 may also be communication with a cable modem termination system 742. The cable modem termination system (CMTS) may also have content storage 744 associated therewith. A cloud system 750, having a content storage 752, may also be in communication with the content distribution system 710. It should be noted that all of the nodes or devices 712-750 are illustrated in parallel. However, these devices may also be combinations of parallel and serial distribution points. For example, a Wi-Fi access point 730 may be located downstream of a network node 712 or an edge node 718. A plurality of user devices 760 may be located throughout the communication system. In this example, a number of user devices 760 are provided within the system. The user devices may be located at different portions of the system and may be associated with one or more of the nodes or devices 712-750.

The content distribution system 710 may also be in communication with the broadcast server 350 and the reverse cache proxy server 352. The broadcast server 350 and the reverse cache proxy server 352 are described above in FIG. 3.

Figure 8A:
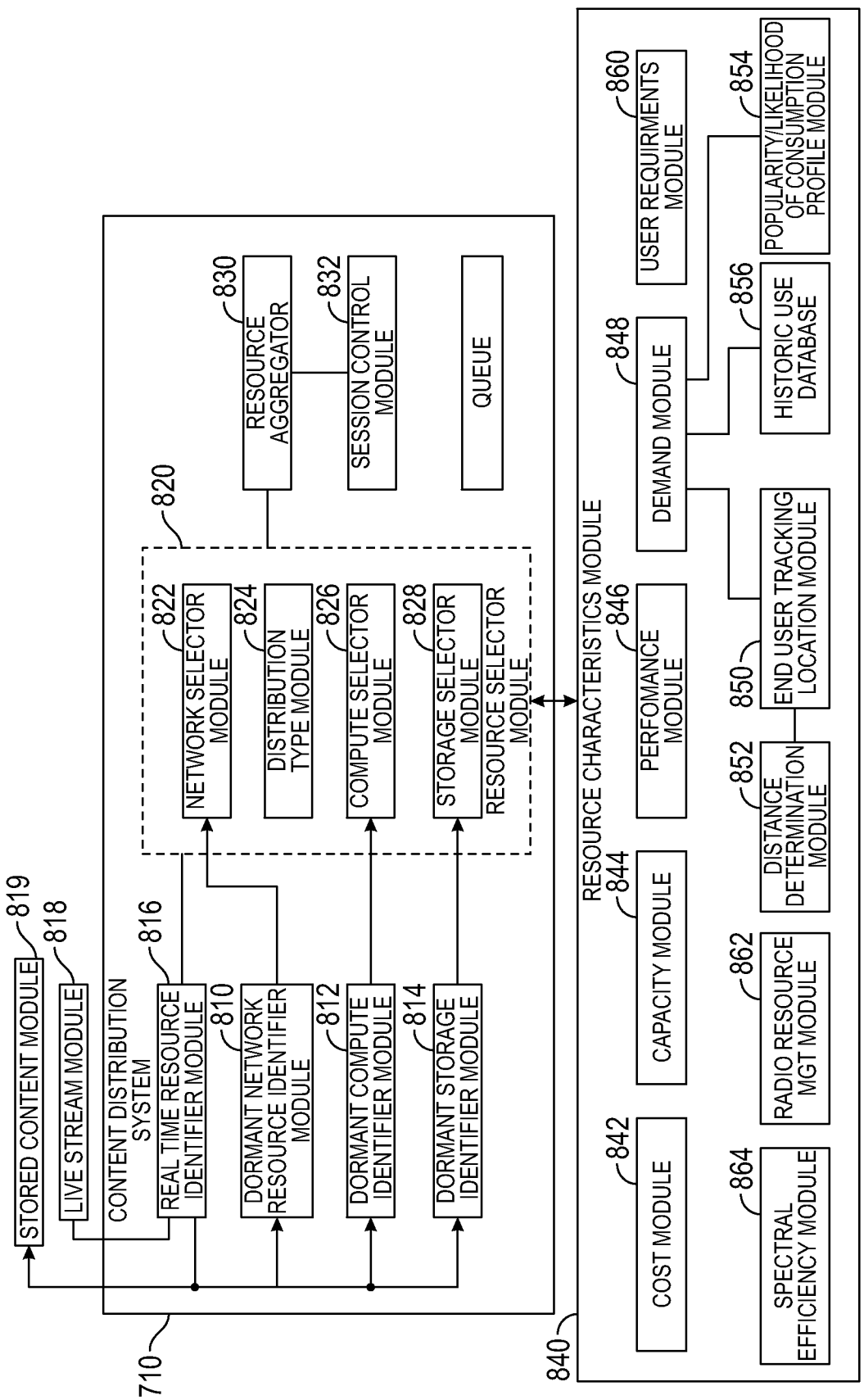
FIG. 8A is a block diagrammatic view of a content distribution system.

Referring now also to FIG. 8A, the content distribution system 710 is illustrated in further detail. The content distribution system 710 determines a combination of the compute, storage and network resources to communicate content and store the content therein. In another aspect, the content distribution system 710 also determines the communication resources to communicate the content from storage to the end user devices using dormant capacity. In this example, the system includes a dormant network resource identifier module 810, a dormant compute identifier module 812 and a dormant storage identifier module 814. The content distribution system 710, as illustrated in FIG. 7, is in communication with the various nodes and devices 712-750. Probe signals may be generated at the content distribution system 710 to obtain the network resources that are dormant, the compute resources that are dormant and the amount of storage that is dormant within the communication system. Each of the modules 810-814 may generate a probe signal. However, one probe signal may be sent for determining all the dormant resources within the network as provided in this example.

A real-time resource identifier module 816 is also incorporated into the content distribution system 710. In the present example, the real-time resource identifier module 816 is coupled to a live stream module 818 and a stored content module 819. The live stream module 818 is used for communicating live stream content to the user devices for real-time consumption. That is the live stream module 818 identified the content that is to be communicated using real-time resources identified by the real-time resource identifier module 816. Based upon various considerations as mentioned above and will be described in detail below, the content may be communicated in real-time using various network resources and types of distributions such as unicast or broadcast. In addition, the live stream module 818 together with the real-time resource identifier module 816 may allow devices that do not consume the live stream content in real-time to store the content. Various intermediate devices may store the content for later consumption by the intermediate device or transmission to the user devices within a local or unconstrained network or other user devices.

The stored content module 819 is in communication with the real-time resource identifier module 816 and the dormant network resource identifier module 810, dormant compute identifier module 812 and the dormant storage identifier module 814. The stored content identified by the stored content module 819 may be communicated in real-time using regular network resources or dormant network resources.

A resource selector module 820 is used for selecting the resources for storing the content or communicating the stored content to an end user device or intermediate device. The resource selector module 820 includes a network selector module 822 for communicating the network or networks through which the content is communicated in route to the content storage or from the content storage to an end user device.

The resource selector module 820 may also include a distribution type module 824. The distribution type module 824 may select the distribution type for the network. For example, the distribution type module 824 may select broadcast or unicast based upon various characteristics described below.

A compute selector module 826 is used for selecting the compute to be used for communicating the content to the content storage or communicating the content from the content storage to the end user. As mentioned above, the compute comprises the program or programs for applications used for storing the content or communicating the content to the end user.

The resource selector module 820 may also include a storage selector module 828. The storage selector module selects the location for storing the content. The storage selector module 828 also selects the storage from which to communicate the content to the end user device. The determination of the resources is determined for a particular time in the network whether it is for content storage or for distribution to one or more end users.

It should be noted that the network selector module 822, the compute selector module 826 and the storage selector module 828 may select different resources from different parts 712-750 of the network. For example, the compute may be part of a cloud system 750 whereas the storage may be located associated with the network node 712. Likewise, the storage may be located in the cloud system 750 as the content storage 752 but the compute resource selected may be located in a physical location associated with a different component of the network 712-742.

The content distribution system 710 includes a resource aggregator 830. The resource aggregator 830 selects the network, compute and the storage resources for communicating content to the storage or communicating the content from the storage to the end user device. The resources, as mentioned above, may be aggregated from different positions within the network.

A resource characteristic module 840 is used for determining the resources at the resource selector module. The resource characteristic module 840 may provide a cost for providing the resource at the cost module 842. The cost module 842 may determine a dollar cost or an opportunity cost for providing content. Although a cost module 842 is illustrated within the content distribution system 710, each of the resources, such as the network, compute and storage, may provide cost data of costs to the content distribution system 710.

A capacity module 844 is used to determine the capacity of the network (spectrum) associated with the communication system and the capacity of the storage that is available throughout the network. The capacity module 844 may determine the total capacity of the system, e.g., the total spectral capacity of the wireless system. The dormant capacity may also be determined. As well, the capacity module 844 can determine or help determine home much capacity could be dedicated to broadcasting or unicasting (in various iterations described below). In a 4G or 5G system, the capacity may be measured by the physical resource blocks (PRBs) that are available for broadcast or unicast or a combination thereof.

A performance module 846 determines the performance of the resources of the system. For example, the performance module 846 may determine the transmission speed or throughput of a network, the speed at which the compute can store the content, and the speed that the content storage can store the content. The performance module 846 may obtain radio conditions such as throughput or network speed at a device from feedback signals from the devices themselves. Multiple devices may provide radio condition signals to the content distribution system 710 in order to obtain a broader view of the network conditions. Ultimately the conditions determined at the performance module 846 are used to determine the spectral efficiency and ultimately the net spectral efficiency or the maximum net spectral efficiency when spectral efficiencies are compared.

A demand module 848 may determine actual demand and predict a future demand for a particular content or related content. The output of the demand module 848 may be in a user demand number. For example, a first number of user devices are demanding live content and a second number of user devices may actually request the content in the future (not in real-time). A consumption pattern for content may be determined based on various factors. The demand module 848 may be associated with or determine demand from a wish list for each of the devices within the network. The demand module 848 may also determine demand from a push list. provided by a content provider. A content provider may determine that certain users enjoy certain content. Devices may have content pushed to them in response to the push list. The push list may take into consideration past use, geographic area (location) and other considerations. The home location of the user may correspond to certain content such as sporting events. However, while travelling, other content relevant to the current location of the user device may be provided to a user. The demand module 848 may also be associated with an end user tracking and location module 850. The end user tracking location module 850 can track the mobile end user devices and the stationary end user devices to determine the amount of demand within a geographic area.

A distance determination module 852 may determine a distance to the end user or the content storage system. The distance determination module 852 may also determine the distance from the content storage to an end user. By knowing the demand at the demand module 848, the geographic area of the demand and the potential movement of the end user devices, content may be strategically located and communicated. An example where this may be useful is in a particular neighborhood with a particular ethnicity or sports team affiliation. A content genre may be relevant more to certain geographic areas (geographic popularity). For example, a high school football game may be relevant to people within a limited number of square miles nearby a certain school. The location of the user may therefore be used to change the number of users. This is especially true in a system that is geographically distributed and portions are served by different resources. The demand predictions for certain content may be for certain geographic areas.

A popularity/likelihood of consumption profile module 854 may also be communication with the demand module 848. The popularity/likelihood of consumption profile module 854 may determine a popularity and/or how likely it is for a user device to consume a particular content. The likelihood of consumption may be based on one or more of collaborative filtering, or demographics, use of content by others. Collaborative filtering takes into account interests or tastes of many users. Likelihood of consumption may be determined by collaborative filtering including determining actual consumption of similar content to the content, a prequel to the content, or sign-ups for similar content to the content, actual consumption of the content and actual consumption of the similar content to the content, the prequel to the content, or the sign-ups for similar content to the content by other users. User data corresponding to the interests, tastes and demographics of a user may allow the system to determine that the user of the device is in a particular gender, in a particular age group, in a particular ethnicity, and in a particular income and may be interested in a content and therefore likely to consume the content. Use-based likelihood of consumption may predict likelihood of consumption when other users watch similar content. "Watching" content is a form of actual consumption This may be combined with other users watching (actually consuming) similar content and then watching (actually consuming) the content in question. That is, another user device having watched similar content as others may also watch the content in question because others have. Content may be divided into parts. Parts of a series (episodes, prequels, sequels and the like) or parts of the content divided into smaller portions or chunks. Another indication of likelihood of consumption is the actual consumption of the first part of the content by other users. This may mean they may be likely to want to consume a second part. In addition, actual consumption of the second part of the content by other users may be used as part of the actual likelihood of consumption of further parts. The likelihood of consumption of parts of the content may be used as an indication that other users are more likely to consume the content. The popularity of a content may be determined from audience measurement or from a predictor of popularity as determined by a human entity. The popularity may be determined based on a number of users that have signed up for a content. For example, a number of users that have signed up to stream a real-time content or live-content. Popularity may also be determined based on past popularity of content that is similar. Similar content may be part of the same series of movies or programming, have the same genre, the same or similar actors and the like. Similar or the same genres may also be used to determine popularity for past popularity. Popularity could be determined from a wish list or wanted list as well. Users provide input on content they would like to view in the future in a wish list. Certain content may be inherently popular at certain times. For example, the providing of Olympic content during the Olympics may have an increased popularity. On Sundays in the United States, National Football League content may be more popular.

A historical use database 856 may store user participation for various content, content genres and content related to a particular content. A genre is for content are similar forms, style or subject matter. Examples include but are not limited to action, romantic comedies, comedies, drama, thriller, horror, historical, western and adventure Historical trends for certain content and genres of content may be used to predict future (non-real-time) user device consumption for particular content. For example, actual consumption of a prequel may indicate the popularity or likelihood of consumption of a certain content. As will be described below prepositioning as well as real-time predicting may use data in the historical database to determine the mode such as broadcast or unicast for content or a live stream.

A user requirements module 860 may also be incorporated within the resource characteristic module 840. The user requirements module 860 may associate various user requirements with each end user or end user device. The user requirements module 860 may include the definition of the service to which the subscriber has subscribed. For example, some users may value rapid response in terms of updating or providing content. This may signal the content distribution system 710 to locate the content closer to the end user.

The resource characteristic module 840 may also have an efficiency module that is used for determining a consolidated efficiency metrics that is used for the determination of which combination of resources to use. The costs per byte per user may be determined.

A radio resource management module 862 may also be included in the resource characteristic module 840. The radio resource management module 862 may take into consideration a service resource agreement from various service sources and various service level agreements from the devices and nodes 720-750 of FIG. 7 in order to determine whether to use a particular resource.

A spectral efficiency module 864 may be used to determine the efficiency of the spectrum used for each transmission choice. By determining the spectral efficiency of each transmission choice (a unicast spectral efficiency and a broadcast spectral efficiency), the appropriate transmission resources such as the network, the distribute type, the compute and the storage may be determined appropriately. The spectral efficiency and the capacity module 844 together with other data are used for making the selection of the appropriate resource at the resource selector module 820.

In summary, the content distribution system 710 determines, for any content to be distributed, the optimum combination of resources to leverage at a particular time. Real-time or live content distribution requires immediate resources that may be chosen as combinations of broadcast and unicast. Broadcasting may be used not only for real-time consumption but also for simultaneously populating storage devices in user devices or intermediate devices. In other considerations, if cost minimization is the prime consideration, positioning content as close to the user as possible (e.g., in an intermediate storage device in the home, office, or in the user's end device itself) might make the most sense. In this scenario, performance optimization is a natural by-product, since delivering the content from close to the device will maximize throughput and minimize latency and jitter effects.

On the other hand, if the piece of content has a high enough popularity level (i.e., a large number of users are likely to watch (actually consume) the content), it could make sense to locate the content a bit deeper in the system (e.g., in one of the access network nodes or even in the core cloud). In this case, even though the networking cost can be higher, it can be amortized across a larger number of paying users.

It is therefore helpful to view the decision determination in terms of a consolidated efficiency metric that enables the content distribution system 710 to decide which combination of resources to use. An example of a metric is cost/bit/user—or some equivalent of this. The cost/bit component reflects the price and performance aspect of the delivery option and normalizes the cost incurred relative to the performance rendered. The "User" denominator then normalizes the metric further, to factor in demand/popularity, and the number of users interested in the content.

In terms of a distribution and delivery strategy, various principles may be followed. Such principles may include pre-positioning content, using dormant network capacity (or, at least, the least expensive network path(s)), at one or more sites, edge nodes, home access points, or end user devices— the idea being to move content as close to the interested user population as possible, using free or inexpensive resources.

Another determination in the distribution and delivery strategy is leveraging the dormant storage and computing where the dormant storage is available in the system. The best location or locations for pre-positioning is determined in view of the cost and performance of the ultimate delivery to the end user device.

Another determination is picking the best time to pre-position content while factoring in available dormant capacity and the ability of the storage device to efficiently receive data to be pre-positioned. The location may also be a consideration. That is, communicating when the device is in strong radio conditions may be important. The end user device may be exposed to varying conditions when mobile. An example of a determination could be: does the distribution system deliver live from the network at the time of consumption, vs. store now at Location A and deliver at consumption time from A, vs. store now at Location B and deliver at consumption time from B, vs. store now at Location C and deliver at consumption time from C, and so on. Basically a "least cost route" option is set forth that factors in how many users can be covered from each location or route.

Another determination is the best network path to leverage to pre-position content in the device. When the user is ready to consume the content, delivery is enabled with minimal cost involved, e.g., if the caching was done at storage local to the user, network costs at consumption time would be zero or minimal.

In the following, a few use cases are presented. The first case is wishlist content. For wish list content that is part of a user's wishlist (e.g., specific movies, episodes of a TV show etc.). The content distribution system 710 may determine that the optimal approach here is to pre-position this content to the user right away, after the user indicates that their desire for a particular content since the user does not need to immediately consume the content.

The content distribution system 710 may decide to pre-position or cache the content in, e.g., an intermediate storage device in the user's home, or in the end user device itself (if the user is known to regularly use a specific device to consume streaming content). The deeper in the content is positioned, the lower the eventual cost of delivery (e.g., delivery from local storage—no network costs involved) and the better the user's quality of experience.

When the content distribution system 710 determines that this content has a high enough popularity level, the content distribution system 710 may cache the content at a further upstream point in the network (relative to the end user devices), e.g., a base station, or a wireless network node. Upstream storage allows for the content to be available to a larger number of users. The content distribution system 710 may also decide to cache portions of the content bundle at different locations, e.g., position metadata, program information etc. locally on the end user device, and the core content further upstream. Such decisions may be performed at the resource aggregator 830.

In either case, the content distribution system 710 could make a decision to deliver content to any (or more than one) of the storage nodes mentioned earlier, based on the cost and performance tradeoff of such a delivery with the cost and performance of the storage and its compute. The likelihood of the storage being able to fulfill a real-time video serving request and the volume of users that would be addressable by the storage, may also be considered. For each potential content storage positioning location being considered, the content distribution system 710 takes into account the cost of storage, and (at the point of delivery to users) what the compute and network delivery costs would be. The popularity level (consequently how many users would have access to the content from each location) can also be factored in to a decision to deliver something using unicast delivery or broadcast delivery, since broadcast delivery is somewhat less efficient than unicast delivery to a single node, but much more efficient than unicast delivery when attempting to deliver something to multiple nodes simultaneously, since the delivery efficiency would be higher (and the cost would be effectively amortized) if a larger number of users can be serviced.

For example, if the cost of storage in the home is $1, the cost of real-time delivery is $10, and the cost of pre-positioning using dormant capacity is only $2, then the likelihood of video consumption (for example 50%) may be taken into account. The effective cost of real-time delivery compares to a $6 cost (($1+$2)/50%) of pre-positioning and subsequent serving given the likelihood of such an event. Now if this example is expanded, and the cost of pre-positioning using broadcast over dormant capacity is $6 (since less efficient for any 1 user), but 100 users can be addressed by the broadcast, and the likelihood of video consumption is 33% across the group of 100, then the effective cost of pre-positioning and subsequent serving given the likelihood of such an event drops to $3.18 (($1+$6/100)/33%). Finally, if the cost of storage in the home is entirely a sunk cost, and is shouldered by the user, the above costs or pre-positioning and subsequent serving drop further to $4 and $0.18, providing dramatic cost and performance (such as spectral efficiency) improvements.

For gaming applications, the content distribution system 710 may decide to pre-position or cache a gaming application requested by the user. In this case, the content distribution system 710 may place real-time-critical and bandwidth intensive components of the application such as but not limited to graphics data and intensive user interface and rendering components close to the user (e.g. in an intermediate storage device in the home, or in the user's commonly used gaming device(s)) and place the compute-intensive pieces further upstream, where a larger pool of compute and memory resources may be available. In this manner, the caching location can be used to store just a portion of the total content, application or web payload while the low-bandwidth portion of the payload can be served from the origin server, which may provide higher compute capacity.

Another use case is for pre-positioning software updates. A software service provider may need to do this from time to time. That is, software updates may be required for end user devices. Dormant network capacity may be used to preposition a software update in a user device or in an intermediate storage device close to the user. The user can incorporate the updates at a subsequent time of their choosing.

In general, the decision to pre-position content may be driven by a user, or users, placing the content on their wishlists, or the content distribution system 710 proactively deciding to place the content in suitable locations based on the content's popularity profile relative to the population of user and specific personalized reference for any given use and hence, expected demand in the near future. In every case, the content distribution system 710 will need to select the combination of storage and compute resources in the system based on various factors including candidate storage locations having the requisite storage capacity. Another factor is the cost of storage. Another factor is whether dormant (unused) storage space available at that location and whether the dormant capacity can be leveraged free of charge, or at a lower cost.

With respect to compute power similar factors may also be consider. These include if the location has sufficient compute power to support delivery of the service when the user chooses to consume the content. Also, a more upstream location, with a larger aggregate compute capacity may be chosen instead of a closer location.

With respect to the network when the user decides to consume the content, the network communications cost be at that point and for real-time consumption may be considered. The cost of pre-positioning distribution using dormant capacity and the dormant (unused) capacity available at that point in time may also be considered along with the relative cost of such distribution. The cost efficiency may also be considered for pre-positioning distribution using broadcasting or unicasting. Another consideration is how many other users are likely to be interested in the content.

Clearly, the trade-off factors here are compute or storage capacity and cost, vs. networking cost, and the content's popularity profile. Typically, upstream caching locations are likely to provide large storage and compute banks, suitable especially for compute-intensive applications. However, the networking expense could be higher (at the time of content consumption), and performance may be inferior (if the content has to traverse a long segment of the network). But, at the same time, a larger population of users could be served, when the service delivery location chosen is further upstream.

The end result of these determinations is that the content is cached at one or more locations in the system. Typically, an access network edge node (e.g., small cell, base station, access point) used as the caching location might provide more limited, and more expensive, compute and storage resources. However, the communication costs might be lower, and performance is likely to be better, compared to a more upstream location, because network backhaul costs and latencies are being cut out of the equation.

The related decision the content distribution system 710 must also select the mode of transport such as unicast or broadcast. If the pre-positioning location is in the network, a point-point (unicast) approach can be applied. If the decision is to locate the content in the user's end device or intermediate storage device in the home, the content distribution system 710 may decide to opportunistically push the content to multiple users (especially if the content's popularity profile is high) using a much more spectrally efficient broadcast approach when distributing the same data to multiple users at once.

When the user is ready to consume the content (i.e., requests delivery), the content distribution system 710 delivers from the most appropriate storage location. The content distribution system 710 will look at all points where the content is currently cached or is available (including the origin server in a cloud location) and determine the best location from which to deliver from based the communication system conditions at the time. The conditions include the network delivery cost from each candidate location and the current compute power available at the location, vs. the computing needs of the application. The content distribution system 710 then delivers the content using the best (possibly least expensive) network resources available that can handle the performance requirements. If delivery is from local storage, networking resources may not be needed.

The live streaming (consumption) case is a subset of the content delivery scenario described above. If the user is requesting content that has not been pre-positioned anywhere, the content distribution system 710 delivers it from the origin server in its cloud.

The radio resource management processing used by the distribution system 710 for a live broadcast has some differences from that used for pre-positioning of content for non-real-time consumption. The distribution system 710 performs a set of radio resource management determinations while contemplating the introduction of a broadcast session to carry the live stream. For live broadcasting (for real-time consumption), the target throughput is determined, and participating devices need to meet channel quality (radio conditions/metrics) requirements.

First of all, the distribution system 710 may pick a delivery bitrate for the broadcast. This is to at least equal the bitrate of the selected version of the audio/video to be live-streamed. The system will select a bitrate version of the multimedia content to be delivered—a high enough bitrate that delivers a high-quality user experience. The audio/video playout rate of the content on the device's client has to equal this recorded bit rate of the audio/video. Which means the delivery bitrate of the broadcast has to at least equal this recorded bitrate (buffering possibilities are limited in a live stream so the communications bitrate has to equal or exceed the playout or recorded bitrate).

The target throughput for the broadcast is at least equal the audio/video bitrate. This, in turn, determines the spectral efficiency level (i.e., modulation and coding scheme or MCS) to be used, given the spectral capacity (KHz of spectrum) available for use. The system, therefore, selects a target spectral efficiency level that enables this target throughput to be achieved.

This, in turn, implies that the devices participating in the broadcast must be experiencing radio conditions at least as good as required to receive delivery at this target spectral efficiency level. A device whose radio conditions are weaker than the radio condition (quality) threshold level will receive a degraded user experience, or receive no content at all since it will not be able to demodulate much of the signal being transmitted.

The distribution system 710 includes in a potential broadcast of this stream, from the pool of participating devices, only those that pass the radio quality threshold. The rest of the devices (the radio-disadvantaged devices) can stay on unicast.

Additionally, the distribution system 710 determines the most spectrally efficient transmission mode, i.e. the optimum combination of broadcast and unicast user group sizes, given the participating devices' radio conditions. The distribution system 710 evaluates overall spectral efficiency for each combination of broadcast and unicast user group sizes. As was described many iterations may be calculated before one is selected. This is described in detail below.

With unicast, radio resources (e.g. carrier frequency slices allocated across time slots and spatial layers) are allocated to each device, typically on a delivery-by-delivery basis. In other words, radio resources are allocated per device delivery. However, some devices may be in radio-advantaged conditions (i.e., higher radio metrics such as SNR/SINR/CQI), and, consequently, use fewer radio resources to achieve a given target throughput (i.e., are more spectrally efficient). (The use of Massive MIMO or broadcast beams can improve radio conditions of such devices). In contrast, devices on poorer radio channels will end up using more radio resources to achieve the same target throughput desired for delivery of the content in question.

With broadcast, the same set of radio resources is shared across all participating devices (for example, on a cell in a wireless system). Individual per-device radio resource allocation does not happen. Also, a common spectral efficiency level is used for data delivery across a session—to all participating devices. This is typically at a "middling" level (it can even be at a "least common denominator" level)—so that a large enough number of devices can receive the broadcast successfully. (Devices that are radio-disadvantaged enough to not tolerate this target broadcast spectral efficiency level will receive little or none of the content). Hence, a highly spectrally efficient unicasting device (i.e., having better radio conditions, and by itself, achieving throughputs with fewer radio resources) will typically experience a lower spectral efficiency when moved over to broadcast. On the other hand, the radio resource sharing feature of a broadcast raises overall spectral efficiency, since more devices are being served using the same quantum of spectrum.

This tradeoff—between drop in per-device spectral efficiency for radio-advantaged users, vs. increased spectral efficiency from resource sharing is a factor to assess while making unicast vs. broadcast choices.

With this approach, the distribution system 710 determines the capacity (e.g., number of PRBs in a 4G/5G system) available to the live stream delivery. This can be a percentage that can be allocated to the broadcast. Based on the required delivery bitrate and capacity allocated to the broadcast, the target spectral efficiency is determined for the particular iteration. Given the target spectral efficiency, a list of devices that are able to participate in the broadcast (i.e., whose radio conditions are at least as good as required to receive delivery at this target spectral efficiency level) is determined. The remaining participating devices will need to receive the real-time or live content delivery via unicast. The net spectral efficiency for this combination of broadcast and unicast is determined (i.e., factoring in throughputs achieved for the broadcast and unicast deliveries, and total spectrum used up. This will be dependent on the target spectral efficiency for the broadcast component, and the spectral efficiency levels used for deliveries to the unicast devices).

The distribution system 710 will perform several iterations of the process, with each iteration factoring in a different percentage of the available spectral capacity being used for the broadcast part of the live stream. For example, the first iteration can assume 0% of capacity used for broadcast (i.e., the live stream is done entirely using unicast deliveries). Subsequent determinations may increase the percentage. The final iteration can factor in all (100%) of the available capacity being applied to the broadcast component of the live stream, i.e., no unicast deliveries for the live stream.

As part of delivery of the content, the content distribution system 710 may choose to opportunistically cache the content in targeted locations, which it retrieves to serve to any given requesting user at that time, in anticipation of future needs for the same content by other users. For example, in one example broadcasting may be consumed in real-time by various uses while intermediate devices or other user devices cache the content for later consumption. Further, the content may be post-positioned in an upstream node in a wireless network (e.g. a PDN Gateway or User Plane Function) but much closer to the user than the content origin server such that it can be delivered to a larger interested population of users from a closer point of access when the system is responding to a first user requesting such content and the system needing to retrieve such content from the content origin.

Figure 8B:
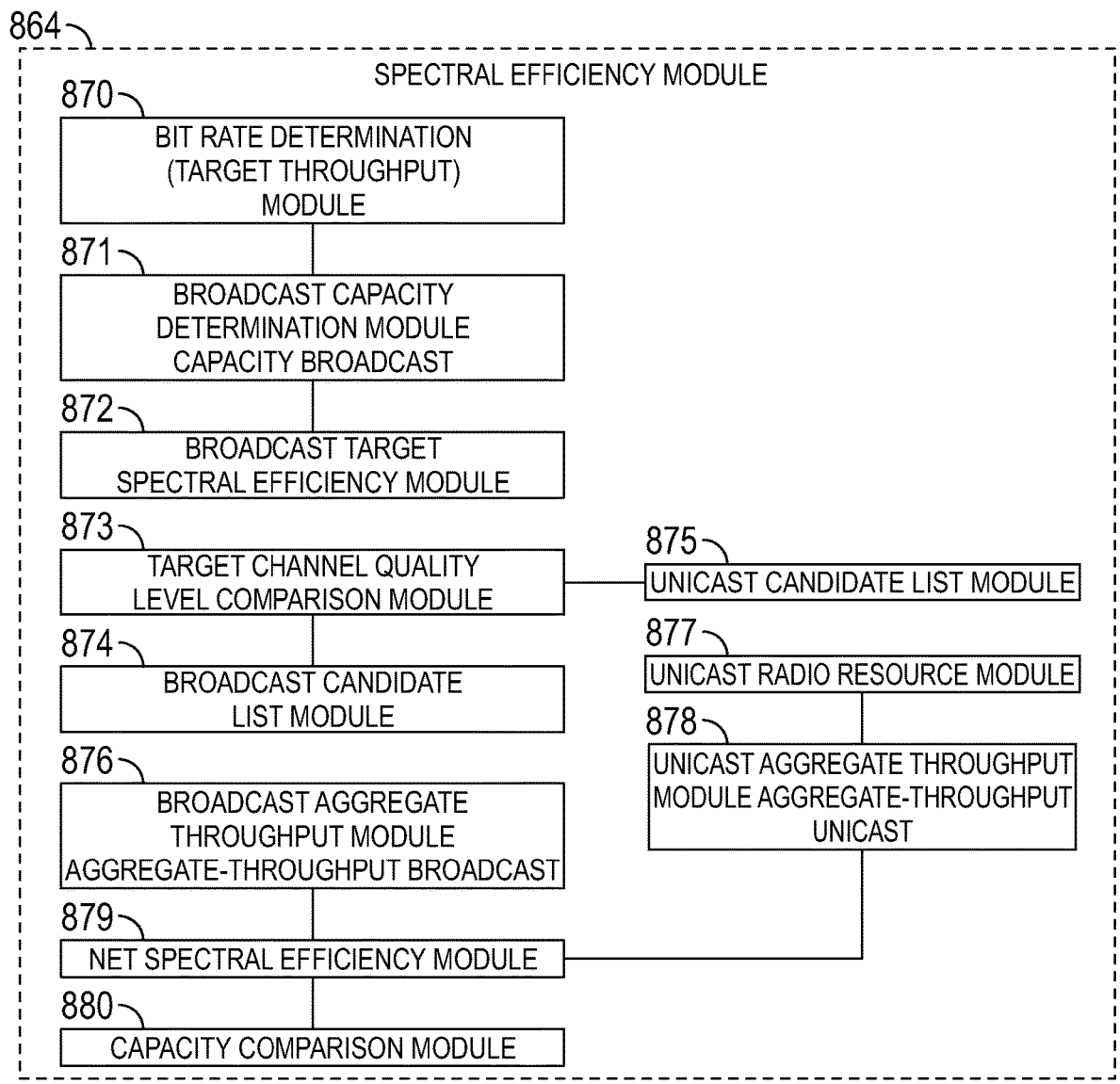
FIG. 8B is a block diagrammatic view of the spectral efficiency module of FIG. 8A.

Referring now to FIG. 8B, the spectrum efficiency module 864 of FIG. 8A is set forth in further detail. In FIG. 8A, a bit rate determination module 870 is used to determine the target throughput. The target throughput may be chosen as the bit rate of the audio/video live stream.

The determinations below are performed in a number of iterations with each iteration factoring in a different (increasing in this example) percentage of the available spectral capacity being used for the broadcast part of the live stream. In this example, the first iteration or start iteration is determined with 0% used for broadcast, which means the live stream is done entirely using unicast deliveries. For a live stream, once the candidate list of "broadcastable" user devices is determined, the next step would be to determine whether a broadcast should be started up for the live stream delivery, the optimum distribution of capacity across broadcast and unicast deliveries, plus the optimum blend of broadcast user group size and unicast user group size. The optimum blend will result in the highest net spectral efficiency.

Each iteration loop determines the broadcast target spectral efficiency for each iteration. First the target spectral efficiency to be used for the broadcast delivery to generate the bitrate, based on spectrum available for broadcast (available spectrum) in this iteration. A broadcast determination module 871 is used for determine the broadcast capacity for each iteration.

$Capacity_{Broadcast}$=% capacity used for broadcast in this iteration*wireless capacity (e.g., #PRBs*Hz/PRB) available for the live stream delivery.

Using the above, a broadcast target spectral efficiency module 872 determines the broadcast target spectral efficiency by:

Target Spectral Efficiency(bits/s/Hz)=Target Throughput/$Capacity_{Broadcast}$

A target channel quality level comparison module 873 compares the channel quality (radio metrics) of the potential broadcast only devices to a target channel quality level (target radio metrics). The radio metrics or channel quality level may, for example, be the signal to noise ratio, the signal inference to noise ratio or the channel quality indicator (CQI). The comparison allows only devices that have a high enough radio condition to reliable receive the content to be consider to receive the broadcast signal. A broadcast candidate list module 874 provides a broadcast candidate list for the devices that exceed the target channel quality at the target channel quality level comparison module 873. Other devices that are to receive the live content that do not meet the channel quality level are provided in a unicast candidate list module 875.

Ultimately, a net spectral efficiency is determined. The net spectral efficiency, as further described below, has both a broadcast and unicast component.

For the broadcast component of the live stream, broadcast aggregate throughput module 876 determines an aggregate achievable throughput for the broadcast user group in the current iteration is given by:

Aggregate-ThroughputBroadcast=Target Throughput* (#devices in the current broadcast candidate list potentially participating in the live broadcast+a number of devices where content can be pre-positioned for future consumption*de-rating factor)

The aggregate achievable throughput takes into account the number of devices that would receive the broadcast real-time, as well as the number of devices that may be interested in future consumption of the content, and in which the content could be opportunistically pre-positioned in an intermediate device or a user device. Using the de-rating factor, a lower weight is applied to the number of devices considered for pre-positioning, as the marginal value of spectrum for real-time use would be higher than that for non real-time (future) use—the latter being determined on a "likelihood of consumption" basis. The lower weight can be applied, for example, by de-rating the number of pre-positioned devices by a factor (less than 1 in value).

The multiplication by the number of devices is used to account for radio resource sharing since with broadcast, the assigned quantity of resources is shared by all participating devices. Broadcasting may use a lower per-device spectral efficiency level than could be used by radio-advantaged devices in unicast mode; but the resource-sharing aspect boosts net spectral efficiency.

For the unicast component of the live stream (unicast user group), the unicast radio resource module 877 determines the overall spectrum used by all of the unicast devices ($Capacity_{Broadcast}$). The spectral aspect of each device is taken into consideration since each receives a separate signal that uses a separate piece of spectrum:

For each unicast device such as a user device, the quantum of radio resources required (e.g. spectrum from Physical Resource Blocks or PRBs in an LTE or 5G system) needed to achieve the target throughput for the live stream is determined based on the known spectral efficiency of the device being determined. The spectral efficiency for device-i (spectral efficiency at which the i-th device can receive the unicast delivery, based on its radio conditions) is given by:

Spectrum required(Capacity-RequiredDevice-$i$)=Target Throughput/Spectral EfficiencyDevice-$i$ The sum of the resources for unicasting is thus determined by: $Capacity_{Unicast}$=SUM (Capacity-RequiredDevice-i across all devices in unicast group)

An aggregate throughput module 878 determined the unicast aggregate throughput as:

The unicast aggregate throughput determined at the aggregate throughput module 878 is determined by:

Aggregate-ThroughputUnicast=Target Throughput*Number of Unicast devices

Taking into consideration both the broadcast aspect and the and the unicast aspect of the above, the net spectral efficiency module 879 determines the Net Spectral Efficiency by:

Net Spectral Efficiency=(Aggregate-ThroughputUnicast+Aggregate-ThroughputBroadcast)/(CapacityUnicast+CapacityBroadcast)

Thereafter, to ensure that total capacity requirement is within available capacity for the live stream the capacity comparison module 880 performs a comparison of the unicast and broadcast capacities and compares the sum with the available capacity:

When CapacityUnicast+$Capacity_{Broadcast}$>Total Capacity available, the broadcast/unicast combination from the candidate list for the iteration id discarded. The next iteration of the loop using a different amount of broadcast percentage for the overall capacity is determined. In all, a plurality of blends have their net spectral efficiency determined.

The distribution type module 824 of the distribution system 710 then picks a mode blend from the iterations from above loop. The mode blend may, for example, be provided in terms of a percentage such as: broadcast capacity %, unicast capacity %. The blend that is chosen from the plurality of blends results in the highest net spectral efficiency.

If the selection reflects that a broadcast session needs to be started (i.e., the selected blend has a non-zero broadcast %) at the session control module 832 of FIG. 8A. The session control module 832 instruct the devices from the broadcast candidate list whose SNR/SINR/CQI radio metrics exceed Target Channel Quality level to shift to the broadcast session being set up, in the selected network. The session control module 832 keeps or instructs the non-broadcasting user devices in the unicast candidate list module to remain in or instructs them to receive the content in in unicast mode. Therefore, a blend of unicast receiving user devices and broadcast receiving user devices receive the same content transmission simultaneously in different modes.

A queue 834 is incorporated into the content distribution system 710. The queue 834 may communicate content to user or intermediate devices in a particular order. The order may be based on the interest in a content, popularity of a content and the like. The queue 834 may be used for pre-positioning content to interested user devices using broadcasting as is described in further detail below.

The above process is described with respect to delivery of a live stream. A similar process performed at the distribution system may be used for migrating a live stream from unicast mode to a broadcast mode. The system can make a decision to migrate the stream to a broadcast mode in part or in full. That is, the system may continually perform determinations to see if broadcast and/or unicast transmission may be enable for the live stream. A combination of unicast transmissions and broadcast transmissions may be performed. Details of this process are described below. The same is also true for migrating a live stream from a broadcast to unicast. That is, because of various ongoing conditions, the use of unicast rather than broadcast may be desirable.

The system may also be applied to real-time consumption of stored audio/video content. That is, a user may request stored content that is pulled on-demand by a specific user at a specific time. In other words, the actions are not a live event that is time-synchronous to cross a population of users. Even if multiple user devices are viewing the same content simultaneously, grouping the user devices into a live broadcast stream is difficult since their views are not likely to be time-synchronized. When a user starts a stored content viewing stream, the other user devices may pause, rewind or otherwise manipulate the stream so that viewing at the same point is nearly impossible. However, when a user requests a stored content stream to be delivered in real-time, other devices may opportunistically receive the signal using the broadcast mode of the communication system.

Another use of the distribution system is for pre-positioning content in user devices for future consumption. A system that identifies the content generally desired by consumers that broadcast such content over the network in advance of the time it is desired to be consumed by consumers, store such content locally at a consumer premises or within an intermediate device. The final delivery to the user may be performed using a Wi-Fi home network and therefore the medium is constrained. Details of this will be described in further detailed below.

When the broadcast mode is selected or an ongoing transmission is switched from unicast broadcast mode, the distribution system 710 can select one or more out of all the available transmission networks. As mentioned above, various resources from the different networks may be selected by the resource selector module 820. However, the network selector 882 may be used to select a particular network. The best network may be chosen based upon a performance perspective, e.g., the one with the highest spectral efficiency. Multiple paths may also be accessed that are used to achieve the best performance. As mentioned above, a cost perspective may also be used in selecting the best network.

When selecting between different networks, the bandwidth across multiple networks, using multiple pathways available to the user, may be used simultaneously. As will be mentioned in more detail below, underutilized or dormant capacity may also be used for communicating content and live streams to the user devices. That is, when the regular use of a network is low on a consistent basis, the unused capacity may be used for communicating content. When real-time stream and consumption occurs, the distribution system 710 may choose a broadcast-centric network to deliver the broadcast. For example, a TV network may be used. Further, a low frequency band, such as 600 MHz, may be used because such frequencies communicate data and in longer ranges. Relative to an LTE or 5G network, off-loading various broadcasts to a TV broadcast system may be advantageous. The LTE or 5G wireless network may therefore be used to handle its regular load depending upon the time of day and traffic therethrough.

Figure 9:
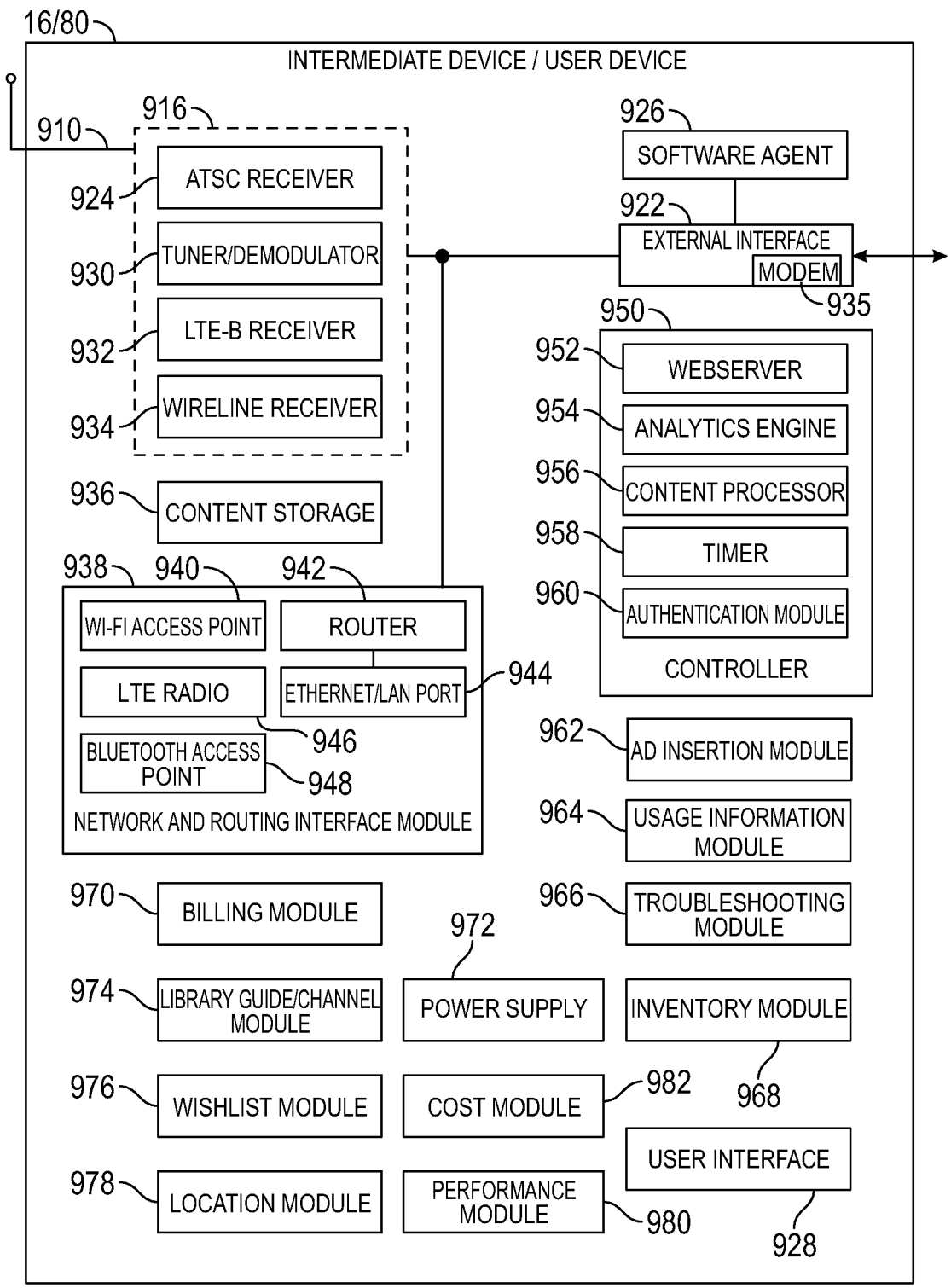
FIG. 9 is a block diagrammatic view of a device within system such as the intermediate device.

Referring now to FIG. 9, the intermediate device 16 or user device 80 is illustrated in further detail. However, the block diagram is also applicable to the node/devices 712-750 and an end user device 760 of FIG. 7, at least in part or in full and therefore specific block diagrams for those devices are not provided. An antenna 910 such as a television antenna or an LTE antenna may be used and interface with the interface 916. The interface 916 may thus be configured to receive LTE-B (eMBMS or MBSFN) or may interface with an ATSC receiver 924 or an LTE-B receiver 932 or for receiving over-the-air television signals with dormant capacity. The ATSC receiver 924 may be an ATSC 3.0 receiver. Thus, the intermediate device 16 may have a tuner demodulator 930 for tuning to and demodulating the signal received over an external input interface 922. A software agent 926 may communicate to and from the intermediate device 16/user device 80. Certain data may be required to be received in certain formats from different devices. Likewise, data can be communicated to other devices though the software agent 926. The software agent 926 may be an application used for requesting and receiving content for use, such as playback. A user interacts with the software agent 926 or application using the user interface to identify the content to be played back or data requested. More particularly, when the application is in a user device and the content or data is stored in an intermediate device and the user of the user device wants to use the data in non-real time (from the first time when it was stored in the intermediate device), a request for the content is made from the application at a second time. The second time is later than the first time and thus real-time consumption from the point of view of when the content is stored at the intermediate device is not performed. Non-real time consumption of the content or data at a first user device of the plurality of user devices is performed at a second time later than the first time. Later and in real time, the content or data from the intermediate storage device is communicated to the user device and is consumed at the user application and the user device immediately when requested. The content may be communicated though a local area network from the intermediate device to the requesting user device.

A user interface 928 such as a keyboard, a remote control, a mouse, a touchscreen, a button or buttons, a switch or switch, a dial or dials may be used to communicate to the intermediate device 16 or the user device 80. Content selections, wish list selections control selections may be controlled or indicated though the user interface 928.

The tuner demodulator 930 may also tune and demodulate the L-band signal or an ATSC signal received through the input interface 922. The tuner demodulator 930 may also have error correction therein such as forward error correction (FEC). The LTE-B receiver 932 for receiving external inputs from the interface 922. The LTE-B receiver 932 receives the broadcast signals over an ATSC system. A wireline receiver 934 may be used to receive networking traffic. The wireline receiver 934 may be a USB or HDMI interface.

The external interface 922 may also represent a connection to the Internet 18 through the wired or wireless communication network. That is, the external interface 922 may comprise a modem 935 for communicating content to the intermediate device 16/user device 80.

The intermediate device 16/user device 80 includes content storage 936 that is used to store content therein. The content storage 936 may include solid-state devices or a hard disk drive.

A networking and routing interface 938 may include various network and routing access points. For example, a Wi-Fi access point 940 may be used to interface with a router 942. However, the router 942 may also be used for wired communications using the Ethernet/LAN port 944. The networking and routing interface 938 may include an LTE radio 946 for communicating LTE radio signals from the device. The LTE-B receiver 932, as well as the LTE radio 946, may be incorporated into a signal unit. The intermediate device 16/user device 80 may also communicate using Bluetooth. That is, a Bluetooth access point 948 may be incorporated into the network and routing interface module 938.

The intermediate device 16/user device 80 may include a controller 950. The controller 950 may perform many functions, including as a web server 952, an analytics engine 954 and a content processor 956. Although individual interconnections are not illustrated in FIG. 9, the controller 950 may control the underlying timing and functions of the various modules within the intermediate device. The web server 952 may communicate content from the intermediate device in an IP format. The controller 950 may also tune to the data at predetermined times as determined by the timer 958. The timer 958 may be synchronized with various other intermediate devices within the system using GPS or internet-based time standard. The content processor 956 tunes to receive the content at predetermined times as a broadcast and/or a unicast, manages the storage of the content, verifies the integrity of the stored content and receives and manipulates manifest files, which provide instructions for downloading the content. The analytics engine 954 handles the intermediate device-based analytic functions for the system.

Neighboring intermediate or other devices may also receive and transmit from the intermediate device 16/user device 80. The network and routing interface 938 may communicate with other intermediate devices for receipt of content, content chunks or missing content at the content storage 936. Missing content may occur when network errors, hardware errors or weather prevent the content from being received at the content storage 936. Communication with other intermediate devices may take place using the web server 952 using an internet protocol.

The network and routing interface 938 may communicate a request signal to the communication system provider 12 or the content service provider 90 to request content chunks or missing content at the content storage 936. The communication system provider may communicate the requested content in a unicast manner using dormant capacity to the requesting intermediate device. A complete broadcast retransmission may also be performed in response to the request. Retransmission may occur if a significant number of intermediate devices request particular content.

An authentication module 960 may also be included within the controller 950. The authentication module 960 may communicate authentication signals to the communication system provider or for the content service provider so that the devices may intercommunicate properly. An unauthorized device may not be able to receive content from the communication system provider.

An ad insertion module 962 may be used for inserting ads at predetermined times during a broadcast. The ad insertion module 962 may splice ads based upon user preferences that are predefined. The ad insertion module 962 may act in response to a trigger for inserting advertisements that may be stored within the content storage 936.

A usage information module 964 may provide the communication system provider 12 or the content service provider 90 with information as to the usage of various information, content and programming within the intermediate device 16/user device 80. By providing the usage information, content of interest may be communicated to the intermediate device 16/user device 80. Usage information may also be data related to monitoring the utilization of the network that communicates the signals to the intermediate device 16/user device 80. The intermediate device or user device may provide to the distribution system with data regarding the use or downloading of certain content or content genres.

A troubleshooting module 966 is used for transmitting troubleshooting information over the outbound signals to the analytics engine for analysis to identify problems with sourcing video files or the installation of the intermediate device 16/user device 80.

An inventory module 968 stores an inventory of the content stored within the content storage 936. The inventory module 968 may also be used to remove content that has expired per the metadata received with the content. After the content expires, the inventory module 968 removes the content to free space within the content storage 936.

A billing module 970 may transmit billing information from the intermediate device 16/user device 80 to the content service provider 90. The billing module 970 may collect viewed content and other information to provide billing to the owners of the intermediate device 16/user device 80. The billing module 970 may also report inventory data from the inventory module 968 to the intermediate device.

The intermediate device 16/user device 80 may also include a power supply 972 for powering the various modules therein.

The intermediate device 16/user device 80 may also include a library guide/channel module 974. The library guide/channel module 974 will be described in further detail below. The library guide/channel module 974 may be used to assemble a program guide or virtual channel based upon the contents stored within the content storage 936.

The intermediate device 16/user device 80 may also include a wishlist module 976. The wishlist module 976 may allow the user of the intermediate device or other device to establish a wishlist for content to be received in the future. As mentioned above, the wishlist set forth in the wishlist module 976 allows the content distribution system 710 to pre-position desired content by the users.

A location module 978 may also be provided in the intermediate device 16/user device 80. The location module 978 may be coupled to a GPS of a mobile device. The location may vary due to movement and thus the delivery of content and the resources associated therewith may be adjusted as mentioned above. In a stationary device, the location module 978 may be configured during setup with an address. Both the wishlist module 976 and the location module 978 may be coupled to the content storage 936 for storing the data therein.

A performance module 980 may also be disposed within the intermediate device 16/user device 80. The performance module 980 may monitor the network conditions both upstream and downstream of the device. The performance module 980 may communicate back to the content distribution system 710 a signal that corresponds to the performance feedback or radio metrics of the communication network or networks. An efficiency metric may be determined that corresponds to the efficiency of that portion of the communication network associated with the particular device. The performance module 980 generates a data signal that provides data corresponding to the upstream or downstream efficiency of the network of the system around the particular component of the communication network. The efficiency metric data is communicated to the content distribution system 710. Examples of performance feedback or radio metrics include but are not limited to signal-to-noise ratio (SNR), signal-interference-to-noise ratio (SINR), channel quality indicator (CQI) and other related metrics.

A cost module 982 may also be incorporated into the intermediate device 16/user device 80. The cost module 982 may have a cost associated with the use of the network, a cost associated with the use of the compute, and a cost associated with the use of storage. The cost may vary depending upon the time of day and various system resources. The cost may be provided in monetary terms or in some relative data.

Figure 10:
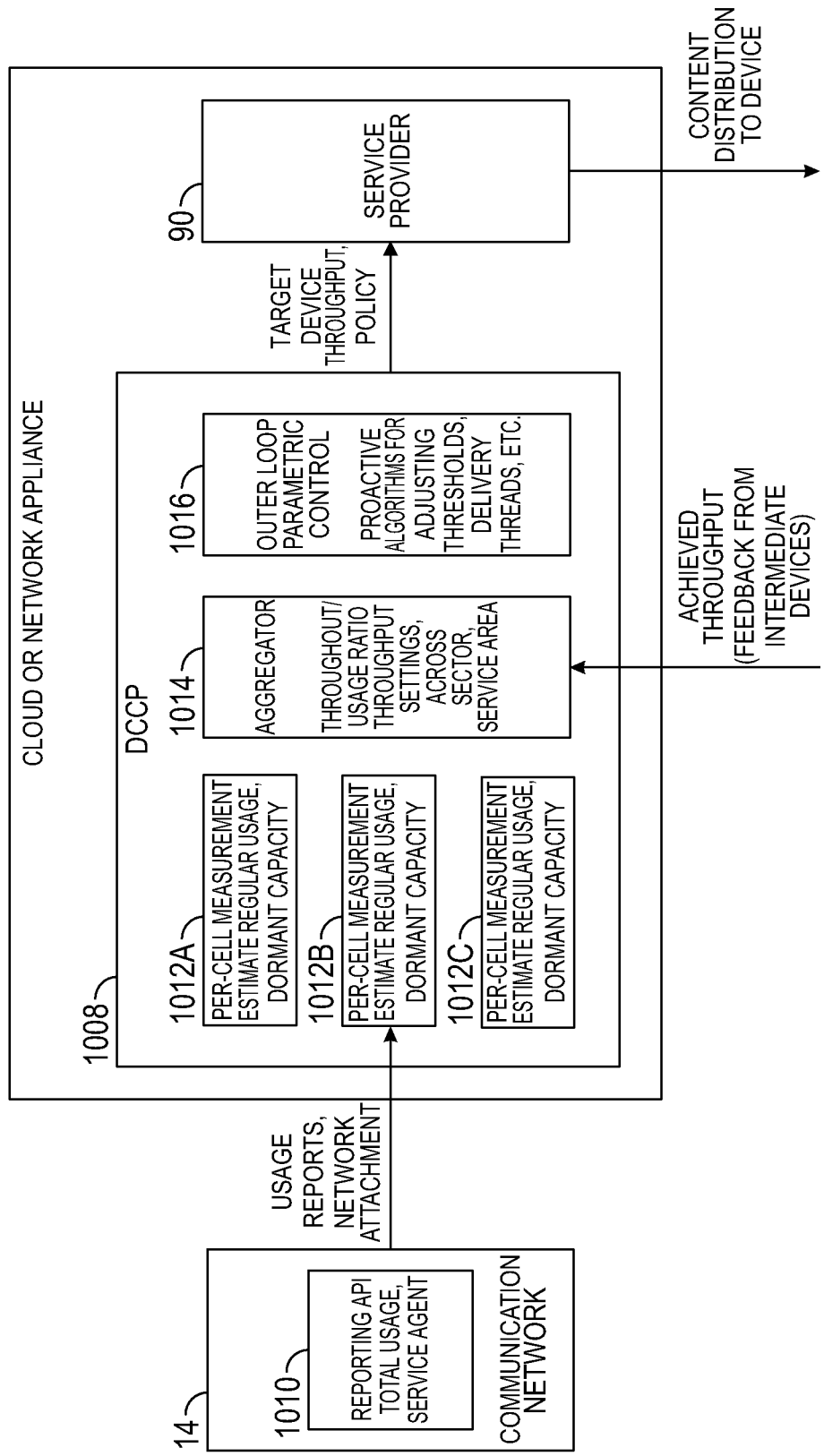
FIG. 10 is a high-level block diagrammatic view of a dormant capacity control protocol system.

Referring now to FIG. 10, dormant capacity can be capacity available outside of the capacity that is required to serve a similar type of traffic that is increasingly served during peak network use and served less-so during non-peak network use. Dormant capacity can also be capacity available for content pre-positioning at the intermediate devices or user devices and within their content storage and subsequent consumption of that content by users directly from the intermediate devices, and which is not the capacity required for real-time voice and data requests from users or for distribution of content to users and for its immediate consumption. To identify dormant capacity usage patterns of the "primary, non-dormant" network may be reviewed. Dormant capacity may be automatically identified on a real-time basis by receiving information as to the amount of network not being consumed for "primary, non-dormant" use. The identified capacity may be automatically provisioned for use as the dormant capacity in response thereto. "Primary, non-dormant" capacity may run in parallel to "dormant" capacity use such that both are running across the entirety of the resource the entirety of the time but assigning a lower QoS value or identifier to the dormant capacity use so that dormant capacity is only used whenever such resources are not being used by a higher QoS "primary, non-dormant" use such as broadcast communication networks such as cellular, television broadcast, cable television, satellite and the like.

The dormant content delivery system may also be used for delivering device, software and application updates that are associated with the intermediate device or user devices associated with the intermediate device. An inventory list may also include device identifiers, software identifiers and application identifiers. The inventory list may also list the devices associated with the various software and applications.

In FIG. 10, a dormant capacity control protocol (DCCP system) 1008 is used to harvest unused or dormant capacity in networks so that content is stored in the intermediate devices 16 or the devices 712-750 in locations close to where the user consumes the content using an unconstrained medium, such the local area network 310 (Wi-Fi, Ethernet etc.). In the example set forth below, the DCCP system 1008 manages dormant radio resources in a wireless cellular network. However, the teachings are equally applicable to other types of networks, such as satellite systems or combinations of different types of networks such as those described above.

The content distribution service of interest (referred to herewith as "service") provided by the content service provider 90 uses inputs from the DCCP system 1008 to determine how much data can be delivered and preposition content using dormant capacity. The goal is to leverage as much of dormant capacity as possible, without contending with regular network traffic at all. The system continually adjusts its operational parameters and capacity usage targets, based on metrics received from the network 14 and the intermediate devices 16, to provide elastic dormant capacity management. The desired dormant capacity may vary by time of day and may be determined by input from the operator of the communication system 12. For example, at certain times of the day more dormant capacity may be used as a buffer, such as in rush hour, than other times of the day such as after in the overnight hours.

DCCP system 1008 uses reports from a reporting application interface (API) the network 14 on resource usage to determine network capacity usage—and hence estimate available dormant capacity. The network capacity may be calibrated when no service data is being communicated. This may be performed at various times. In an exemplary cellular network, the reports are communicated using report signals and may by provide data, for example, on physical resource block (PRB) usage within the radio network, received from the network 14 on a per-cell basis. In a cellular network, PRB usage is most effective as a capacity usage measurement metric, since it gives a concrete view of how much of a radio capacity of a cell is being used. DCCP system 1008 uses the metrics to determine the rate at which the service provider can deliver data to devices through the network 14.

The DCCP system 1008 uses resource usage reports to determine the total usage level in the network 14 (referred to herewith as "total usage"). The DCCP system 1008 also determines, from the report data, the level of the capacity of the network being used by regular traffic (e.g., in a wireless network, the percentage of a cell's radio resource blocks used by regular traffic). The regular capacity associated with the communication system provider is referred to as herewith as "regular usage". The DCCP system 1008 then determines the maximum dormant capacity (in this example, in terms of the percentage of network resources) available for use by the service provider 90. This is the available dormant capacity, which may be expressed as the percentage of the total or overall system capacity, and is referred to herewith as a maximum dormant capacity) Max Dormant Capacity.

An upper bound can be used for the Max Dormant Capacity. For example, a 70% threshold could be employed, which means that the DCCP system 1008 will seek to maintain total usage within 70%, while staying as close to that upper bound as possible. In this example, the total usage amount is referred to as the "total usage threshold". Of course, absolute units of capacity may be used. By setting the threshold in this manner, sufficient buffer room in the network 14 accommodates sudden spikes in regular usage.

The upper bound provides a "breathing" or elasticity mechanism. That is, the increases or decreases of the network load are continuously monitored so the level of dormant capacity is continuously calibrated. The service provider 90 utilizes changing dormant capacity to the fullest extent possible while not causing contention with regular network traffic or creating disruptive traffic spikes. The maximum dormant capacity may be expressed as Max Dormant Capacity=total usage threshold−regular usage The DCCP system 1008 also uses the network reports to estimate the level of usage of network resources by the service provider 90 (referred to as "service usage"). In an exemplary cellular network, service usage would signify the average instantaneous percentage usage of a cell's capacity by the Service. The DCCP system 1008 measures the actual throughput (amount of data over time) achieved by each device such as a user device 80 or an intermediate device 16 (referred to from here on as "intermediate device") that receives a delivery during the reporting period. Each intermediate device 16 may communicate the throughput as an achieved throughput signal that is ultimately communicated to an aggregator 1014 of the DCCP system 1008.

Service usage can either be reported explicitly by the communication network 14 or can be estimated by DCCP system 1008 from total usage and regular usage, e.g., service usage=total usage—regular usage. If the communication network 14 reports to the DCCP system 1008 the total usage and regular usage for a reporting period, service usage can be accurately determined.

If only total usage is reported by the communication network 14, the DCCP system 1008 can estimate service usage in one of two ways. In the first way, a previously reported (by the communication network 14) accurate value of regular usage, and subtracting this from total usage. This assumes that regular usage in the communication network has remained at that previously reported level since that reporting period. Regular usage may be determined by periodically measuring regular usage by deliberately not running service traffic (data) over defined intervals of time, and then measuring total usage during those periods. For those periods, regular usage=total usage. The periods of no service traffic may be referred to as Quality Control Gaps or (QC) Gap. The second way of determining service usage may be performed by applying that the system was attempting to target total usage at a level of (Max Dormant Capacity used in the current period+the previous period's regular usage), and using the delta (Δ) between actual total usage (reported for the current period) and this target to estimate regular usage and service usage. For example:

Delta(Δ)(for this reporting period)=total usage−(Max Dormant Capacity used in Current Period+Previous Period's regular usage)

regular usage(for this period)=regular usage(previous period)+Delta*<Factor-1,e.g. ½> service usage(for this period)=Max Dormant Capacity used in Current Period+Delta*<(1−Factor-1), e.g. ½>

The "Max Dormant Capacity used in current period," in turn, is estimated based on the Max Dormant Capacity value determined at the end of the prior cycle, i.e., the Max Dormant Capacity target coming into the current cycle. This number is adjusted downwards, based on downtimes in the current cycle when deliveries did not occur, and based on any throttling the Network might have done. The premise is that the system went in with a Max Dormant Capacity target, and the assessed dormant capacity usage is lower if either the full delivery cycle was not leveraged, or if a lower throughput than target was achieved (throttling). Also, if during the current delivery period, if updated capacity reports were received from the network that resulted in the Max Dormant Capacity value being modified, a weighted average Max Dormant Capacity value (based on the various Max Dormant Capacity values used during different deliveries in this period) can be used.

The idea is that the usage delta is being "debited" to both regular usage and service usage. On one hand, the Delta is being (at least partially) attributed to regular usage having increased or decreased relative to the last accurately measured value. At the same time, the Delta is being (at least partially) added to or subtracted from the value of Max Dormant Capacity, which is being used as the target capacity having been used by the Service, i.e., asserting that the Service has used more or less dormant capacity than was targeted.

With this approach, regular usage and service usage gets cumulatively adjusted period-to-period, based on the delta. This also means that Max Dormant Capacity is adjusted period-to-period, since Max Dormant Capacity=total usage threshold—regular usage.

The approach serves to continually adjust the operational settings of the DCCP system 1008 to counter spikes and dips in network capacity usage driven either by increases in regular network usage or service usage.

Throughput targets are set based on DCCP system 1008's learned correlation between achieved throughput and resource usage. DCCP system 1008 uses prior measurements of achieved throughput and resource utilization to establish a throughput to usage ratio. DCCP system 1008 then uses this ratio, in conjunction with available dormant capacity, to set and throttle throughputs to intermediate devices moving forward.

For unicast delivery, DCCP system 1008 learns the correlation between the achieved throughput for an intermediate device 16 and the network resource utilization for the delivery of content to that intermediate device 16 in prior reporting cycles. For a single cell wireless sector, for example, resource usage would be the usage in the cell of interest. For a multi-cell (multi-carrier) wireless sector, this would be the average resource usage across the cells in the sector. The throughput to usage ratio is an efficiency or radio metric that reflects the quality of radio conditions that the intermediate device 16 has been experiencing. The usage is resource usage (Percent or a fraction of cell capacity used). A higher ratio value would indicate more favorable radio conditions, since the intermediate device 16 is able to extract a higher throughput for a given level of resource usage. This ratio is combined with available dormant capacity to determine the throughput target to an intermediate device 16 for a given content delivery cycle. The throughput to usage ratio is continually refined and fine-tuned, based on continuous (cycle-by-cycle) measurements of throughput and resource usage.

The throughput to usage ratio and associated adjustment procedures provides another level of elasticity or "breathing" to the system. This approach uses continual measurements of network resource usage (by regular network traffic and by the service), as well as intermediate device throughputs, to fine-tune the ratio and continually calibrate target throughputs.

The associated content distribution service provider 90 may utilize unicast or broadcast transport schemes to deliver and preposition content to intermediate devices 16 using the dormant capacity. For example, modern cellular networks provide both broadcast and unicast transport types. With unicast, the service provider 90 delivers content to one device at a time. The service provider 90 can adopt a round-robin scheme to simulate broadcast delivery to devices. With broadcast, the same content stream is delivered to multiple devices simultaneously. Broadcast uses radio resources much more efficiently and delivers significantly improved spectral efficiency, since it uses the same set of radio resources to service many devices. The DCCP system 1008 manages dormant capacity to service both unicast and broadcast delivery approaches.

Within a delivery cycle, the DCCP system 1008 determines an appropriate mix of unicast and broadcast loads to be targeted by the service provider 90. This mix may be a proportion and can be managed to optimize for capacity (system throughput) or coverage. Such a decision would determine the broadcast/unicast "cutoff", i.e., the coverage threshold (e.g., signal strength, SINR) below which a particular device's link is deemed to be too weak for the device to be included in the broadcast group.

The proportion can be managed to optimize for capacity (system throughput) or coverage, or any other number of parameters including proportion of content to be delivered destined for one or a small number of intermediate devices, vs. proportion of content to be delivered destined too many intermediate devices, and the overall level of priority of that content. That is, if content to be delivered destined for one or a small number of intermediate devices becomes significantly higher priority than the content to be delivered to many intermediate devices, then unicast delivery can be used to deliver that content (since more efficient than broadcast for delivery to only one intermediate device or a small number of intermediate devices, until such priority is equalized, at which point broadcast can be used to deliver content to be delivered destined for many intermediate devices.

In essence, this becomes a linear optimization problem—optimizing the mix of number of devices included in the group, vis-a-vis the modulation and coding scheme (MCS) that can be applied to transmissions to the group (the MCS, in turn, directly influences the data rate), and the revenue obtainable to the service provider 90 from the service being delivered.

One dimension of the decision between broadcast and unicast may revolve around whether to choose a smaller broadcast group of devices with much better radio conditions (enabled for higher throughput covering fewer devices), and delegate the other devices to unicast, vs. choosing a larger broadcast group with a lower SNR/signal strength cutoff, enabled to receive lower throughput but covering a large number of devices—effectively maximizing the aggregate throughput achieved. The decision may be different for different communication system providers. One choice may be that may be used in determining broadcast versus unicast is when creating a smaller broadcast group of intermediate devices when significantly higher-fidelity conditions (receiving a higher modulation and coding scheme (MCS), higher throughput) maximizes system throughput. Higher MCS use translates to higher spectral efficiency. Another choice may be when creating a larger broadcast group of intermediate devices, some in slightly weaker radio conditions (i.e., having a lower cut-off) produce a higher throughput product. Broadcasting delivers higher overall spectral efficiency, given the same set of radio resources being used to serve a number of users. Hence, a larger broadcast/unicast split would increase spectral efficiency.

The linear optimization is an attempt to arrive at the right mix that produced the highest throughput and spectral efficiency.

Another dimension of the broadcast unicast mix decision may revolve around revenue maximization. That is, a smaller broadcast group of premium (high-paying) users may be prioritized when higher aggregate revenue from the content being served is higher. Conversely, a significantly larger group of lower-revenue users may be chosen to be unicasted when higher aggregate revenue is generated.

An additional constraint may be a predetermined upper broadcast capacity limit on the amount of broadcast capacity of the dormant capacity usable by the service provider 90 that is used. The predetermined upper broadcast capacity limit may be a percentage or fixed amount of system resources that are applied to broadcast (e.g., capping broadcast capacity of the dormant capacity at 60%+/−5% of total system capacity), which may be set forth as Target Broadcast Usage=MIN (Max Broadcast Usage, Max Dormant Capacity)

Unicast Service Traffic can then use the remaining dormant capacity

Target Unicast Usage=Max Dormant Capacity—target broadcast usage

Therefore, if unicast is the only delivery mode in use by the service provider 90, then:

Target Unicast Usage=Max Dormant Capacity

The DCCP system 1008 correlates past service usage to achieved end device throughput in a ratio, i.e., throughput to usage ratio=throughput achieved for an intermediate device/service usage or simply throughput to usage ratio.

The throughput to usage ratio is maintained separately for each intermediate device 16 and is an efficiency metric that reflects the radio conditions of the intermediate device 16 and, in a wireless network, the modulation and coding scheme level (MCS) that the intermediate device 16 is able to use. That is, if the intermediate device's signal-noise ratio (SNR) is high, the system is able to achieve a higher throughput with a given level of resource usage).

The DCCP system 1008 then uses the throughput to usage ratio, and available dormant capacity (Max Dormant Capacity), to set throughput targets ("target throughput") for all the intermediate devices for the next delivery cycle. The throughput targets can be per-device target throughputs for unicast (point-point) delivery, or an average target throughput for broadcast delivery. For example, target throughput=throughput/usage*target unicast usage.

The above calculation has a target unicast usage to achieve the target throughput, based on the known correlation between Throughput and service usage. The service provider 90 then uses target throughput settings, derived from DCCP system 1008, to adjust service usage throughput dynamically to utilize available dormant capacity, maintaining total usage in the cell within an upper bound of the total usage threshold. The idea is to use as much of the dormant capacity as possible, without going over the total usage threshold and creating any contention with regular network users. The process continues, through each reporting/delivery cycle. At the start of each delivery cycle, target throughputs are used to regulate data flow to the intermediate devices. At the end of each delivery cycle, the resource usage report for the period enables DCCP system 1008 to determine actual service usage for the cycle and re-estimate the throughput to usage ratio per intermediate device. As described earlier, Max Dormant Capacity (and hence, target unicast usage) may also be adjusted period-to-period, based on adjustments made to regular usage.

A sudden spike in regular usage results in total usage spiking up (potentially exceeding total usage threshold). This can result in a higher service usage estimate than target unicast usage, and a lower throughput to usage ratio estimate for this cycle. In other words, the DCCP system 1008 sees more resources having been consumed to achieve the target throughput than earlier estimated (i.e., target unicast usage). At the same time, if regular usage is adjusted upwards, target unicast usage may also be reduced. Consequently, a lower target throughput setting is determined for the intermediate device than for the current delivery cycle. In this fashion, DCCP system 1008 self-corrects to bring down total usage to within the total usage threshold, moving forward. The converse happens if there is a sudden drop in regular usage, the throughput to usage ratio is increased, and a higher service throughput is targeted to fill the void.

The service usage determined for a cycle can be higher or lower than the target usage level (target unicast usage) because either: (a) regular usage spiked up or down, resulting in the calculated service usage going up or down; or (b) the prior throughput to usage ratio estimate was not accurate, and service usage was higher or lower than the dormant capacity target. In either case, DCCP system 1008 self-adjusts target throughput to correct the situation. This elasticity, or breathing mechanism, helps maintain total usage within bounds, while using as much of the dormant capacity as is desired.

The logic described above can be applied to a multi-cell (multi-carrier sector) scenario in a wireless network. If a sector has multiple carriers (service providers), each carrier is treated as a cell. A service provider 90 can turn on carrier aggregation in a multi-carrier sector, e.g., in an LTE or 5G network. The DCCP system 1008's multi-carrier handling factors in two dynamics: The intermediate device can move between carriers (cells) within the sector. This can manifest itself as a handover, if the intermediate device is active and connected to the communication network. Here, the LTE network becomes immediately aware of the cell change and flags this to the service provider 90. The intermediate device can execute a cell reselection procedure and change cells, in the case where the intermediate device is not actively connected to the wireless network. In this case, the network does not immediately become aware of the cell change. Further, carrier aggregation can occur, i.e., the intermediate device can be simultaneously connected to, send through and receive from, more than one carrier (cell). In LTE, for example, this can happen dynamically—the Network can add cells to/remove cells from an intermediate device at any time. The decisions are typically made by the wireless network's scheduler The multi-cell nature of this scenario leads to the premise that the intermediate device has potential access to the full bandwidth of the sector, i.e., to all carriers in the sector. Two approaches are the possible sector averaging approach and multi-cell attachment aware approach.

In the sector averaging approach, the DCCP system 1008 does not depend on knowing precisely to which cells the intermediate device is connected. It assumes that each intermediate device receiving delivery has access to the overall bandwidth of the sector, and uses sector-averaged values of the key resource usage parameters, i.e., target unicast usage, total usage, service usage and regular usage.

The DCCP system 1008 receives per-cell usage reports from the Network. The network also needs to inform DCCP system 1008 as to which cells (carriers) are configured for the sector, and the primary cell that an intermediate device 16 is connected.

DCCP system 1008 uses various parameters in its calculations and include but are not limited to total usage=average of total usage values for all carriers (cells) in the sector, regular usage=average of regular usage values for all carriers (cells) in the sector, service usage=(average of service usage values for all carriers (cells) in the sector)/number of intermediate devices simultaneously receiving delivery in the sector (the assumption here is that resource usage was shared equally amongst all the intermediate devices that received delivery). Another parameter is target unicast usage=average of target unicast usage values for all carriers (cells) in the sector. Yet another parameter may be throughput achieved=achieved throughput (measured by the system) by the intermediate device in a delivery cycle The numbers are used in the same calculations described generically in earlier sections—to derive throughput to usage ratios and target throughputs for intermediate devices.

The Multi-Cell Attachment Aware Approach factors in precise cell attachment awareness, i.e., DCCP system 1008 is aware of which cells (carriers) the intermediate device 16 is attached to at any given point in time. The assumption here is that the communication network 14 informs DCCP system 1008 when cells are added to and removed from the intermediate device's connection to the communication network 14.

In the Multi-Cell Attachment Aware Approach, the DCCP system 1008 determines per-device resource usage numbers based on measurements from the actual cells that the intermediate device has been connected. The DCCP system 1008 uses one of more of the following parameters in its calculations total usage=average of total usage values across the carriers (cells) the intermediate device has been connected to, regular usage=average of regular usage across the carriers (cells) the intermediate device has been connected to, service usage=average of service usage values across the carriers (cells) in the sector that the intermediate device is connected to, target unicast usage=average of target unicast usage values for all carriers (cells) in the sector and throughput achieved=achieved throughput (measured by the system) by the intermediate device in a delivery cycle.

The numbers are used in the same calculations described generically in earlier sections—to derive throughput to usage ratios and target throughputs for intermediate devices.

For purposes of adjusting targeted throughput, the intermediate device 16 is assumed to have access to the full dormant capacity in the sector, i.e., target unicast usage averaged across all cells in the sector.

Target throughput for an intermediate device for its next delivery period=target unicast usage*throughput/PRB The DCCP system 1008 also manages the number of active threads in the system. Each enabled thread can be considered to be a content delivery task and does round-robin delivery to the intermediate devices, delivering to one intermediate device at a time—a "simulated broadcast" scheme. The round-robin, threaded scheme is another level of protection, aimed at preventing traffic spikes and regular traffic being affected. The number of parallel threads enabled per sector will depend on the regular usage in the sector. An example of a thread allocation scheme is: if regular usage for the sector <a Lower threshold, light up (N−1) Threads, where N=number of carriers in the sector. If regular usage for the sector is between the Lower threshold and an Upper threshold, light up one Thread. If regular usage for the sector > the Upper threshold, then light up 0 Threads (i.e., the system is paused)

The DCCP system 1008 therefore provides an "outer layer" of control in the outer loop policy control module 1016, modulating the use of capacity based on regular usage in the Network. This Thread management adds a layer of multi-carrier elasticity to the "breathing" provided by the base component of the algorithm. The threshold values are configurable and dynamically adjustable based on traffic load.

With broadcast delivery, the Service is able to serve multiple intermediate devices with the same content, using the same set of radio resources simultaneously. Hence, service usage leveraged by broadcast is exploited by multiple intermediate devices.

Broadcast functionality in wireless systems can also leverage simultaneous transmission of identical broadcast streams from multiple time-synchronized cells using the same radio channel. The synchronized multi-cell transmissions are received and combined by a device to achieve a higher signal-noise ratio (SNR), especially for cell edge devices that can hear transmissions from multiple cells. This feature extends broadcast into a multi-cell transmission paradigm, enabling a larger number of devices to receive a broadcast with good quality. Such a set of cells synchronized for broadcast constitutes the service area.

When estimating dormant capacity availability for broadcast, the DCCP system 1008 considers all cells in a service area. How well an intermediate device is served by a broadcast session depends on: (a) the radio conditions the intermediate device is experiencing; and (b) the available capacity of the cells the intermediate device can access.

A related innovation relates to the service provider 90, while using the broadcast service of the communication network, the traffic load may be divided up into multiple broadcast sessions. In this example, a broadcast period consists of multiple broadcast sessions, each representing a portion of the content that the service provider 90 needs to download and preposition in the participating intermediate devices 16 in the service area. The service provider 90 establishes the broadcast sessions in the communication network 14, using available dormant capacity. This is done to make the process more granular, i.e., if the communication network is unable to support the total throughput requested, it will decline some sessions. However, not all sessions are declined.

At the start of a broadcast period, DCCP system 1008 determines available dormant capacity in the cells that comprise the service area and establishes the target throughput for the broadcast period. This target throughput is split across the broadcast sessions established by the service provider 90 through the communication network 14. In an ideal situation, each participating intermediate device 16 should receive the full target throughput. Realistically, this may not happen, because: (a) the intermediate device 16 may not successfully receive all broadcast sessions; and (b) the intermediate device 16 may not receive the full throughput of a session it has received.

One issue is the communication network 14 may decline one or more of the broadcast sessions the service provider 90 has requested to be established. This is part of admission control functionality typically supported by wireless networks. For example, if the service provider 90 has requested the establishment of 20 broadcast sessions at 1 Mbps each, the communication network 14 may decide to admit just 12 of the sessions. This can vary across the cells in the service area. For example, one cell may have the capacity to admit all 20 sessions, whereas another cell in the service area may only have the capacity to admit 15 sessions.

The disparity in the number of sessions may happen because the regular user traffic of the communication network requires enough capacity from the system, to allow for only 12 of the broadcast sessions to be carried out while preserving sufficient capacity for the rest of the regular user traffic. Therefore, some sessions may be admitted only by a subset of the cells in the service area; and hence may not be received by all intermediate devices 16 in the service area. Hence, a given intermediate device that is part of the broadcast period may receive only a subset of the sessions delivered. This occurs when one or more cells allows the establishment of a different number of sessions from the 20 requested, due to the contention with regular user traffic as described above. In this case, cells may have only 12, 15, or 18 or any other subset of 20 sessions admitted.

Similarly, the modulation and coding scheme (MCS) rate chosen for the broadcast in a given service area may effectively be deciphered by only a subset of the devices in a given cellular area. This may be as a result of the SINR of the individual devices in any given cell within the service area, providing for a device to effectively decode a certain MCS rate, or otherwise not be able to decode it due to inferior RF conditions. As such, the throughput achieved by the broadcast session across a cell, may be as high or lower, than the raise sent by the broadcast session. That is, if only 80% of the users are able to receive the 1 Mbps throughput in a session, the average throughput received by an intermediate device in this cell or broadcast session (as the average throughput across all participating intermediate devices in such cell or service area) will be 800 Kbps.

Average throughput received by the intermediate device 16 across a cell or service area then becomes an important metric, and becomes an important factor in understanding efficiency or radio metric of a broadcast—as the % of the throughput sent by a session vs the throughput received by the group of devices. Further, it can then be learned how this efficiency of a broadcast session changes, depending on the MCS level chosen for the broadcast and the robustness of the SINRs of the participating devices. Separately, it can be learned how much the efficiency is dependent on the level of dormant capacity loading attempted vs the level of regular user traffic available across the service area.

Another useful feedback metric is coverage level, defined as the percentage of devices in the broadcast that experienced delivery failure rates of less than a defined threshold value.

At the start of a broadcast period, the DCCP system 1008 determines the Broadcast target throughput for the period. This can be done in different of ways including using a reasonable spectral efficiency target or the radio conditions at the intermediate device16.

For the reasonable spectral efficiency target 1 bit/sec/Hz is often used as a thumb rule for wireless broadcast systems. The target is applied to target broadcast usage to determine Broadcast target throughput. In other words, multiply the total spectral bandwidth in the available radio resource blocks by the chosen spectral efficiency to get the target throughput. This can be done cell by cell in the service area, based on the available dormant capacity in each cell. A target throughput is thus derived per-cell. An aggregated target throughput value, across all the cells in the service area, then needs to be derived from the per-cell values. This is because the service provider 90 ultimately has to submit one target throughput value, per session, to the wireless network. The aggregation in the aggregator 1014 can be done in multiple ways, including but not limited to choosing the lowest number obtained across all the cells (least common denominator approach)—if coverage maximization is the goal; choosing the highest number obtained across all the cells (the Network can always scale the service back, cell-by-cell, if it cannot meet that requirement); or, determining an "adjusted mean" based on the spread of the individual per-cell throughput values.

The adjusted mean approach takes into account the throughput actually allocated to the service provider 90 by the communication network will lie somewhere between the requested target throughput value and the lowest throughput supportable across the cells in the service area. If the spread of the per-cell throughput values is high, the service could end up receiving a significantly lower throughput than the requested value. For example: if the target throughput values are spread between 10 Mbits/sec and 30 Mbits/sec, and the service provider 90 requests a mid-value of 20 Mbits/sec, the service provider 90 will realistically get a throughput somewhere between 10 and 20 Mbits/sec. This is because the cells with the higher available capacity levels (i.e., capable of providing greater than 20 Mbits/sec) will still only provide 20 Mbits/sec. However, the "less capable" cells will provide throughputs ranging from 10 to 20 Mbits/sec, depending on their available capacity (spectrum) levels.

If, however, the spread is narrow (e.g., between 15 and 20 Mbits/sec), the service provider 90 will not get an allocation far removed from its requested rate. Therefore, taking this spread into account is helpful. The idea here is to choose a net throughput target higher than the average; the deviation from the mean being determined by the spread (standard deviation); the higher the standard deviation, the higher the selected value is above the mean. For example, choosing a value like (Mean+1 Standard Deviation) would make sense.

The target spectral efficiency level can subsequently be adjusted (for future broadcast periods), taking into account achieved throughput and Coverage Level feedback. For the next broadcast period, for the same service area, target spectral efficiency can be adjusted up or down based on the feedback collected.

A more deterministic approach uses measurements of the radio conditions of the intermediate device, to determine a deliverable throughput target more accurately. For each participating intermediate device, the radio channel quality (measured by signal strength, signal/noise-interference ratio (SINR), channel quality indicators, and other similar metrics) is used to determine a target modulation and coding scheme (MCS) level for the intermediate device.

The mapped MCS level reflects the highest modulation order that the intermediate device, in its current radio conditions, can reliably demodulate; as well as the level of channel coding (forward error correction) that needs to be applied to correct errors. The MCS level reflects the applicable spectral efficiency target and is converted to target throughput (for the intermediate device), based on the number of available radio resource blocks (available spectrum). Once this is done, the individual (per-device) target throughputs can be aggregated across all participating intermediate devices 16 in the service area. As explained for the earlier method, the aggregation may involve choosing the mean target throughput value across all the intermediate devices, choosing a least common denominator choice, i.e. the lowest of the per-intermediate device values calculated across all the intermediate devices, choosing a highest common denominator value, i.e. the highest of the per-intermediate device values calculated across all the intermediate devices, choosing an "adjusted mean" value, factoring in the spread across all per-intermediate device target throughput values.

Once the overall target throughput for a broadcast period is determined (Broadcast target throughput), this is divided into multiple parallel broadcast sessions within the period.

Target throughput per Session=Broadcast target throughput/Throughput per Session For example, if the overall throughput target is 20 Mbits/sec, and it is desired to run broadcast sessions with 1 Mbit/sec each, 20 identical broadcast sessions are started up.

At the end of a broadcast period, DCCP system 1008 determines achieved device throughputs and Coverage Level. DCCP system 1008 also determines the Resource Usage—per-cell, and average across the cells in the service area, for the broadcast period. Available dormant capacity is also updated at this point.

For parallel unicast sessions, the DCCP system 1008 continues to manage dormant capacity. Unicast sessions are handled as described earlier, but with the target unicast usage value being used for Max Dormant Capacity, at least while broadcast sessions are simultaneously occurring.

Adjustments Based on Regular Network Traffic Load

Regular metrics from the communication network 14 inform the DCCP system 1008 as to whether the regular traffic load in the network has gone significantly up or down. If network load goes up significantly, DCCP system 1008 can shut down a number of broadcast sessions based on the estimated loading increase. Conversely, new broadcast sessions can be started up if network load is seen to have reduced significantly.

Radio Measurements may be leveraged to fine-tune operation of the system. In addition to collecting and using radio resource usage metrics to manage dormant capacity (as explained so far), DCCP system 1008 can also leverage network quality measurements. For example, signal strength and signal-noise ratio measurements can be used. In some wireless systems, it is possible to obtain signal strength and signal-noise ratio metrics specific to unicast and broadcast, i.e., determine how well the intermediate device can receive unicast signals as well as broadcast signals combined from multiple cells. Additionally, metrics such as latency and jitter can factor in as well.

Measurements can be collected in at least two ways. The first is by having the participating intermediate device 16 collect the radio metrics (e.g., from the modem processing unit in the intermediate device) and conveying them (over-the-top) to the service provider functionality located at the other end of the communication network 14. The intermediate device 16, in many ways, provides the best eyes-and-ears, since it can quantify the precise quality of experience it is receiving.

By deploying a software agents 1012A-1012C in the radio access network, e.g., at the cell level—for example, in an eNodeB in a cellular network. The software agent 1012 here provides a variety of network-side measurements, including radio resource usage information, directly to the service provider 90. Such information may include the regular usage being consumed so that the dormant capacity may be ascertained therefrom.

The DCCP system 1008 leverages the metrics to refine its dormant capacity management. For example, DCCP system 1008 then uses signal strength and or signal-noise ratio measurements to derive the appropriate modulation and coding scheme (MCS) level that the radio network might use to deliver content to a given intermediate device. Using this projected MCS level, DCCP system 1008 can better quantify a target throughput to be used for the intermediate device.

For broadcast, the same scheme can be used to determine the possible MCS level for each participating intermediate device 16 in the service area, derive the average MCS level usable for that population of intermediate devices 16, and then use the MCS level to set a more accurate target throughput for the broadcast period.

Additionally, metrics such as latency and jitter can be used to further refine the understanding at the DCCP system 1008's of the radio conditions of the intermediate devices, and further fine-tune dormant capacity management.

The DCCP system 1008 has an outer-loop parametric control system as illustrated in FIG. 10. Key operational parameters that drive DCCP system 1008 operation such as total usage threshold and Real Usage thresholds for Thread management are either configured (e.g., through a dashboard or programmatic API) or learned. A learning scheme uses historical data to determine day-of-week, time-of-day settings for the parameters. For example, total usage threshold values can be set for different times of the day, and different days of the week, by observing and storing past measurements of total usage, and assessing typical time-of-day, day-of-week total usage values.

In general, the DCCP system 1008 receives per-cell reports with the data described above from the communication network 14 and uses the metrics to estimate dormant capacity and service usage. The aggregator 1014 component then consolidates processing across sectors and service areas (for broadcast) and determines throughput to usage ratios and target throughputs (for intermediate devices or for broadcast periods). Feedback from the intermediate device 16 or 724 informs DCCP system 1008 on real throughput achieved by the intermediate devices 16 or 724. Finally, an outer-loop policy control module 1016 proactively configures the DCCP system 1008 operation with the parameters that drive its operation. The output from the DCCP system 1008 drives the operation of the service provider 90, informing the service as to when to start/pause/resume content delivery and what the target throughputs to intermediate devices are.

The DCCP system 1008 may be used for determining both broadcast and unicast for the mix of broadcast and unicast provided by the service provider 90. An optimum mix may be provided based upon the perimeters set forth above. The target throughput for a broadcast session using dormant capacity or unicast sessions is set forth.

The radio quality metric such as the signal strength or the signal to noise ratio are used to fine-tune the dormant capacity management and operational settings. Outer loop policy controls dynamically adjust the DCCP system operating parameters based upon feedback from the wireless network. The dynamic adjustment of thresholds such as the upper bound traffic usage threshold or the buffer may be changed. The DCCP for multiple unicast and broadcast cell configuration mode is provided. The system can accommodate a single-cell single carrier sector or sector with multiple carriers with or without carrier aggregation. The DCCP system 1008 for dual connectivity scenarios is enabled. Of course, the present system may be used with a variety of wireless technologies including LTE, 5G and satellite technologies.

Figure 11:
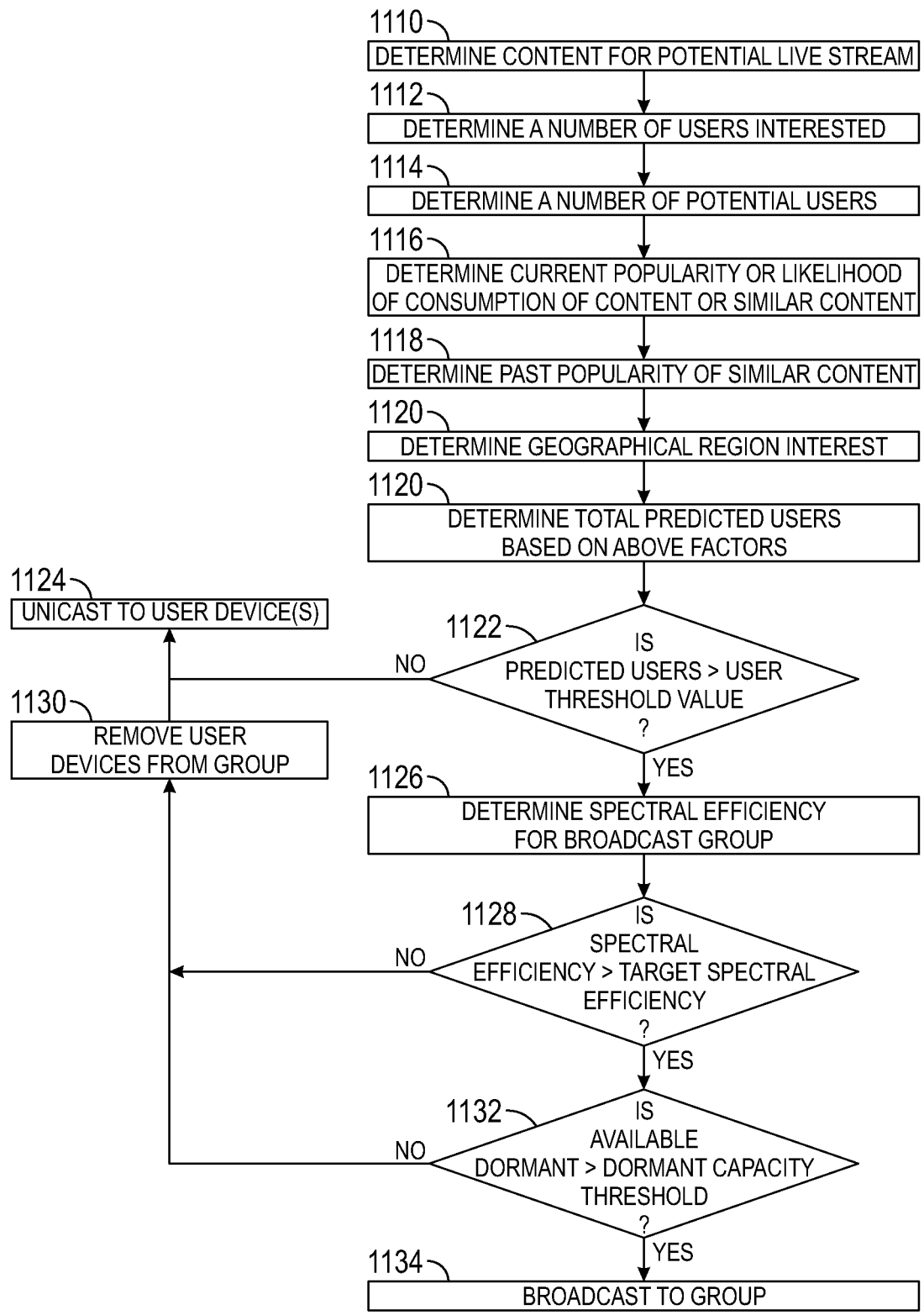
FIG. 11 is a flowchart of a method for communicating a live stream.

Referring now to FIG. 11, a method for establishing a live stream is set forth. The establishment of a live stream may be continually evaluated by the distribution system 710. That is, the distribution system 710 can continuously determine whether to communicate a transmission by way of a broadcast or unicast. In step 1110, content for a potential live stream is determined. The content for live stream may be a live event that is being transmitted at a predetermined bit rate. In step 1112, a number of users interested in the live stream is determined. In step 1114, a number of potential users for the live stream is also determined. The number of potential users corresponds to those users like to consume or join the live stream or are likely to consume the content in the future.

In step 1116, the current popularity or likelihood of consumption of the content or similar content is determined. The popularity or likelihood of consumption of the content may correspond to the particular content or a similar piece of content. For example, a television series may have similar popularity across the entire series. A similar piece of content may be determined by the genre, the director, the actors, the channel and the like.

In step 1118, the past popularity or likelihood of consumption of similar content may also be determined. The past popularity of similar content may correspond to the popularity of content in similar genres. An average number of sign-ups for similar past live streams or content may also be determined and factored into the user potential user determination.

In step 1122, the total number of predicted user devices (predicted total user value) based upon the factors in steps 1112-1120 is determined. Different factors may be weighted in different manners, the output of step 1120 may, for example, be a number of potential users. Certainly, the number of users signed up for an event from step 1112 may be considered in full within the predicted total users. However, the number of potential users, the popularity and the past popularity may change (increase) the number of predicted total users. Likewise, because various networks are used in various geographic regions, the popularity served by a particular communication network may have the number of predicted total users increase based upon a geographical factor. That is, the content may be more relevant to people or user devices in a certain geographic area and thus a localized predicted total user count is increased in a certain area. The geographic area may be a factor in determining broadcast mode, unicast mode or both because of the associated user count in the geographic area In step 1122, the predicted total users are compared to a user threshold value. When the number of predicted users (predicted total users) is not above the user threshold in step 1122, step 1124 unicasts the content to the user devices. In step 1122, when the predicted total users are greater than the user threshold, step 1126 determines the spectral efficiency for the potential broadcast group. In step 1128, when the spectral efficiency is not greater than the target spectral efficiency in step 1128, step 1130 removes the user devices from the broadcast group. Thereafter, unicasting is used for the unicasting group in step 1124 as mentioned above.

Referring back to step 1128, when the spectral efficiency is greater than the target spectral efficiency, step 1132 is performed. In step 1132, it is determined whether the available dormant capacity (available spectrum) is greater than a dormant capacity threshold. When the available dormant capacity is not greater than a dormant capacity threshold, step 1130 is again performed which removes user devices from the group. In step 1132, when the dormant capacity is greater than a dormant capacity threshold, step 1134 broadcast content or the live stream to the group of user devices.

Figure 12:
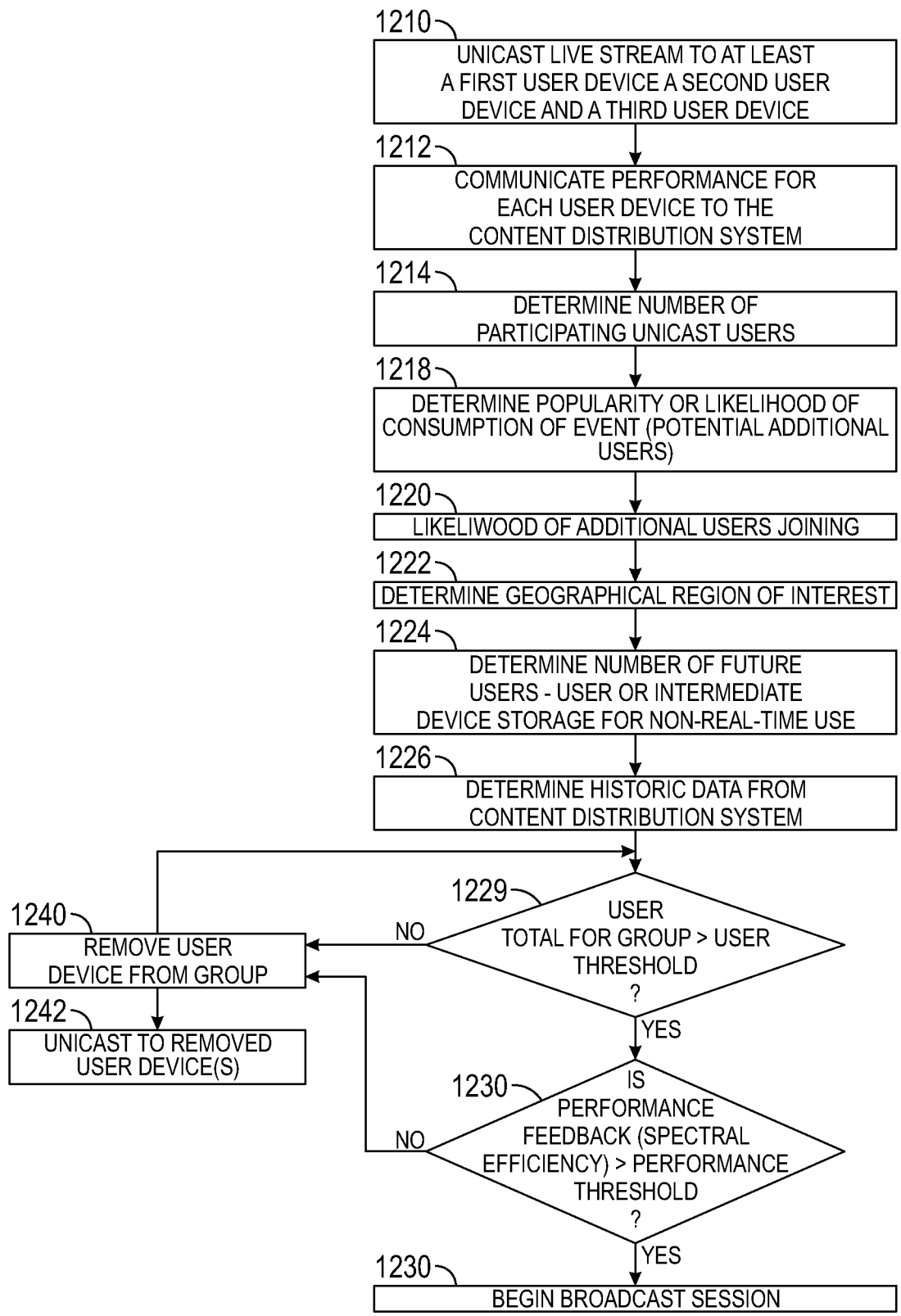
FIG. 12 is a flowchart for a method of migrating from a unicast to a broadcast.

Referring now to FIG. 12, a method a migrating a live stream (content) from a unicast mode to a broadcast mode is set forth. A live stream may be established in a unicast mode. However, when more users join the live stream, it may make more sense from a spectrum perspective to migrate the unicast users to a broadcast mode. Users that do not meet the spectral requirements may continue to receive the live stream using a unicast. In step 1210, a live stream (content) is unicasted to at least a first user device, a second user device and a third user device.

In step 1212, performance data for each of the user devices is communicated to the content distribution system. Various indicators of performance were described in detail above. In step 1214, the number participating unicast users is set forth. As mentioned above, three unicast users are provided for in step 1210. However, more unicast users may receive a unicast for the live stream. In step 1218, the popularity or likelihood of consumption of the content in the live stream event as well as potential additional users is determined. In step 1220, the likelihood of additional users joining the event may be determined. In step 1222, a geographical region of interest and the likelihood of users in the geographical interest may also be taken into consideration. In this example, the number of future user devices is determined. In step 1224, the number of future user devices for the user devices or intermediate devices that may have the content stored for non-real-time use is determined. Likewise, in step 1226, historical data from the content distribution system is used to also provide an indicator of future user devices. In step 1228, the total number of users and potential users is compared to a user threshold. When the user total for the group is greater than the user threshold, the performance feedback (spectral efficiency) or radio metrics from the various user devices or intermediate devices is determined. The performance feedback, radio metrics or consumption behavior feedback is communicated from a software agent of each device to the distribution system. When the performance feedback or radio metrics are greater than the performance threshold and the user number is greater than a user threshold, step 1232 begins a broadcast session in all or some of the user or intermediate devices being unicasted to are changed to be broadcasted to.

Referring back to step 1228 and 1230, when the user total is not greater than a user threshold or the performance is not greater than a performance threshold, step 1240 is performed. In step 1241, one or more user devices are removed from the group of consideration. This may allow the rest of the users to join a broadcast. In step 1242, the removed devices from the group may be unicasted to or maintain the unicast. FIG. 12 may be continually performed to allow the number of broadcast user devices to change based upon the various devices.

Figure 13A:
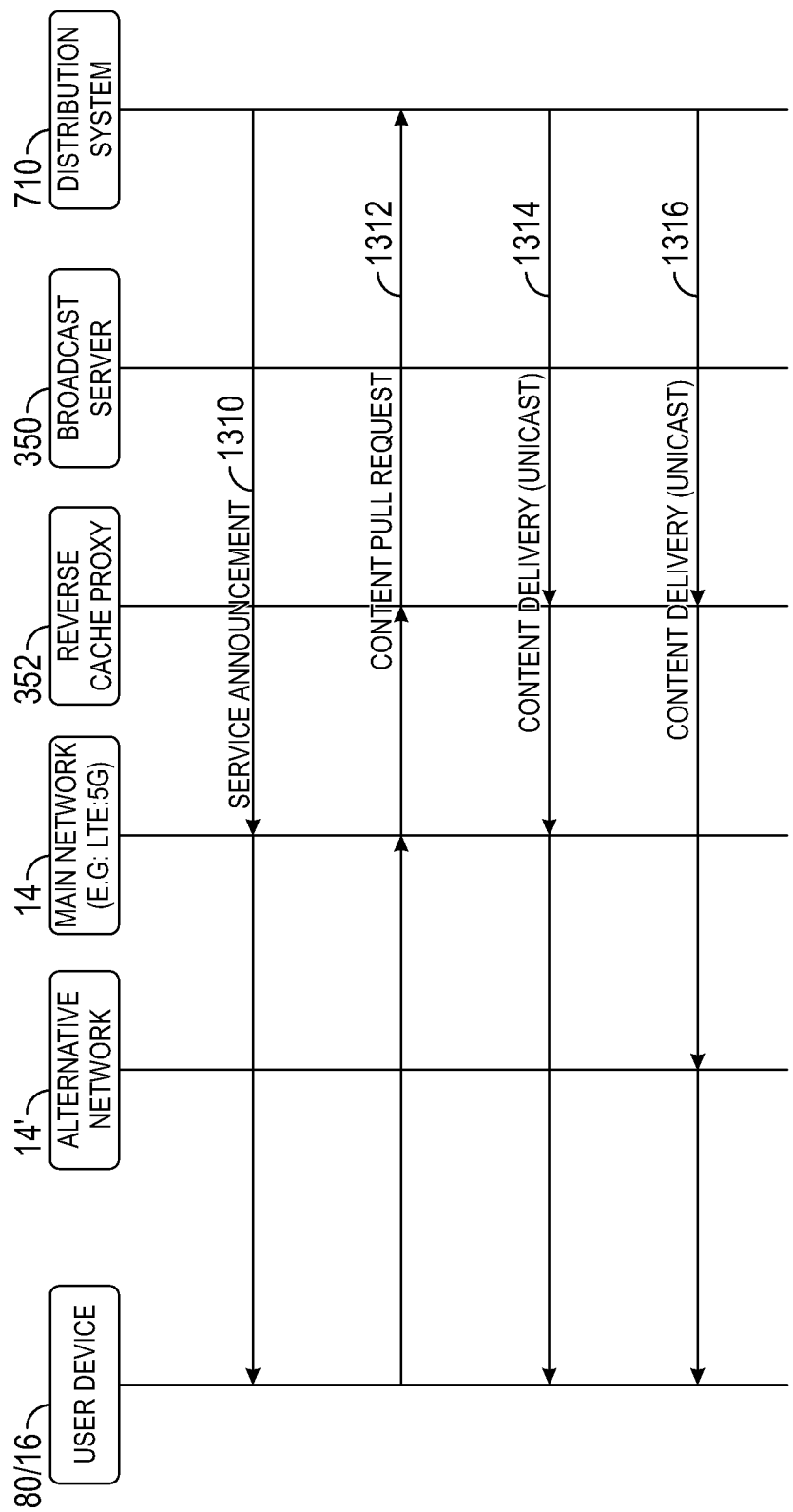
FIG. 13A is a signal diagram for unicasting a live stream.
Figure 13B:
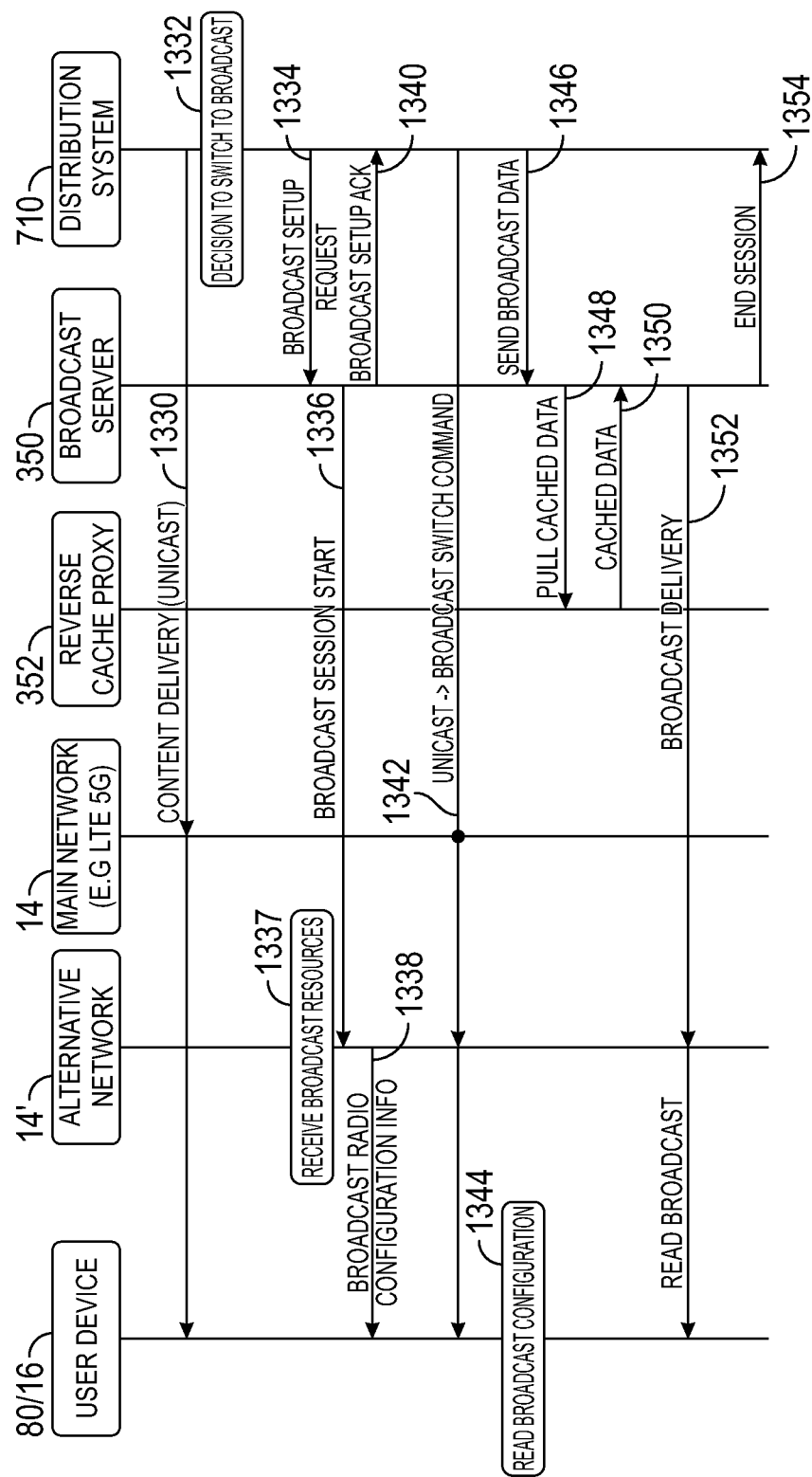
FIG. 13B is a signal diagram of a method for switching from unicast to broadcast.

Referring now to FIGS. 13A and 13B, a signal flow diagram of the method of FIG. 12 is set forth. In this example, a user device 80 is illustrated. However, the user device may also be an intermediate device 16. The user device in FIGS. 13A and 13B represents a plurality of user devices. A service announcement signal 1310 is communicated from the distribution system 710 to the one or more user devices 80. The service announcement may be an over-the-top application layer message that uses the services of TCP or UDP over IP. The service announcement informs the user device 80 of a live streaming session that is about to start. The service announcement may include a universal resource locator (URL) of the location to access the live stream. The service announcement signal is communicated from the distribution system to the main network or alternate network 14' (not illustrated) to the user device 80 or intermediate device 16.

A content pull request signal 1312 is communicated from the user device to one of the networks 14, 14' to a reverse cache proxy server 352 to the distribution system 710. The URL provided in the service announcement 1310 may refer the user device to the reverse cache proxy server 352. This may be a location where the content is cached for efficient delivery to proximal users. The reverse cache proxy server 352 may be within or next to the wireless network or other places within the broader network. A content delivery signal 1314 is communicated from the distribution system to the reverse cache proxy server 352, which may have the actual content therein. The reverse cache proxy communicates the content through the main network 14 or the alternate network 14' to the user device. The content delivery signal 1316 illustrates the content delivery through unicast may take place through one of the networks 14 or through multiple networks 14, 14' to provide efficient delivery. The live stream ultimately gets delivered to the user device 80 as part of the response to the pull request. The distribution system 710 may verify the request and ultimately instruct the reverse cache proxy server 352 to provide the actual content. The constituent messages of the live stream get routed by the IP network to the outer edge of the wireless network such as to a PD gateway, a GSSN or a user plan function in 5G. Ultimately, the traffic is routed over the wireless network to the user device 80 or the intermediate device 16.

Referring now specifically to FIG. 13B, signal 1330 provides content delivery through unicast. Block 1332 provides a decision to switch to broadcasting. As mentioned above, the switch to broadcasting may take place based upon various algorithms that take into consideration popularity levels, user patterns, the participating user count, the spectral efficiency comparisons and the like. Based upon this, a broadcast setup request signal 1334 is communicated from the distribution system 710 to the broadcast server. The broadcast server generates a broadcast session start signal 1336 that is communicated to the main network 14 or the alternative network 14'. In this example, the alternative network 14' is used. However, the main network 14 may have also been used. In step 1337, the alternative network 14' processes the broadcast session start signal and allocates radio and network resources to support the upcoming broadcast session. This may include, but is not limited to, the selection of the spectrum resources such as the radio carriers/subcarriers, the time slots (frame and sub-frame repetitions), spatial layers, etc. The network resources are also reserved. A broadcast radio configuration information signal 1338 is communicated through the alternative network 14' to the user device 80 or user device 16. A broadcast radio configuration information 1338 is broadcasted from the alternative network 14' to the user device 80/16 or intermediate device 16. The radio resource configuration informs the user device how to download or receive the content from the alternative network 14'. The broadcast server, in step 1340, communicates a broadcast setup acknowledge signal to the distribution system 710 to indicate that the broadcast session is being set up in the alternative network 14'. The acknowledge signal 1340 may be communicated while the setup is in progress or after the broadcast session setup has been confirmed.

A unicast to broadcast switch command signal 1342 is communicated from the distribution system 710 after the broadcast setup acknowledge signal 1340. The distribution system communicates the unicast to broadcast switch command signal to the network such as the main network or alternative network performing the broadcasting. In this example, the alternative network 14' receives the switch command signal. The switch command signal is also communicated to the user device from the alternative network 14'.

In block 1344, the user device 80 or intermediate device 16 starts to set up its radio, broadcast client and other resources to tune to the alternative network 14'. The device may user the information from the switch command to determine which radio resources in the alternative network 14' to tune into.

In step 1346, the distribution system 710 issues a send broadcast data command signal to the broadcast server 350. This allows the broadcast server to pull data that is to eventually be broadcasted to the user device. The data being pulled may also include the universal resource locator of the reverse cache proxy server 352. The broadcast server 350 pulls cached data such as the live stream data from the indicated URL. This may take place using HTTP, DASH, RTP or proprietary means. A pull cached data signal 1348 is communicated from the broadcast server 350 to the reversed cache proxy server 352. The cached data is ultimately communicated from the reverse cache proxy server 352 to the broadcast server 350 in the cached data signal 1350. Ultimately, the broadcast server generates a broadcast delivery signal 1352 that is communicated to the alternative network 14', in this example, and to the user device 80 or the intermediate device 16. As mentioned above, a plurality of user devices 80 and a plurality of intermediate devices 16 may receive the broadcasted signal or live stream.

As part of the process, some of the devices may be kept on unicast as illustrated in FIG. 13A. Ultimately, a live stream may be delivered as a combination of a unicasted signal and a broadcasted signal using unicast delivery and broadcast delivery, respectively.

Figure 14A:
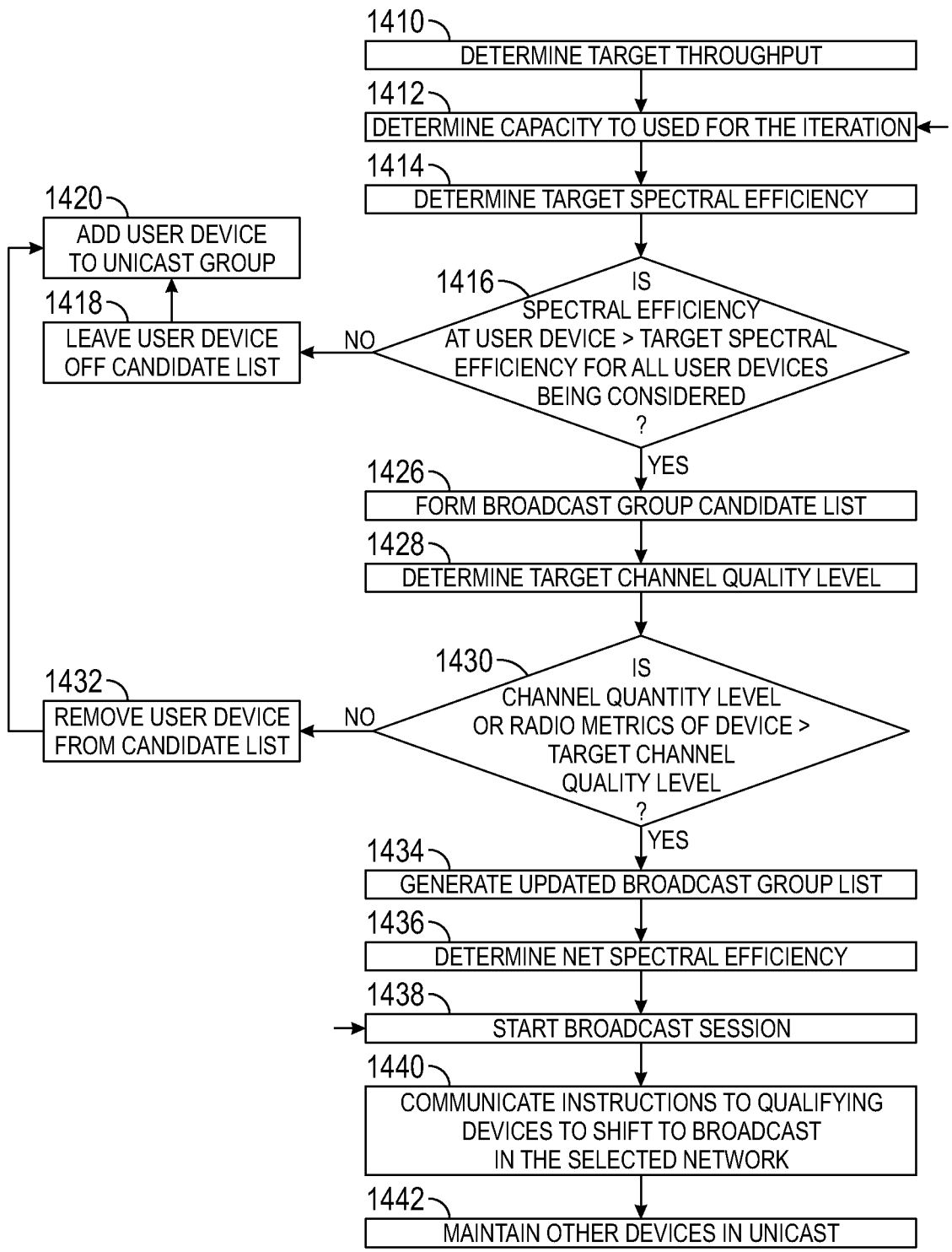
FIG. 14A is a flowchart of a method for managing resources for the potential delivery of a live stream.

Referring now to FIG. 14A, the method for providing radio resource management for live streaming is set forth. In step 1410, a target throughput is determined. The target throughput, as mentioned above, correspond to the chosen bit rate of the audio/video live stream being considered for live stream. In step 1412, the percent capacity to be used for broadcasting for the particular iteration is determined. The iterations, as mentioned above, may take place using a variety of percentages for the broadcast stream. The percentages are for assumed portions of capacity (spectrum) allocated to unicast and broadcast. In one example, 0% broadcast and 100% unicast may be chosen. In each successive iteration, the amount of broadcast percentage is increased and the unicast percentage decreased to add to 100%.6. Ultimately, an optimum distribution of capacity across broadcast and unicast deliveries is determined. The optimum blend of broadcast group size and unicast group size is determined so that it has the highest net spectral efficiency of a number of blends.

In step 1414, a target spectral efficiency is determined. The target spectral efficiency to be used for the broadcast delivery is based upon the available spectrum for broadcasting in the particular iteration. In this case, the percentage capacity used for broadcast times the wireless capacity is the capacity for the broadcast. Ultimately, the target spectral efficiency is determined by dividing the target throughput by the capacity of the broadcast for the particular iteration. Ultimately, the spectral efficiency at the user device is compared with the target spectral efficiency for all of the devices being considered. When the spectral efficiency at the user device is not greater than the target spectral efficiency for all of the devices, step 1418 leaves the user device as a unicast device and thus the considered user device is not part of the broadcasting. In step 1420, the user device in question is added to the unicast group.

Referring back to step 1416, when the spectral efficiency of a user device is greater than the target spectral efficiency, the considered user device is added to the broadcast group candidate list in step 1426.

In step 1428, a channel quality level is determined. In step 1430, when the channel quality level of the device is not greater than the target channel quality level, step 1432 removes the user device from the candidate list. Thereafter, step 1420 is performed in which the user device is added to the unicast group.

Referring back to step 1430, when the channel quality level of the device is greater than the target channel quality level, an updated broadcast group list is generated in step 1434.

Ultimately, the net spectral efficiency is determined. The net spectral efficiency in the case of both broadcasting and unicasting has both a broadcast and unicast component. This will be described in further detail in FIG. 15B. Once the net spectral efficiency is determined, the iteration with the highest net spectral efficiency that does not exceed the overall system capacity is determined. After step 1336, step 1438 starts a broadcast session with the selected percentage of broadcast and unicast for the overall available capacity. In step 1440, the instructions for receiving the broadcast signal are communicated to the devices so that a shift from unicast to broadcast may take place. In step 1442, the other devices in the system that are part of the unicast group are unicasted to.

Figure 14B:
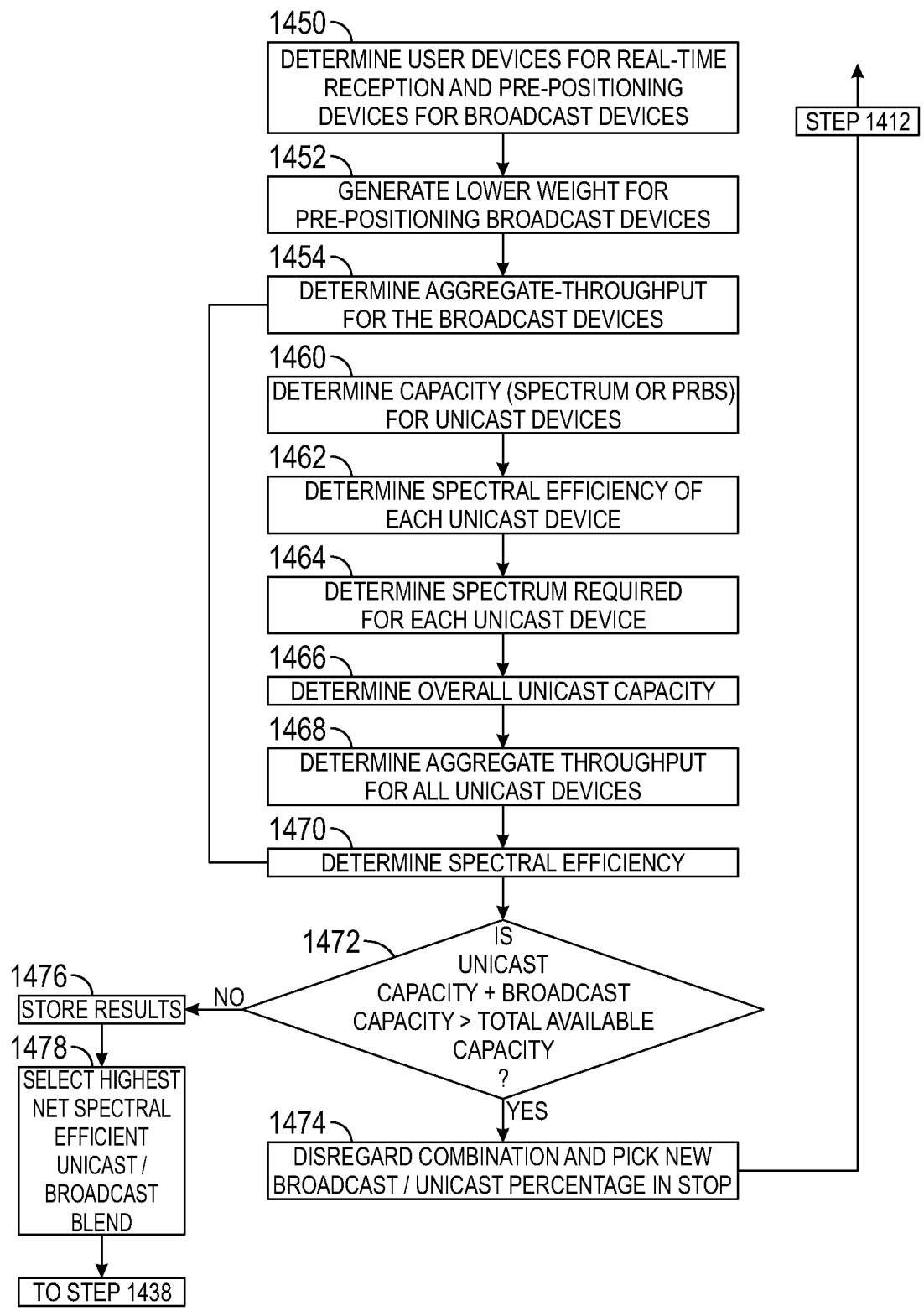
FIG. 14B is a detailed method for determining the net spectral efficiency of FIG. 14A.

Referring now to FIG. 14B, the method of determining the net spectral efficiency is set forth in further detail. In step 1450, the user device is for real-time reception or live content reception and for prepositioning is determined. As mentioned above, the channel quality and the forecasting for such devices is described above. In step 1452, a lower weight for prepositioning at broadcast devices is provided. In step 1454, the aggregate throughput for the broadcast devices is determined. The aggregate throughput corresponds to the target throughput times the number of devices that are used for real-time reception and for prepositioning. The prepositioning may be derated by a derating factor as mentioned above with respect to the lower weight in step 1452. Ultimately, broadcasting may be using a lower predevice spectral efficiency level than could be used by a radio disadvantaged device in a unicast mode but the resource-sharing aspects boost the ultimate net spectral efficiency.

In step 1460, the capacity for the unicast devices is determined. In this example, each of the unicast devices are considered individually and summed. The capacity of the unicast devices may be determined as part of a spectrum or physical resource block. In step 1462, the spectral efficiency of each unicast device is determined based upon its radio conditions. The radio conditions may be communicated back to the content distribution system through feedback. In step 1464, the spectrum required for each unicast device is also determined. The spectrum required for each unicast device corresponds to the target throughput divided by the spectral efficiency for each device. Ultimately in step 1466, the overall unicast capacity is determined. The overall unicast capacity is the sum of the capacity required for all of the devices across the unicast group.

In step 1468, an aggregate throughput for all the unicast devices is determined. The aggregate throughput for all of the unicast devices corresponds to the target throughput times the number of unicast devices. Ultimately, steps 1454 and 1468 communicate to determine the net spectral efficiency in step 1470. Ultimately, the net spectral efficiency of the particular iteration is the sum of the aggregate throughput for the unicast group (unicast aggregate throughput) and the aggregate throughput of the broadcast group (broadcast aggregate throughput) divided by the sum of the capacity of the unicast group and the capacity of the broadcast group.

Referring now to step 1472, the unicast capacity and the broadcast capacity are summed and compared to the total capacity available (available spectrum). If the sum of the capacity of the unicast device is plus the capacity of the broadcast devices exceeds the total capacity, the sum is excluded from consideration in step 1474. In step 1474, the next iteration also changes the percentage of the broadcast capacity and unicast capacity of the system. After step 1474, step 1412 in FIG. 14A is performed.

In step 1472, when the unicast capacity plus the broadcast capacity is not greater than the total available capacity, the data is saved until a selected best or highest net spectral capacity is determined. That is, the results are stored in step 1476. After step 1476, step 1478 selects the highest net spectral efficient unicast/broadcast blend from the blends. Thereafter, step 1438 starts a broadcast session with the selected percentages.

Figure 15A:
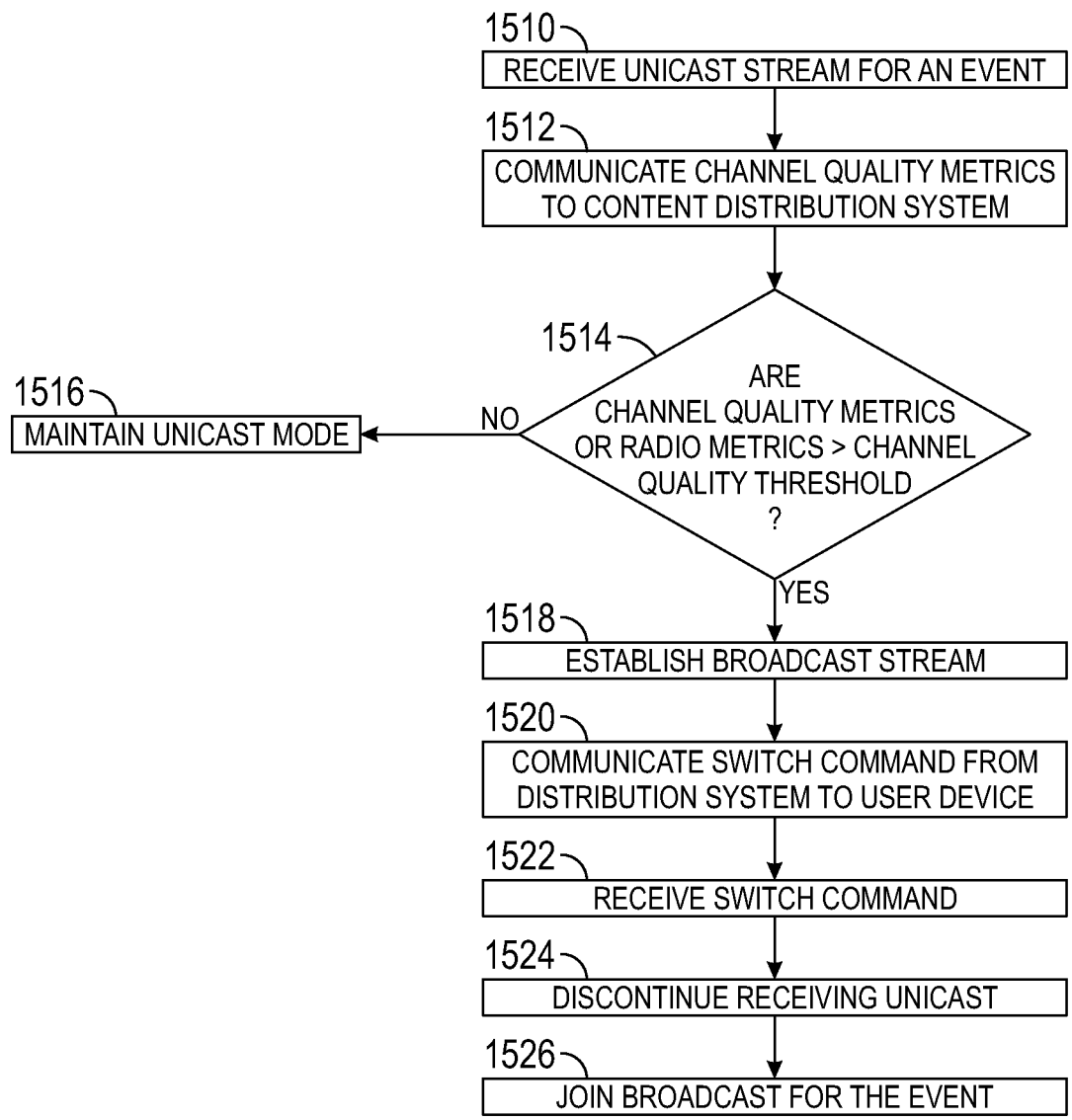
FIG. 15A is a flowchart of a method for operating a device and switching the device from a unicast stream to a broadcast stream.

Referring now to FIG. 15A, the method operating a device is set forth. In step 1510, a unicast stream is received for an event or live stream. In step 1512, the channel quality metrics for a user device are communicated to the content distribution system. As mentioned above, the channel quality metrics may include the signal to noise ratio, the signal interference to noise ratio and the channel quality indicator. In step 1514, the channel quality metrics are compared to a channel quality threshold. When the channel quality metrics are not greater than the channel quality threshold, step 1516 maintains the device in the unicast mode.

In step 1514, when the channel quality metrics are greater than the channel quality threshold, step 1518 establishes a broadcast stream. In step 1520, a switch command is communicated from the distribution system to the user device. In step 1522, the switch command is received at the user device (or the intermediate device). In step 1524, the unicast stream is discontinued. In step 1524, the broadcast stream for the event is joined. This process may take place at several user devices. The process is continually monitored in terms of the channel quality to determine whether broadcasting may be joined. The process set forth in FIG. 15A is similar for a new device that joins a live stream.

Figure 15B:
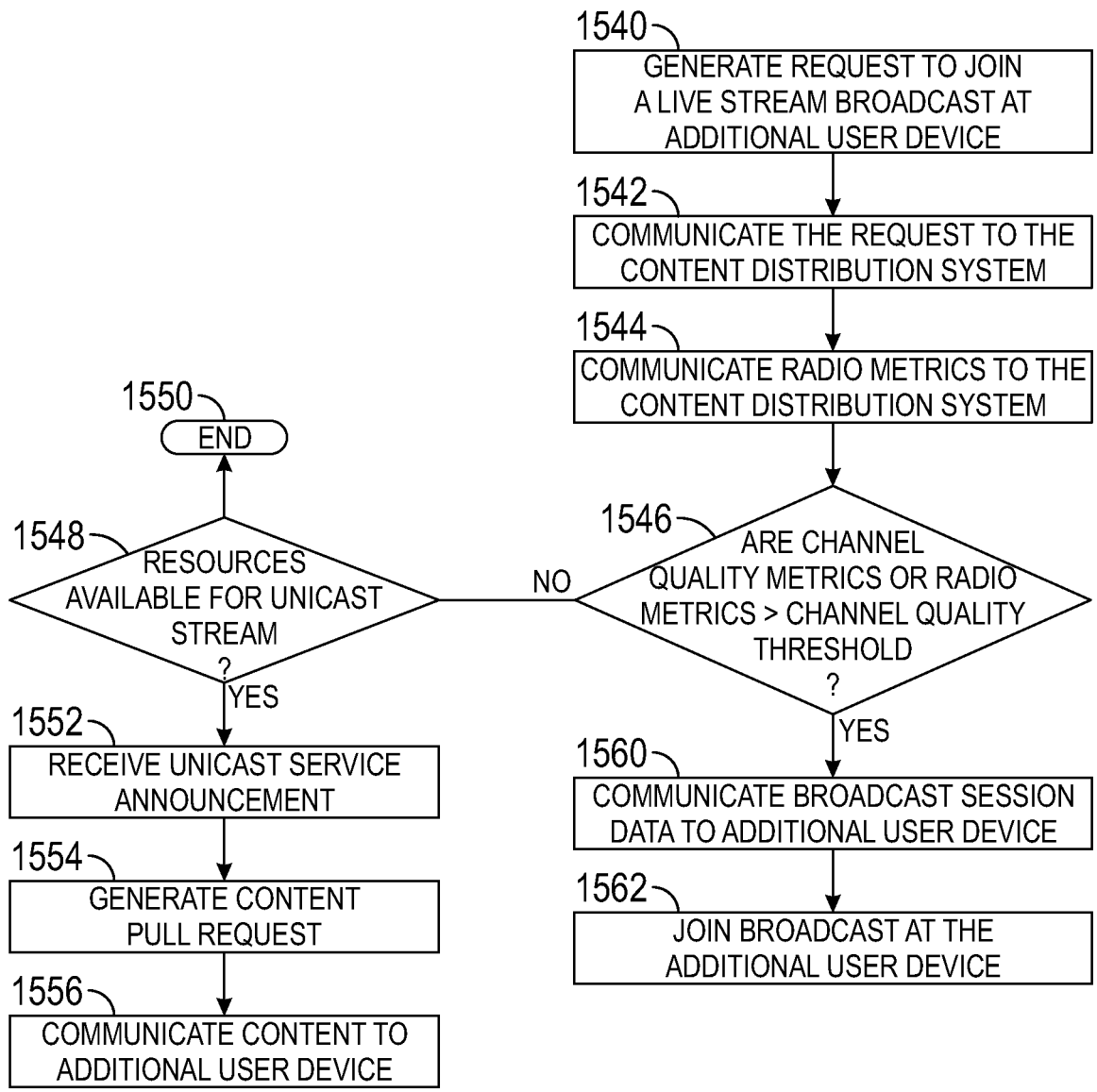
FIG. 15B is a flowchart of a method for adding an additional user to a broadcast stream.

Referring now to FIG. 15B, a method joining or adding an additional device outside of a group to a broadcast group is set forth. In step 1540, a new user device request signal to join a live stream being broadcasted to a first group of user devices is generated. The request to join the live stream is communicated to the content distribution system in step 1542 In step 1544, the channel quality metrics for a user device are communicated to the content distribution system. This may be done in a separate communication from the request to join in step 1540 or together with the request to join. The radio metrics may also be communicated in response to a request from the content distribution system. As mentioned above, the channel quality metrics may include the signal to noise ratio, the signal interference to noise ratio and the channel quality indicator. In step 1546, the channel quality metrics are compared to a channel quality threshold. When the channel quality metrics are not greater than the channel quality threshold, step 1548 determines whether there are enough resources for unicasting the desired content. When there are not enough resources (bandwidth, dormant capacity or other resources) the system ends without joining the additional device in step 1550. In step 1552 when there are enough resources, step 1554 communicates a service announcement is communicated from the content distribution system which is received at the additional user device. Data for the unicast such as URL may be obtained from the service announcement. The additional user device generates a pull request using the unicast data. The content is communicated though the live stream in step 1556 to the additional user device.

In step 1546 when the channel quality metrics are above the channel quality threshold, broadcast session data is communicated to the additional user device in step 1560. Thereafter, step 1562 the broadcast is joined at the additional user device using the broadcast data.

Figure 16:
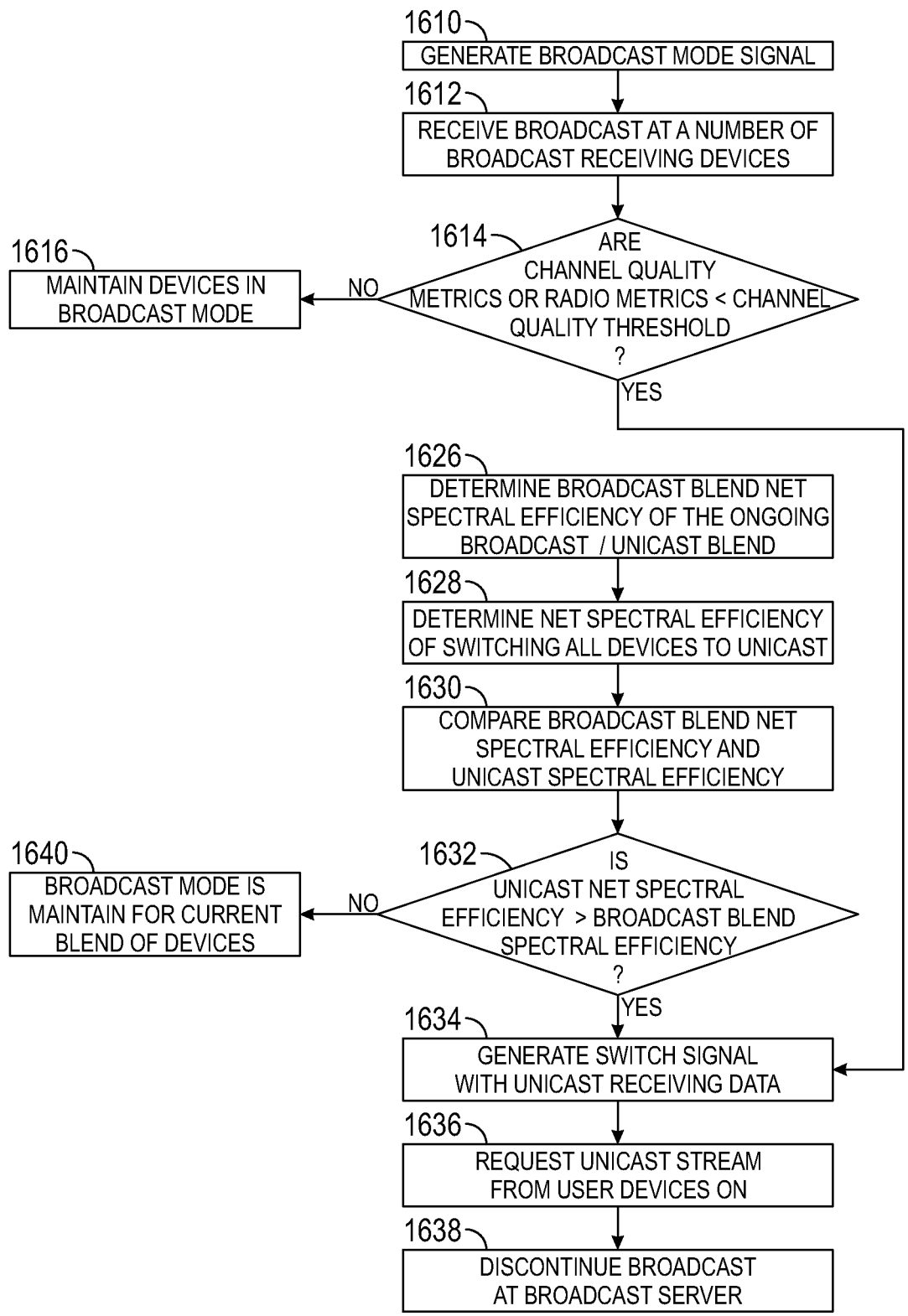
FIG. 16 is a flowchart of a method for switching from broadcasting to unicasting.

Referring now to FIG. 16, a similar method in reverse is provided for switching from devices using a broadcast stream to enter a unicast mode. In FIG. 16, based on various criteria, a switch from broadcast mode to unicast mode may make sense based upon the system conditions. In step 1610, a broadcast mode signal is generated. In step 1612, the broadcasted signal is received at a number of broadcast receiving devices such as a user device and an intermediate device. In step 1614, the channel quality metrics for the devices are collected. If the channel quality metrics are not less than the channel quality threshold, the broadcast configuration is maintained in step 1616.

In step 1626, a broadcast blend net spectral efficiency of the ongoing broadcast unicast blend is determined. In step 1628, a unicast net spectral efficiency of switching all of the devices to unicast is determined. That is, when all of the devices are switched to unicast, a net spectral efficiency is determined. In step 1630, the broadcast blend net spectral efficiency and the unicast net spectral efficiency are compared. When the unicast net spectral efficiency is greater than the broadcast blend spectral efficiency in step 1632 and when the channel quality metrics are below a channel quality threshold in step 1614, step 1634 is performed. Step 1634 generates a switch signal with unicast receiving data therein. The unicast receiving data may provide a URL or other receiving data for receiving the unicast signal. In step 1636, a unicast stream is requested from the user devices or the intermediate devices that are being switch. In step 1638, the broadcast at the broadcast server is discontinued.

Referring back to step 1632, when the unicast net spectral efficiency is not greater than the broadcast blend spectral efficiency, the broadcast mode is maintained for the current blend of unicast and broadcast devices in step 1640.

Figure 17:
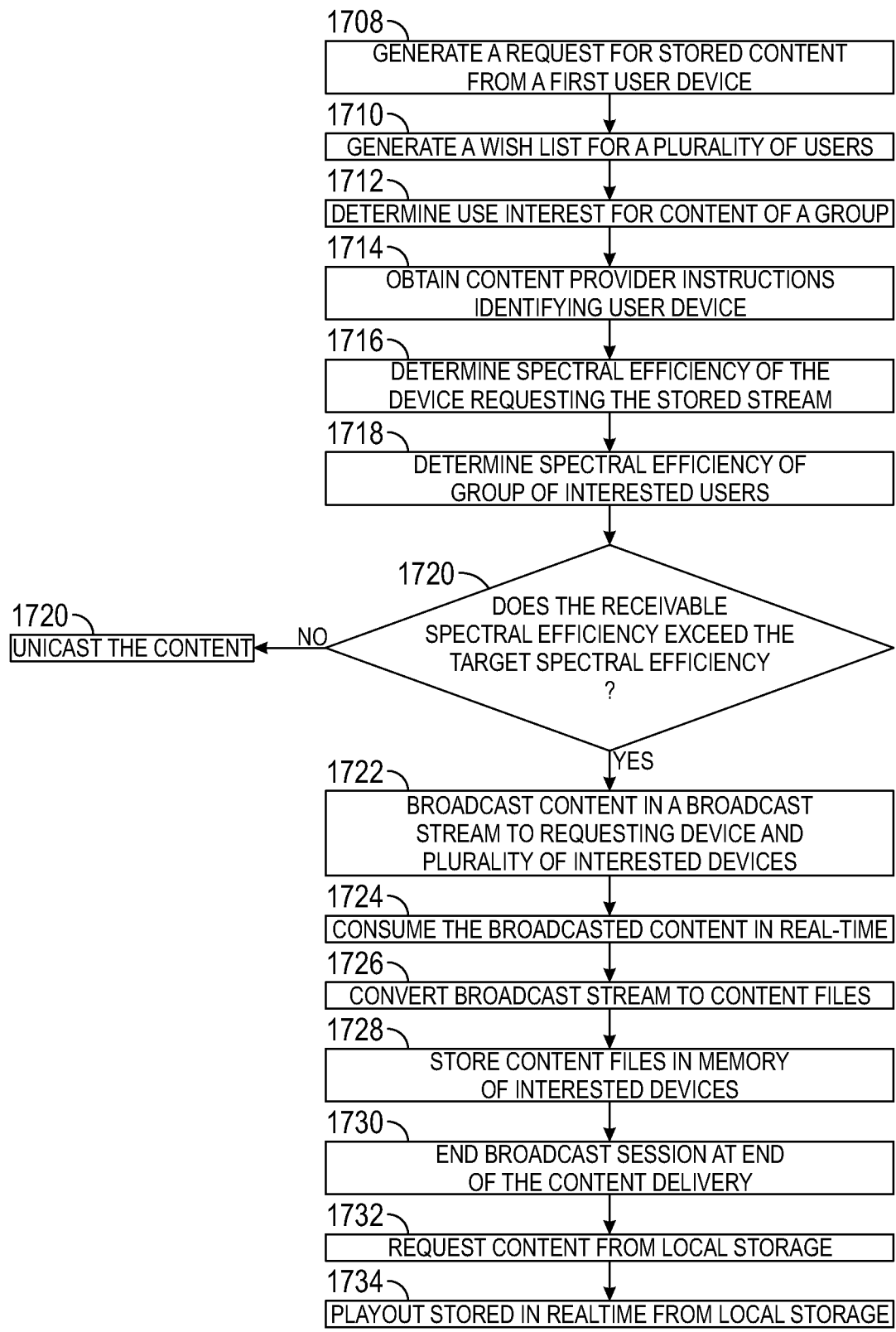
FIG. 17 is a flowchart of a method for communicating a stored content at the request for real-time content at a device.

Referring now FIG. 17, stored content streaming may employ a similar approach to that set forth above. However, the stored content streaming has different delivery in consumption dynamics. For content streaming from storage, a piece of content is pulled on-demand for a specific user at a specific time. In other words, the event is not a live event that is time synchronous to a population of users. Synchronizing stored content amongst a plurality of users is nearly impossible because different users may start or stop the content. However, when one user requests a content for real-time delivery of stored content, the opportunity exists for communicating the stored content opportunistically to other devices within the system that may be interested in consuming the content in the future. Live consumption of a stored content stream may therefore be combined with simultaneously deliveries and caching on other devices that may consume the content in non-real-time.

Various considerations are considered when establishing a broadcast stream for stored content. In step 1708, a request from a first user device is generated at a first user device and is communicated to and received at the content distribution system. Once the request for content is received, other user interest for the content is determined. In step 1710, a wish list for each device of a plurality of users may be communicated to the content distribution system. A wish list or watch list explicitly provides or flags an interest in the content to the content distribution system. In step 1712, the distribution system may assess interest from various users (an interested group of user devices other than the requesting device) based upon prior viewing patterns of related content or content in the same genre, related topics, prequels or sequels of the content and the like. A number of users (size of a group) interested is determined.

In step 1714, instructions from a content provider identifying specific user devices may be obtained. That is, a content provider may have provided instructions for communicating content to various user devices and the users associated therewith that a particular piece of content may be desirable. The content provider may provide advertisements for specific services or actual content.

In step 1716, the spectral efficiency of the device requesting the stored stream is determined. The spectral efficiency corresponds to the bit/sec/Hz of the device. A unicast delivery to the device would deliver the stored stream at this spectral efficiency, which corresponds to the modulation and coding scheme level. The target spectral efficiency is the maximum spectral efficiency level at which the target device can receive the transmission. In step 1718, the spectral efficiency for the interested group is determined. In step 1720, a determination is made as to whether a broadcast for the content can meet the target spectral efficiency for both first user and the interested group When the receivable spectral efficiency for a device is greater than target spectral efficiency, in step 1722 the content distribution system broadcasts the content in a broadcast stream to the requesting device and a plurality of interested devices (the interested group). The devices may be user devices or intermediate devices, or a mix of both. In step 1724, the broadcasted content stream is consumed in real-time by the requesting device. In step 1726, the broadcasted stream is communicated to the other devices for storage and converted to content files. Thus, the original target device consumes the content in real-time while the other devices convert the stream into audio/video files and are stored within the content storage system of the user device or the intermediate device. In step 1732, the content is requested from the local storage within the intermediate or user devices. In step 1734, the stored content is played out in real-time directly on the device or through a local area network. In this case, when broadcast is possible, all the devices including the real-time device and the broadcast receiving devices receive all the content by broadcasting. If other devices are not included within the group, content may be transmitted by way of unicasting thereto.

Figure 18:
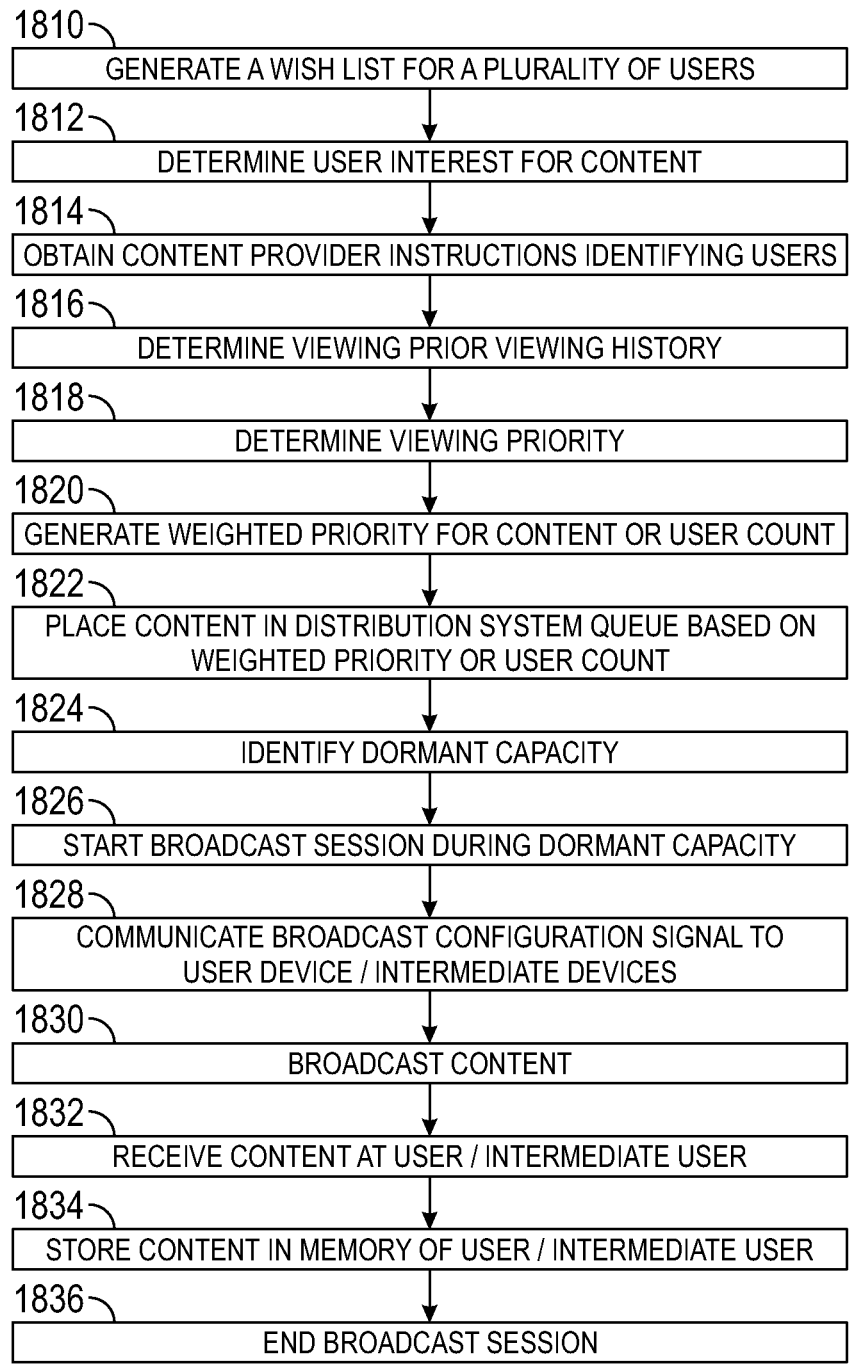
FIG. 18 is a flowchart of a method for preplanned positioning of content using broadcasting.

Referring now to FIG. 18, the system may also be used for planned prepositioning. Planned pre-positioning is used to store content in the user devices so the content is available for future consumption. The communicating and storing is performed without a real-time request from a user device as in FIG. 17. In general, the system identifies content desired by consumers that is ultimately broadcasted through the network in advance of when the user wants to consume the content. The content is stored locally at the consumer premises where it is ultimately communicated to the user devices using an unconstrained medium such as Wi-Fi 33. The content is consumed in real-time from the storage memory in the intermediate device. In this manner, the wireless networks have a reduced amount of traffic due to the use of such content because the content may be communicated using spare capacity. The spare capacity or dormant capacity for pre-positioning into the targeted user devices or intermediate devices. In general, the amount of dormant capacity as well as the interest in the particular content is determined to perform the communication.

In step 1810, a wish list for a plurality of users is received by the content distribution system. In step 1812, the user interest for the content is determined. Explicit interest from the wish list may be determined. An average number of sign-ups for similar past live streams or content may also be determined and factored into the user interest determination. In step 1814, content provider instructions may also be provided for locating various content at a particular user device. As well, a prior viewing history for prior viewed content may also be used to access the interest in a particular content.

A viewing priority may also provide for a particular content. The viewing priority may be established within the wish list or directly from the user. For example, user A may have content priority for a particular content at 25 where user B may have the content priority at 1000.

In step 1820, a weighted priority for the content or user count may be generated. That is, the weighted priority may be the sum of the individual priority levels for the piece of content divided by the number of users.

In step 1822, the content may be placed in the distribution system queue based upon the weighted priority or the user count. The placement in the queue may be increased or decreased based upon the priority or the number of users. That is, the content may be placed ahead of other identified content based upon the weighted priority.

In step 1824, dormant capacity is identified for communicating the content within the content queue. In step 1826, a broadcast session is started using the dormant capacity. The broadcast session may communicate a broadcast session configuration signal to the user device or intermediate device or receiving the content. In step 1830, the content is broadcasted to the intermediate or user devices. The content is stored in the content devices. In step 1834, the content is stored in the memory of the user or intermediate devices to which it was broadcasted. In step 1836, the broadcast session is ended.

The preplanned positioning is most effective when a significant amount of interest for a sufficient percentage of the users in that population is achieved. Otherwise, an inefficient usage of radio and network resources is achieved.

Those skilled in the art can now appreciate from the foregoing description that the broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification and the following claims.

What is claimed is:
1. A method comprising:
providing a content for communication through a content distribution system having a broadcast mode and a unicast mode;
determining a first number of user devices for receiving a communication of the content;

determining a likelihood of consumption of the content by the first number of user devices;

determining an available spectrum for communicating the content;

determining a plurality of spectral efficiencies of a plurality of blends of the unicast mode and the broadcast mode of the communication for each of the first number of user devices;

selecting the broadcast mode or the unicast mode or both based on the first number of user devices, the likelihood of consumption of the content, the available spectrum and the plurality of spectral efficiencies by selecting a blend of the plurality of blends with a highest net spectral efficiency; and communicating the content to the first number of user devices using the broadcast mode, the unicast mode or both based on selecting.

2. The method of claim 1 wherein selecting the broadcast mode or the unicast mode or both based is performed dynamically.

3. The method of claim 1 further comprising continually performing the steps of selecting the broadcast mode or the unicast mode or both and communicating the content to a user device, over time while the first number of user devices, the likelihood of consumption of the content, the available spectrum, or a spectral efficiency changes.

4. The method of claim 1 wherein determining the first number of user devices comprises determining the first number of user devices corresponding to interested users or signed-up users.

5. The method of claim 1 wherein determining the first number of user devices comprises determining the first number of user devices at least partially based on content provider instructions.

6. The method of claim 1 wherein determining the first number of user devices comprises determining the first number of user devices consuming the content in real-time.

7. The method of claim 6 further comprising a second number of user devices wherein the second number of user devices comprise intermediate devices and further comprising storing the content in the intermediate devices, requesting, at a future time, content from a first intermediate device using a user device and communicating the content in real-time from the first intermediate device to the user device.

8. The method of claim 1 wherein determining the first number of user devices comprises determining the first number of user devices which are expected to consume the content in real-time at a future time.

9. The method of claim 1 wherein determining the first number of user devices comprises determining the first number of user devices consuming the content in real-time and are expected to consume the content in real-time at a future time.

10. The method of claim 1 wherein determining the likelihood of consumption of the content by the first number of user devices comprises determining actual consumption of similar content to the content.

11. The method of claim 1 wherein determining the likelihood of consumption comprises determining actual consumption of the content and actual consumption of similar content to the content by other users.

12. The method of claim 1 wherein determining the likelihood of consumption of the content comprises determining actual consumption of a prequel to the content.

13. The method of claim 1 wherein the content comprises a first part and a second part and wherein determining the likelihood of consumption of the content comprises determining actual consumption of the first part of the content.

14. The method of claim 1 wherein determining the likelihood of consumption of the content comprises determining sign-ups for similar content to the content.

15. The method of claim 1 wherein determining the likelihood of consumption of the content comprises determining a popularity of similar content to the content.

16. The method of claim 1 wherein determining the likelihood of consumption of the content comprises determining the likelihood of consumption based on collaborative filtering including wherein the content comprises a first part and a second part, determining actual consumption of the first part of the content, actual consumption of the first part of the content by other users, and actual consumption of the second part of the content by other users.

17. The method of claim 1 wherein determining the likelihood of consumption of the content comprises determining the likelihood of consumption based on collaborative filtering including determining actual consumption of similar content to the content, a prequel to the content, or sign-ups for similar content to the content, and determining actual consumption of the content and actual consumption of the similar content to the content, the prequel to the content, or the sign-ups for similar content to the content by other users.

18. The method of claim 1 wherein determining the likelihood of consumption of the content comprises determining the likelihood of consumption based on interests and tastes and demographics of users of the first number of user devices, and then determining actual consumption of other users with interests and tastes and demographics similar to the users of the first number of user devices.

19. The method of claim 1 wherein the content comprises a first part and a second part and wherein determining the likelihood of consumption of the content comprises determining the likelihood of consumption of the second part based on actual consumption of the first part of the content.

20. The method of claim 1 wherein selecting comprises determining a predicted total user value based on the first number of user devices for the content, a second number of user devices for the content, the likelihood of consumption, and selecting the broadcast mode over the unicast mode when the predicted total user value is greater than a user threshold value.

21. The method of claim 1 wherein selecting comprises determining a predicted total user value based on the first number of user devices for the content, a second number of potential user devices of the content, the likelihood of consumption; and wherein selecting the broadcast mode over the unicast mode when the predicted total user value is greater than a user threshold value and when a broadcasting spectral efficiency is greater than a unicast spectral efficiency for communicating to the first number of user devices.

22. The method of claim 1 further comprising determining a network loading and selecting the broadcast mode or the unicast mode based on the network loading.

23. The method of claim 1 further comprising determining an available capacity of a communication network and selecting broadcasting or unicasting based on the available capacity.

24. The method of claim 1 wherein communicating the content comprises communicating the content through a live stream.

25. The method of claim 1 wherein communicating the content comprises communicating the content to the user devices using a plurality of broadcast communication networks.

26. The method of claim 25 wherein the plurality of broadcast communication networks comprises a television network, a cable network, a cellular network or a satellite network.

27. A method comprising:
providing a content for communication through a content distribution system having a broadcast mode and a unicast mode;
determining a first number of user devices for receiving a communication of the content;
determining a likelihood of consumption of the content by the first number of user devices;
determining an available spectrum for communicating the content;
determining a spectral efficiency for the unicast mode and the broadcast mode of the communication for each of the first number of user devices;
selecting the broadcast mode or the unicast mode or both based on the first number of user devices, the likelihood of consumption of the content, the available spectrum and the spectral efficiency;
communicating the content to the first number of user devices using the broadcast mode, the unicast mode or both based on selecting; and
determining a net spectral efficiency based on a unicast aggregate throughput, a broadcast aggregate throughput, a broadcast capacity and a unicast capacity and wherein selecting the broadcast mode or the unicast mode or both is based on the net spectral efficiency based on the unicast aggregate throughput, the broadcast aggregate throughput, the broadcast capacity and a unicast capacity.

28. The method of claim 27 further comprising determining the broadcast aggregate throughput based on a target throughput and the first number of the user devices receiving a broadcast, and determining the unicast aggregate throughput based on the target throughput and the first number of user devices receiving a unicast.

29. The method of claim 1 wherein selecting the broadcast mode or the unicast mode or both comprises selecting unicast mode and wherein communicating the content to the first number of user devices comprises communicating the content using the unicast mode; and further comprising, thereafter, switching from the unicast mode to the broadcast mode for at least a first group of the first number of user devices based on the first number of user devices, the likelihood of consumption of the content, and a spectral efficiency; and
communicating the content to the first number of user devices using the broadcast mode based on switching.

30. The method of claim 29 wherein communicating the content comprises communicating the content through a live stream.

31. The method of claim 30 wherein the first number of user devices corresponds to the user devices receiving the live stream though unicasting.

32. The method of claim 30 further comprising determining a second number of future user devices of the live stream, wherein switching from the unicast mode is also based on the second number of future user devices.

33. The method of claim 29 wherein the spectral efficiency comprising a maximum spectral efficiency.

34. A method comprising:
providing a content for communication through a content distribution system having a broadcast mode and a unicast mode;
determining a first number of user devices for receiving a communication of the content;
determining a likelihood of consumption of the content by the first number of user devices;
determining an available spectrum for communicating the content;
determining a spectral efficiency for the unicast mode and the broadcast mode of the communication for each of the first number of user devices;
selecting the broadcast mode or the unicast mode or both based on the first number of user devices, the likelihood of consumption of the content, the available spectrum and the spectral efficiency; and
communicating the content to the first number of user devices using the broadcast mode, the unicast mode or both based on selecting;
wherein selecting the broadcast mode or the unicast mode or both comprises selecting broadcast mode for first user devices of the first number of user devices and unicast mode for second user devices of the first number of user devices, the first user devices and the second user devices forming a blend of user devices;
wherein communicating the content to the first number of user devices comprises communicating the content to first user devices using the broadcast mode and the second user devices using the unicast mode; and further comprising thereafter
collecting radio metrics from the first user devices and the second user devices;
determining a first net spectral efficiency for the blend of user devices;
determining a second net spectral efficiency corresponding to the first user devices and the second user devices unicasting;
switching the first user devices from the broadcast mode to the unicast mode when the radio metrics are below a target channel quality or the first net spectral efficiency is below the second net spectral efficiency; and
communicating the content to the first user devices using the unicast mode based on switching.

35. The method of claim 34 wherein communicating the content to the first user devices comprises communicating the content through a live stream.

36. The method of claim 29 wherein communicating the content to the first number of user devices using the broadcast mode comprises communicating the content in a live stream, and further comprising requesting to join the live stream from an additional user device;
communicating radio metrics of the additional user device to the content distribution system;
comparing the radio metrics to a channel quality threshold;
when the radio metrics exceeds the channel quality threshold communicating broadcast session data to the additional user device; and
joining, at the additional user device, the live stream being broadcasted.

37. The method of claim 36 further comprising increasing net spectral efficiency of the content distribution system in response to joining the live stream.

38. The method of claim 36 wherein the radio metrics comprise at least one of a signal to noise ratio, a signal interference to noise ratio and a channel quality indicator.

39. A system for communicating content to user devices comprising:
- a content distribution system having a broadcast mode and a unicast mode for communicating a content;
- said content distribution system determining a first number of user devices for receiving a communication of the content, determining a likelihood of consumption of the content by the first number of user devices, determining an available spectrum for communicating the content, determining a plurality of spectral efficiencies of a plurality of blends of the unicast mode and the broadcast mode of the communication for each of the first number of user devices;
- said content distribution system selecting the broadcast mode or the unicast mode or both based on the first number of user devices, the likelihood of consumption of the content, the available spectrum and by selecting a blend of the plurality of blends with a highest net spectral efficiency; and
- said content distribution system communicating the content to the user devices using the broadcast mode, the unicast mode or both based on selecting.

40. The system of claim 39 wherein the content distribution system selects the broadcast mode or the unicast mode or both based is performed dynamically.

41. The system of claim 39 wherein the content distribution system continually performs selecting the broadcast mode or the unicast mode or both while communicating the content to the user device, over time while the first number of user devices, the likelihood of consumption of the content, the available spectrum, or a spectral efficiency changes.

42. The system of claim 39 wherein the content distribution system determines the first number of user devices by determining user devices corresponding to interested users or signed-up users.

43. The system of claim 39 wherein the content distribution system determines the first number of user devices by determining the first number of user devices at least partially based on content provider instructions.

44. The system of claim 39 wherein the content distribution system determines the first number of user devices by determining the first number of user devices consuming the content in real-time.

45. The system of claim 44 further comprising a second number of user devices comprising intermediate devices and wherein the content distribution system stores the content in the intermediate devices, and the user device requests content from a first intermediate device at some time in the future and communicates the content in real-time from the first intermediate device to the user device.

46. The system of claim 39 wherein the content distribution system determines the first number of user devices by determining the first number of user devices expected to consume the content in real-time at a future time.

47. The system of claim 39 wherein the content distribution system determines the first number of user devices by determining the first number of user devices consuming the content in real-time and expected to consume the content in real-time at a future time.

48. The system of claim 39 wherein the content distribution system determines the likelihood of consumption of the content by the first number of user devices by determining actual consumption of similar content to the content.

49. The system of claim 39 wherein the content distribution system determines the likelihood of consumption of the content by the first number of user devices by determining actual consumption of the content and actual consumption of similar content to the content.

50. The system of claim 39 wherein the content distribution system determines the likelihood of consumption of the content by the first number of user devices by determining actual consumption of a prequel to the content.

51. The system of claim 39 wherein the content comprises a first part and a second part and wherein the content distribution system determines the likelihood of consumption of the content by determining actual consumption of the first part of the content.

52. The system of claim 39 wherein the content distribution system determines the likelihood of consumption of the content by the first number of user devices by determining a popularity for events similar to the content.

53. The system of claim 39 wherein the content distribution system determines the likelihood of consumption of the content by the first number of user devices by determining the likelihood of consumption based on collaborative filtering including wherein the content comprises a first part and a second part, determining actual consumption of the first part of the content, actual consumption of the first part of the content by other users, and actual consumption of the second part of the content by other users.

54. The system of claim 39 wherein the content distribution system determines the likelihood of consumption of the content by determining the likelihood of consumption based on collaborative filtering including determining actual consumption of similar content to the content, a prequel to the content, or sign-ups for similar content to the content, and determining actual consumption of the content and actual consumption of the similar content to the content, the prequel to the content, or the sign-ups for similar content to the content by other users.

55. The system of claim 39 wherein the content distribution system determines the likelihood of consumption of the content by the first number of user devices based on interests and tastes and demographics of users of the first number of user devices, and then determining the actual consumption of other users with interests and tastes and demographics similar to the users of the first number of user devices.

56. The system of claim 39 wherein the content comprises a first part and a second part and wherein the content distribution system determines the likelihood of consumption of the content by determining the likelihood of consumption of the second part based on actual consumption of the first part of the content.

57. The system of claim 39 wherein the content distribution system selects by determining a predicted total user value based on the first number of user devices for the content, a second number of potential user devices for the content, the likelihood of consumption and a popularity of similar events and selecting the broadcast mode over the unicast mode when the predicted total user value is greater than a user threshold value.

58. The system of claim 39 wherein the content distribution system selects by determining a predicted total user value based on the first number of user devices for the content, a second number of potential user devices of the content, the likelihood of consumption of the content and a second popularity of similar events; and wherein selecting the broadcast mode over the unicast mode when the predicted total user value is greater than a user threshold value and when a broadcasting spectral efficiency is greater than a unicast spectral efficiency for communicating to the first number of user devices.

59. The system of claim 39 wherein the content distribution system determines a network loading and selects the broadcast mode or the unicast mode based on the network loading.

60. The system of claim 39 wherein the content distribution system determines an available capacity of a communication network and selects broadcasting or unicasting based on the available capacity.

61. The system of claim 39 wherein the content distribution system communicates the content through a live stream.

62. The system of claim 39 wherein the content distribution system communicates the content to the user devices using a plurality of broadcast communication networks.

63. The system of claim 62 wherein the plurality of broadcast communication networks comprises a television network, a cable network, a cellular network or a satellite network.

64. A system for communicating content to user devices comprising:
a content distribution system having a broadcast mode and a unicast mode for communicating a content;
said content distribution system determining a first number of user devices for receiving a communication of the content, determining a likelihood of consumption of the content by the first number of user devices, determining an available spectrum for communicating the content, determining a spectral efficiency for the unicast mode and the broadcast mode of the communication for each of the first number of user devices;
said content distribution system selecting the broadcast mode or the unicast mode or both based on the first number of user devices, the likelihood of consumption of the content, the available spectrum and the spectral efficiency; and
said content distribution system communicating the content to the user devices using the broadcast mode, the unicast mode or both based on selecting;
wherein the content distribution system determines a net spectral efficiency based on a unicast aggregate throughput, a broadcast aggregate throughput, a broadcast capacity and a unicast capacity and wherein selecting the broadcast mode or the unicast mode or both is based on the net spectral efficiency based on the unicast aggregate throughput, the broadcast aggregate throughput, the broadcast capacity and a unicast capacity.

65. The system of claim 64 wherein the content distribution system determines the broadcast aggregate throughput based on a target throughput and a number of the user devices receiving a broadcast, and determines the unicast aggregate throughput based on the target throughput and the number of user devices receiving a unicast.

66. The system of claim 39 wherein the content distribution system selects the broadcast mode or the unicast mode or both by communicating the content using the unicast mode; and
thereafter, the content distribution system switches from the unicast mode to the broadcast mode for at least a first group of the first number of user devices based on the first number of user devices, the likelihood of consumption of the content, and a spectral efficiency; and
communicates the content to the first group of user devices using the broadcast mode based on switching.

67. The system of claim 66 wherein the content distribution system communicates the content through a live stream.

68. The system of claim 67 wherein the first number of user devices corresponds to the user devices receiving the live stream though unicasting.

69. The system of claim 68 further comprising determining a second number of future user devices of the live stream, wherein switching from the unicast mode is also based on the second number of future user devices.

70. The system of claim 66 wherein the spectral efficiency comprising a maximum spectral efficiency.

71. A system for communicating content to user devices comprising:
a content distribution system having a broadcast mode and a unicast mode for communicating a content;
said content distribution system determining a first number of user devices for receiving a communication of the content, determining a likelihood of consumption of the content by the first number of user devices, determining an available spectrum for communicating the content, determining spectral efficiency for the unicast mode and the broadcast mode of the communication for each of the first number of user devices;
said content distribution system selecting the broadcast mode or the unicast mode or both based on the first number of user devices, the likelihood of consumption of the content, the available spectrum and the spectral efficiency; and
said content distribution system communicating the content to the user devices using the broadcast mode, the unicast mode or both based on selecting;
wherein the content distribution system selects broadcast mode for first user devices and unicast mode for second user devices, the first user devices and the second user devices forming a blend of user devices;
wherein said content distribution system communicates the content to first user devices using the broadcast mode and the second user devices using the unicast mode;
wherein said content distribution system collects radio metrics from the first user devices and the second user devices, determines a first net spectral efficiency for the blend of user devices, determines a second net spectral efficiency corresponding to the first user devices and the second user devices unicasting, switches the first user devices from the broadcast mode to the unicast mode when the radio metrics are below a target channel quality or the first net spectral efficiency is below the second net spectral efficiency and communicates the content to the first user devices using the unicast mode based on switching.

72. The system of claim 71 wherein the content distribution system communicates the content to the first user devices through a live stream.

73. The system of claim 39 wherein the content distribution system communicates the content to the first number of user devices using the broadcast comprises by communicating the content in a live stream; and further comprising
an additional user device requesting to join the live stream and communicating radio metrics to the content distribution system;
the content distribution system comparing the radio metrics to a channel quality threshold, and when the radio metrics exceed the channel quality threshold, the content distribution system communicates broadcast session data to the additional user device;
the additional user device joining the broadcasted live stream.

74. The system of claim 73 wherein the content distribution system increasing net spectral efficiency in response to joining the live stream.

75. The system of claim 73 wherein the radio metrics comprise at least one of a signal to noise ratio, a signal interference to noise ratio and a channel quality indicator.

* * * * *